(12) United States Patent
Singh et al.

(10) Patent No.: US 12,536,178 B2
(45) Date of Patent: Jan. 27, 2026

(54) DATA STREAM ANALYTICS AT SERVICE LAYER

(71) Applicant: InterDigital Patent Holdings, Inc., Wilmington, DE (US)

(72) Inventors: Sneha Aman Singh, Issaquah, WA (US); Xu Li, Plainsboro, NJ (US); Quang Ly, North Wales, PA (US); Gregory S. Sternberg, Mt. Laurel, NJ (US); Shamim Akbar Rahman, Cote St. Luc (CA); Chonggang Wang, Princeton, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/338,053

(22) Filed: Jun. 20, 2023

(65) Prior Publication Data

US 2023/0334051 A1    Oct. 19, 2023

Related U.S. Application Data

(63) Continuation of application No. 17/175,100, filed on Feb. 12, 2021, now Pat. No. 11,727,012, which is a
(Continued)

(51) Int. Cl.
*G06F 16/2455* (2019.01)
*G06F 16/00* (2019.01)
(Continued)

(52) U.S. Cl.
CPC ........ *G06F 16/24568* (2019.01); *G06F 16/00* (2019.01); *H04L 12/28* (2013.01);
(Continued)

(58) Field of Classification Search
CPC ...... G06F 16/00; G06F 16/2458; H04W 4/70; H04W 12/08; H04L 67/12; H04L 43/04;
(Continued)

(56) References Cited

U.S. PATENT DOCUMENTS 7,480,660 B1 *   1/2009   Black ..................... H04L 67/10
                                                    707/999.102
8,301,645 B1    10/2012   Crook et al.
(Continued)

FOREIGN PATENT DOCUMENTS

| EP | 2674876 A1 | 12/2013 |
| EP | 2801935 A1 | 11/2014 |
| WO | 98/43178 A1 | 10/1998 |

OTHER PUBLICATIONS

"Http://storm.apache.org/", Retrieved Jan. 7, 2020, 3 pages.
(Continued)

*Primary Examiner* — Etienne P Leroux
(74) *Attorney, Agent, or Firm* — Flaster Greenberg, P.C.

(57) ABSTRACT

A modular and distributed architecture for data stream processing and analysis is described to incorporate data stream analytics capabilities, called Data Stream Analytics Service (DSAS) in the IoT/M2M service layer. Each service layer node hosting DSAS can be split into two independent modules, Stream Forwarder and Stream Analytics Engine. Stream Forwarder is a light weight processing modules that can be responsible for data preprocessing and routing. Stream Analytics Engine is responsible for performing actual analytics on the data stream. Separating the two functionalities enables the service layer nodes to efficiently distribute stream analytics tasks across multiple nodes.

19 Claims, 55 Drawing Sheets

Related U.S. Application Data continuation of application No. 16/096,510, filed as application No. PCT/US2017/029341 on Apr. 25, 2017, now Pat. No. 10,956,423.

(60) Provisional application No. 62/326,894, filed on Apr. 25, 2016.

(51) Int. Cl.
*H04L 9/40* (2022.01)
*H04L 12/28* (2006.01)
*H04L 43/04* (2022.01)
*H04L 43/18* (2022.01)
*H04L 67/12* (2022.01)
*H04W 4/70* (2018.01)
*H04W 12/08* (2021.01)

(52) U.S. Cl.
CPC .......... *H04L 12/2823* (2013.01); *H04L 43/04* (2013.01); *H04L 43/18* (2013.01); *H04L 67/12* (2013.01); *H04W 4/70* (2018.02); *H04W 12/08* (2013.01); *H04L 63/10* (2013.01); *H04L 63/1425* (2013.01)

(58) Field of Classification Search
CPC ..... H04L 43/18; H04L 12/28; H04L 12/2823; H04L 63/10; H04L 63/1425
See application file for complete search history.

(56) References Cited

U.S. PATENT DOCUMENTS

| | | | |
|---|---|---|---|
| 8,606,825 B1 * | 12/2013 | Matthews | H04L 67/535 707/803 |
| 8,935,751 B1 * | 1/2015 | Cardente | G06F 21/6218 726/28 |
| 9,026,644 B2 * | 5/2015 | Parker | H04L 63/1425 709/224 |
| 9,251,215 B2 * | 2/2016 | Chen | G06F 16/24568 |
| 9,497,198 B2 * | 11/2016 | Mullick | H04L 63/0876 |
| 9,710,518 B2 * | 7/2017 | Cheng | G06F 16/245 |
| 10,601,958 B2 * | 3/2020 | Wada | G06F 16/9574 |
| 10,853,359 B1 * | 12/2020 | Waugh | G06F 16/24568 |
| 11,431,785 B2 | 8/2022 | Spaven et al. | |
| 2004/0004631 A1 | 1/2004 | Debique et al. | |
| 2004/0117157 A1 | 6/2004 | Bantz et al. | |
| 2005/0175029 A1 | 8/2005 | Cheung et al. | |
| 2005/0249221 A1 | 11/2005 | Remi et al. | |
| 2007/0005576 A1 | 1/2007 | Cutrell et al. | |
| 2007/0143386 A1 | 6/2007 | Nguyen | |
| 2010/0288157 A1 | 11/2010 | LeFebvre et al. | |
| 2012/0151345 A1 | 6/2012 | McClements, IV | |
| 2013/0029599 A1 | 1/2013 | Santori et al. | |
| 2013/0042327 A1 | 2/2013 | Chow | |
| 2013/0121282 A1 | 5/2013 | Liu | |
| 2013/0124484 A1 | 5/2013 | Hoffman | |
| 2014/0194657 A1 | 7/2014 | Wadhwa et al. | |
| 2014/0280338 A1 | 9/2014 | Metz et al. | |
| 2014/0304006 A1 | 10/2014 | Korpman et al. | |
| 2014/0330926 A1 | 11/2014 | Nano et al. | |
| 2014/0359035 A1 | 12/2014 | Wang et al. | |
| 2015/0033311 A1 * | 1/2015 | Seed | H04L 67/14 726/7 |
| 2015/0199225 A1 * | 7/2015 | Chen | H02H 7/30 714/37 |
| 2015/0200919 A1 * | 7/2015 | Czajkowski | H04L 63/0892 713/171 |
| 2015/0271033 A1 | 9/2015 | Srivastava et al. | |
| 2015/0317363 A1 | 11/2015 | Manzano et al. | |
| 2016/0070761 A1 * | 3/2016 | Viel | G06F 16/24568 707/713 |
| 2016/0085594 A1 * | 3/2016 | Wang | H04L 67/52 709/226 |
| 2016/0191591 A1 | 6/2016 | Rider et al. | |
| 2016/0234022 A1 | 8/2016 | Motika et al. | |
| 2016/0357806 A1 * | 12/2016 | Andleman | G06F 16/273 |
| 2017/0039245 A1 * | 2/2017 | Wholey, III | G06F 16/2428 |
| 2017/0109266 A1 * | 4/2017 | Chee | G06F 11/34 |
| 2017/0171165 A1 | 6/2017 | Britt et al. | |
| 2017/0177546 A1 | 6/2017 | Heinz et al. | |
| 2017/0230402 A1 | 8/2017 | Greenspan et al. | |
| 2018/0046671 A1 * | 2/2018 | Baba | G06F 16/24568 |
| 2019/0065683 A9 | 2/2019 | Korpman et al. | |

OTHER PUBLICATIONS

"http://www.enterprisetech.com/2014/12/10/intel-rolls-iot-platform/", Dec. 10, 2014, 3 pages.

"https://docs.microsoft.com/en-us/azure/iot-fundamentals/iot-introduction", downloaded Apr. 8, 2020, 37 pages.

"https://opensource.com/business/15/4/guide-to-apache-spark-streaming", Apr. 23, 2015, 7 pages.

"https://www.IBM.com/support/knowledgecenter/SSCRJU_4.0.0/com.ibm.streams.welcome.doc/doc/kc-homepage. html" Retrieved Apr. 8, 2020, 3 pages.

Aazam et al., "Fog Computing and Smart Gateway Based Communication for Cloud of Things", 2014 International Conference on Future Internet of Things and Cloud, Retrieved on Jun. 29, 2016, 7 pages.

AIM Autonomous Intersection Management, University of Texas at Austin, http://www.cs.utexas.edu/~aim/, retrieved Apr. 8, 2020, 6 pages.

Campbell, "How to Process Google Data in Real Time with Azure Stream Analytics", BlueGranite business Insights, Feb. 26, 2015, 1 pages.

Guillaume Leduc, JRC Technical Notes, "Road Traffic Data: Collection Methods and Applications", JRC 47967-2008, 55 pages.

OneM2M Technical Specification TS-0001 V2.3.0, "Functional Architecture", Aug. 2015, 352 pages.

OneM2M Technical Specification, TS-0007 V0.3.0, Service Component Architecture, Jun. 2014, 105 pages.

Satyanarayanan, et al., "Edge Analytics in the Internet of Things", Apr.-Jun. 2015, 8 pages.

\* cited by examiner

| 4/11/2010 | 11:59:38 | A | 22.41618N | 114.04299E | 112.0 | 17.61 |
| 4/11/2010 | 11:59:39 | A | 22.41616N | 114.04302E | 113.0 | 14.09 |
| 4/11/2010 | 11:59:40 | A | 22.41611N | 114.04301E | 115.2 | 21.96 |
| 4/11/2010 | 11:59:41 | A | 22.41606N | 114.04296E | 115.6 | 32.28 |

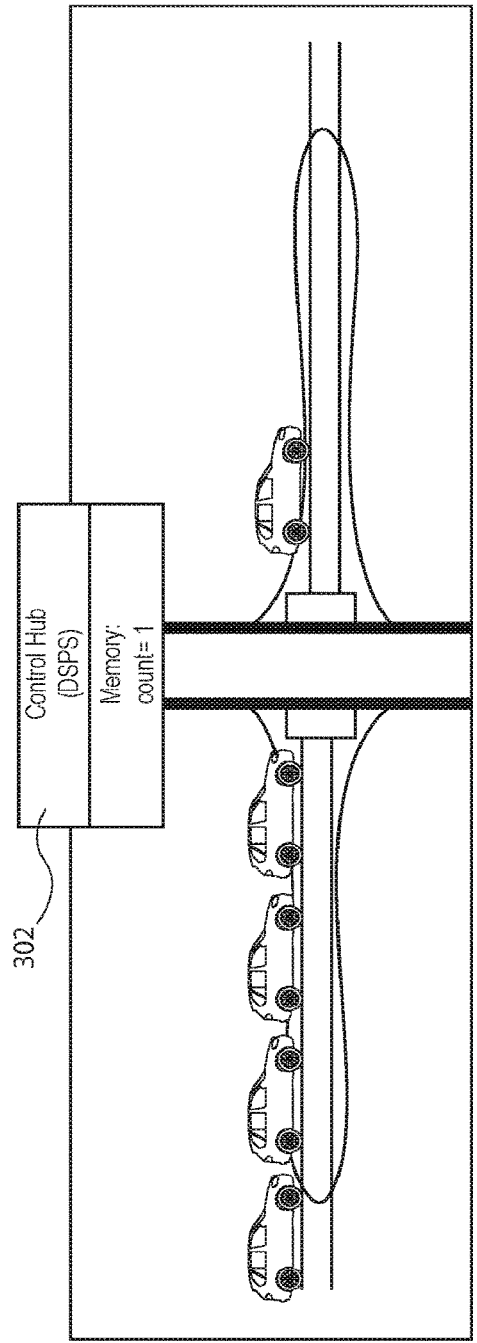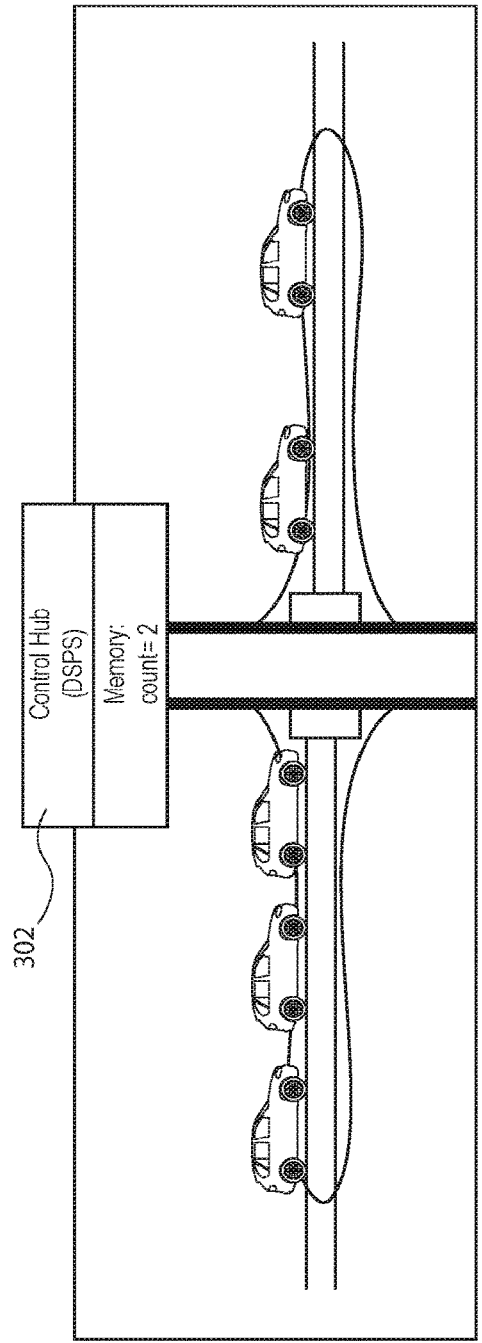
FIG. 4A
FIG. 4B

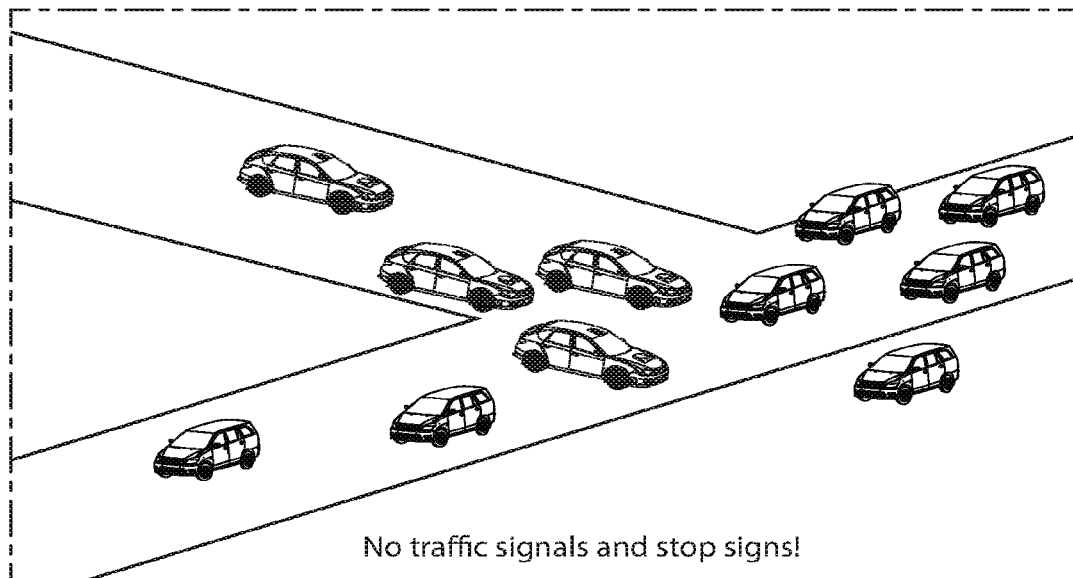
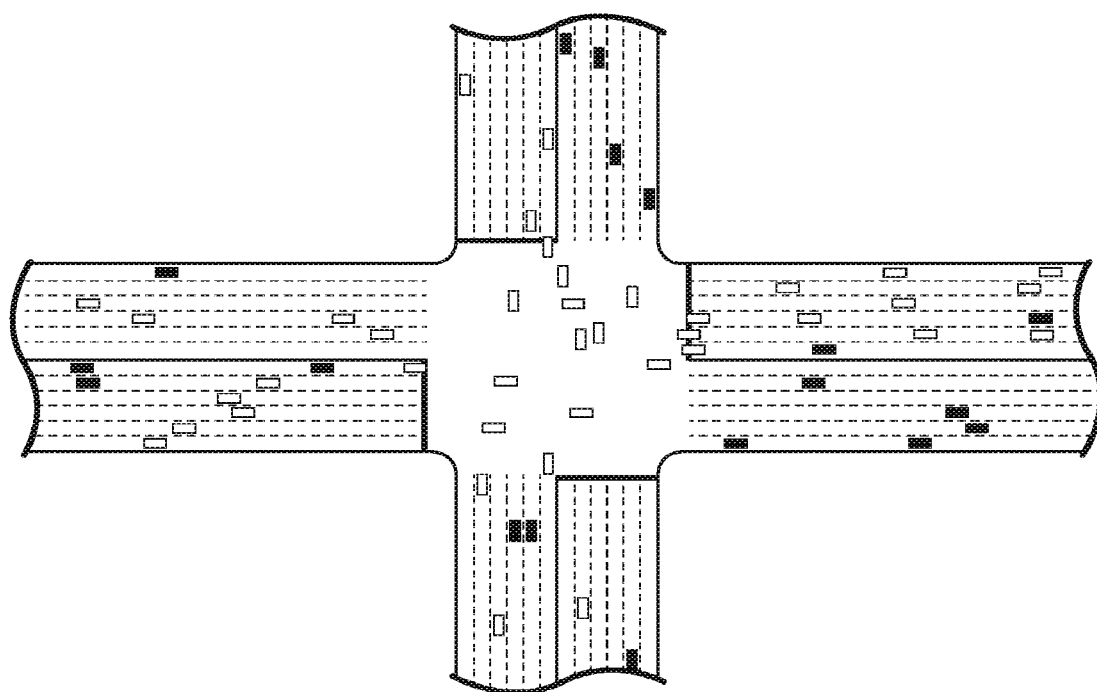
FIG. 21A

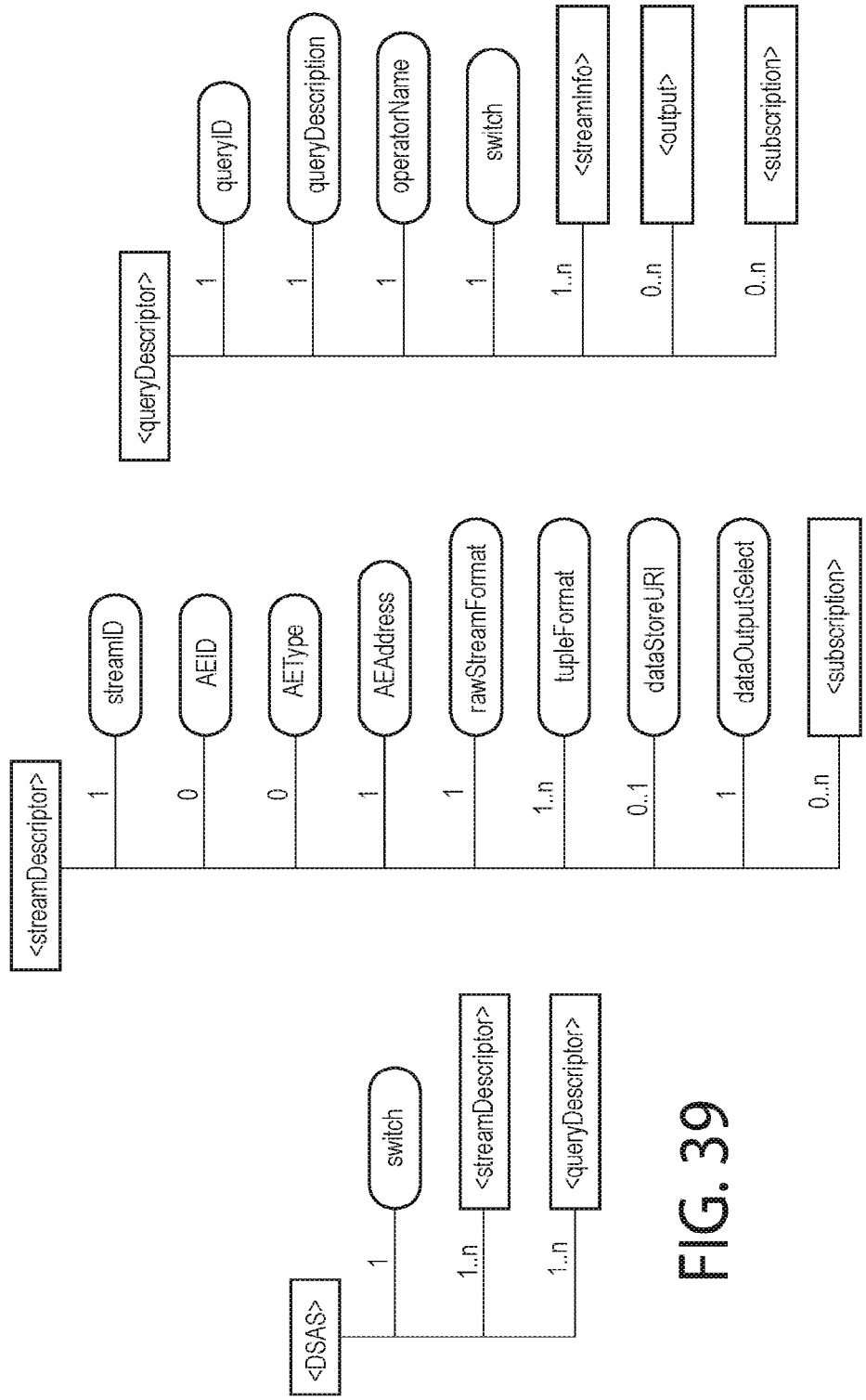

Query Output Panel

Select the Query from the dropdown:
[ Vehicle count / second at the intersection ⌄ ]

Select the output format from the dropdown:
[ CSV file ⌄ ]

Enter the time window for the query:
[ 1 hour ]

Enter the maximum tolerable error (%):
[ 0.01% ]

[ Submit ]

Query Deployment Panel

Select the Query operation you are interested in performing from dropdown (add/delete/update/enable-disable):

[ Add new query ⌄ ]

Select the query you want to update:

[ Vehicle count / second at intersection ⌄ ]

Enter the Query Properties:

[ <Enter Query description> ]

[ <Enter Query Name> ]

[ Select stream(s) with their attributes required by the query from the dropdown table ]

[ <Enter Query Operator Name> ]

[ <Enter the namespace location where operator implementation will be uploaded> ]

[ <Upload the operator implementation> ]

[ Submit ]

Query Deployment Panel

Select the Query operation you are interested in performing from dropdown (add/delete/update/enable-disable):

[ Update existing query ⌄ ]

Select the query you want to update:

[ Vehicle count / second at intersection ⌄ ]

Select the query properties you want to update:

[ Query description ⌄ ]

[ <Enter updated query description> ]

[ Submit ]

FIG. 48A

Query Deployment Panel

Select the Query operation you are interested in performing from dropdown (add/delete/update/enable-disable):

[ Delete ⌄ ]

Select the query you want to delete:

[ Vehicle count / second at intersection ⌄ ]

[ Submit ]

Query Deployment Panel

Select the Query operation you are interested in performing from dropdown (add/delete/update/enable-disable):

[ Enable / Disable ⌄ ]

Select the query you want to enable/disable:

[ Vehicle count / second at intersection ⌄ ]

The query is currently enabled. Do you want to disable it?

[ Yes ⌄ ]

[ Submit ]

FIG. 48B

DATA STREAM ANALYTICS AT SERVICE LAYER

CROSS-REFERENCE TO RELATED APPLICATIONS

This Application is a Continuation of U.S. patent application Ser. No. 17/175,100, filed Feb. 12, 2021, which is a Continuation of U.S. patent application Ser. No. 16/096,510, filed Oct. 25, 2018, now U.S. Pat. No. 10,956,423 issued Mar. 23, 2021, which is a National Stage Application filed under 35 U.S.C. § 371 of International Application No. PCT/US2017/029341 filed Apr. 25, 2017, which claims the benefit of U.S. Provisional Patent Application Ser. No. 62/326,894, filed Apr. 25, 2016, the disclosures of which are hereby incorporated by reference as if set forth in their entireties.

BACKGROUND

A data stream is a continuous and dynamic sequence of data (information) in the process of being transmitted between nodes across interconnected communication channels in the form of events, messages, and so on. A data stream is typically data that has not yet been stored in storage such as disk memory. A data stream can be massive and is potentially unbounded in size, time-varying, and in many cases, of high throughput.

A good example of massive, high throughput and dynamic data is Internet traffic data. As per the Internet Live Stats website, a few thousands of petabytes of Internet traffic data is generated every day. Some other examples of data streams are telecommunication data, satellite data, stock market/financial trade data.

Internet of Things/Machine to Machine (IoT/M2M) applications generate a large amount of data streams as well. With the increasing number of "things/machines" in IoT/M2M systems, the volume of the streaming data to and from the IoT/M2M devices is increasing exponentially. FIG. 1 shows connected devices in a smart home setup. These devices continually generate data and communicate with other devices in the system by transmitting/receiving data, leading to continuous generation of large amounts of data streams from distributed sources and devices.

A data stream 'S' can be denoted as a sequence of tuples, where each tuple is of the format $<a_1, a_2, \ldots, a_n>$ where '$a_i$' is the i-th attribute (or property) of the tuple. FIG. 2 shows an example data stream generated by a Global Positioning System (GPS) probe device such as a GPS tracking vehicle. Each line in the figure represents one tuple, where each tuple comprises of six attributes: timestamp, validity of GPS data ('A' denotes that the data is valid), Latitude, Longitude, Altitude, and Speed. (A GPS data stream tuple generally contains many more attributes than shown in FIG. 2. The GPS data stream tuple illustrated in FIG. 2 has been shortened for simplicity.)

In many applications, making sense of data while it is still in the process of streaming is of great importance so that necessary actions or measures can be taken in real time based on the information retrieved from the data stream.

With the exponential growth of streaming data, it is becoming increasingly important to derive meaningful insights from the data in real time. Data stream analytics (or stream analytics or streaming data analytics) is the process of extracting and deriving useful information from continuous and streaming data in real time. Stream analytics include, but is not limited to, detecting or identifying events, patterns or trends from the data streams, computing statistical aggregation over the data streams, and performing correlation and predictive analysis over the data streams. One example application where real time stream analytics finds great usage is the domain of network security where identifying and predicting network attacks in real time can avoid a node or a network of nodes from being compromised. Some other important example applications of data stream analytics are in stock price prediction, dynamic network performance monitoring and tuning, and real time fraud detection.

With the evolution of IoT/M2M and the growing dependence of the world on sensors and devices, there is also a growing need to analyze the rich data generated by these devices, almost as fast as they are generated. For most of this data, the real value lies in exploiting the information hidden in the data in real time and taking instantaneous actions based on the insights provided by the data. Hence, real time data analytics is starting to become an integral part of IoT/M2M systems.

Consider the example of an Intelligent Intersection Traffic System (IITS) which is a framework for efficient and safe management of traffic at the intersection. An efficient implementation of IITS can reduce the traffic collisions at an intersection drastically by taking real time decisions depending on the traffic conditions at the intersection, and generating necessary real time alerts.

Due to the dynamic nature of the data stream, i.e. the time-varying properties of the data stream, processing and analyzing the stream using traditional methods poses several challenges. Analytics is challenging over dynamic data for a number of reasons.

On-the-fly processing—The most fundamental concept of the data stream is that it is in a continuous streaming state, and not stored in any disk or database during the time of its observation. This makes multiple passes over a data stream, i.e. backtracking a data stream, almost impossible. Hence, all the necessary information required for streaming analytics need to be retrieved from the data in a single pass in an incremental fashion.

Massive size of data stream, small processing time and limited main memory constraint—Due to the large, possibly unbounded, size of the data stream, it is generally practically infeasible to temporarily store the entire data stream in disk for real time analysis. In order to perform real time analysis, the data stream needs to be processed and analyzed within a small processing time (depending on the application). Further, the additional requirement of having to analyze the data in real time using a very small processing time, makes it even more infeasible to store the data in the disk for analysis. The overhead of reading data from and/or writing data into the disk (also called disk Input/Output or disk I/O) is very high and adds significant delay to the processing time of data when compared to processing data in main memory (for instance, in Random Access Memory or RAM), also called in-memory processing of data. This additional overhead renders the storage of data unsuitable for real time analysis.

Further, due to the massive size of the data stream and limited size of the main memory, it is practically not feasible to store the entire data stream in main memory. The size of main memory today is generally in the order of Gigabytes, or GB, ($10^9$ bytes) while the size of the data stream can be in the order of Petabytes, or PB, ($10^6$ GB), or more. Hence, in many cases, only the important information from the data, required for the purpose of analytics, is extracted and stored in main memory in a concise fashion.

High throughput of data stream—In many applications, the rate of generation of data can be very high, on the order of Terabytes/second (TB/s) or more. Processing data of such high throughput in a small window of time adds additional challenge to stream analytics.

Due to the dynamic and transient nature of the data stream, it is not practically feasible to use a traditional Database Management System (DBMS) or other traditional batch processing system for stream processing/analysis. The main challenge of using a traditional DBMS for real time analytics arises from the fact that it is not practically feasible to locally store a data stream on a disk or backtrack over a data stream. Hence, the data stream needs to be processed and analyzed in a single pass, unlike in DBMS where stored data can be backtracked over as many times as possible. The single pass constraint over a data stream also implies queries pertaining to the data analysis needs to be long running, continuous and persistent so that the data stream is incrementally analyzed as soon as it is observed. This is contrary to the traditional DBMS where data is generally static and hence the queries can be ad hoc. Table 1 shows the key differences in requirements for processing data stream as compared to the disk resident data (stored in disk).

TABLE 1

Difference in Processing Disk Resident Data vs Data Stream

| Disk Resident Data | Data Stream |
| --- | --- |
| Stored on disk | Not stored to disk |
| Support for ad hoc one time queries | Support for persistent and continuous set of pre-defined queries |
| Random/sequential access of data, unlimited reads | Sequential access of data in a single pass |
| Processed using large disk space | Processed using small and limited memory space |

FIG. 3 shows a general logical framework of Data Stream Processing System (DSPS) 302 or Data Stream Management System (DSMS). This system has a processing engine 304 that continuously manages and processes a data stream. The infeasibility of storing the entire data stream in memory suggests summarizing the observed data stream and storing only important information from the stream in a concise way. We refer to the concise information extracted from the data to summarize the data stream as stream synopsis or stream state. A stream state is generally much smaller in size as compared to the size of the data stream. Hence, the stream state can be stored in memory for faster access.

The DSPS 302 generates stream state depending on the queries running in the DSPS 302. These queries, as discussed above, are long standing and continuous, i.e. the queries need to be predefined so that DSPS generates the corresponding synopsis accordingly. Since the stream state is only the summary of an entire stream, the answers to the query may be approximate. Generally in the case of approximate queries, users or applications interested in deriving results from such queries are given a resource vs. accuracy tradeoff. The larger the size of the memory (and/or processing capacity) allocated for the analytical operation pertaining to the query, the higher the answer.

In order to understand the data stream processing system we consider one of the most fundamental and basic problems: counting. We consider the example of the Intelligent Traffic Intersection System (IITS) with a DSPS 302 installed on the centralized server, known as the traffic control hub. This traffic control hub, for instance, can be a gateway. The traffic control hub uses a DSPS 302 to track the number of cars crossing the intersection in each direction in real time. One of the potential benefits of counting the number of cars is to manage the traffic phase change in real time, i.e., changing the traffic signal from red to green and so on in real time, depending on the traffic flow status at the intersection. Traffic cameras are installed at the intersection, facing each side of the intersection, to capture the video of the surroundings. From a stream analytics context, the video generated by each traffic camera can be considered as a data stream, and each video frame as one data element.

In this case, let us assume that the data stream processing system gets the following query: count the number of cars crossing the intersection in each direction. The traffic control hub 302 uses video analytics techniques to identify cars in the video stream by extracting useful features from the video in real time. The cars are identified and a count of the cars crossing the intersection from each direction is maintained in real time. In this case, the stream state stored in memory maybe as simple as a single integer variable, say count, for each direction of traffic flow. FIG. 4 illustrates this problem in a streaming environment. For simplicity and without loss of generality, we show only the count maintained for the cars moving from left to right in the figure.

For every car that crosses the intersection from left to right, the DSPS 302 at the control hub identifies the car by analyzing the video stream and increases the 'count' variable stored in the memory of the DSPS 302 by 1. For instance, in FIG. 4A, the control hub 302 observes the first car that has crossed the intersection since the start of analysis. It updates the in-memory state "count" from (initially) 0 to 1. In FIG. 4B, the control hub 302 observes a second car crossing the intersection, hence updates the state "count=2". Similarly, in FIG. 4, the state "count" has been updated by the control hub to 5. In order to compute the count of cars, the entire data stream is not required to be stored, i.e., the streaming video as data stream needs to be processed/analyzed in real time. The only information stored in memory for this problem is an updated count, which requires 8 bytes of memory space assuming it is of integer data type. This amount of memory space (8 bytes) is significantly small compared to the gigabytes of streaming video that is generated on a busy intersection.

The above example is a very simple one. Here, the stream state is directly used to answer the query. But in many complex queries, the stream state generally does not contain the answer directly but is used to compute the answer as and when required. A lot of work is being done to design efficient algorithms to maintain small space stream state in memory for real time stream analytics even for different problems of varying complexities.

A distributed data stream processing system is when one or more data streams is processed and analyzed across multiple stream processing nodes to answer a single or multiple queries. Generally, a distributed stream processing system has a coordinator node that coordinates the data communication between the distributed nodes. In the above example (FIG. 4), if the control hub with DSPS 302 functionality performs all the stream analytics operations to answer a query, then it is called a centralized stream processing system.

On the other hand, suppose that some of the video analytics operations are also performed by the traffic cameras instead of the entire analytics being done at the control hub, as shown in FIG. 5. Suppose the traffic cameras 1, 2, 3 and 4 capture traffic coming from east, south, west and north respectively. Each of these cameras generates a video data stream. Suppose these cameras are also installed with stream analytics capability. Hence, in the above example of counting vehicles, some of the video analytics operations are performed by the traffic camera, such as identifying the objects that have high probability of being a vehicle. Now, instead of sending the entire video stream, each traffic camera 1, 2, 3 and 4 only send their respective stream state, S1, S2, S3, and S4 respectively, to the control hub. These states comprise only those objects that have a high probability of being a vehicle. The control hub 302 acts as a coordinator here, and receives the state from each of these cameras. Now the control hub 302 can use a union of S1, S2, S3, and S4 to answer the queries such as the following— Give the overall volume of traffic flow at the intersection. Since the traffic cameras transmit only their respective stream state to the control hub, instead of the entire stream, the communication cost of the data processing is reduced drastically.

This kind of a system significantly reduces the communication cost by sending only the necessary information across the communication channel instead of the entire data stream. A distributed data stream processing system also helps in balancing the load of data stream analytics across the distributed system, since now the control hub gets to manage a data stream of significantly lower volume, hence improving the efficiency of the system.

Current Data Stream Processing Platforms

Work has been done on solving important problems, such as finding maximum/minimum, number of unique elements, frequent items, etc. from a large data stream in real time, using small memory cost. There are many stream processing platforms, open source as well as proprietary, which provide an abstraction to the business or the users to perform data stream analytics, without getting into the intricacies of the architectural details of data stream processing. Such intricacies may include message queueing, scalability, fault tolerance, parallelism, etc.

Examples of data stream processing platforms include Apache Storm, IBM Infosphere Stream and Apache Spark Streaming. These stream processing platforms provide means to capture data in a streaming fashion and provide a platform for fault tolerant and reliable stream processing. These platforms may not directly map to the above data stream processing system (shown in FIG. 3), which gives a logical view of how a data stream is processed in real time, rather than an architectural view of the platforms supporting stream processing.

Apache Storm is an open source distributed stream processing platform. It is a reliable, fault tolerant and scalable system. As shown in FIG. 6, it has two kinds of nodes: Master 602 and Worker 604. The Master node 602 runs the Nimbus daemon that assigns tasks to all the worker nodes 604 and monitors failures in the cluster. The Worker node 604 runs the Supervisor daemon that listens for any work assigned by the Nimbus daemon and spawns worker processes to start/stop the work assigned to the worker node. Apache Storm relies on Zookeeper, a centralized service, for the coordination between the Master node 602 and the Worker nodes 604.

Apache Storm uses three abstractions:
  Spout—source of streams within the computation framework of the Storm processing system,
  Bolt—comprises of the main computation logic, such as maximum, average, to process the data stream. Each bolt processes a set of input data streams and transforms them into another set of output streams using the computation logic, and
  Topology—it is a network of spouts and bolts connected to each other as a "directed acyclic graph". Every application written in Storm is designed as a topology.

FIG. 7 shows an example of a word count application that counts the occurrence of different words from a stream of sentences. The figure represents a topology of spouts and bolts. Multiple spouts may be on different nodes or a single node of a distributed cluster. The Source sends data stream comprising of sentences (in raw format) across two spouts for load balancing. Each spout in turn forwards the stream, with each sentence as a tuple, to their respective Split bolt. Each Split bolt tokenizes the sentence that it receives and counts the number of occurrences of each word in the sentence. The output stream by each Split bolt, with [word, count] as a tuple, is then forwarded to one of the Count bolts, such that the different Count bolts always receive non-overlapping set of words, to avoid same word being counted at multiple bolts. Hence, the spouts or bolts within the same vertical column, shown in FIG. 7, helps in load balancing and parallelization of application, leading to faster and scalable running of application. There are other ways to implement the word count application and FIG. 7 illustrates just one of the approaches.

IBM Infosphere Streams is another popular distributed stream processing platform. It is a fault-tolerant, reliable and scalable system. All the nodes in the IBM Infosphere Streams distributed cluster may equally participate in executing a streams application. Infosphere Streams has the following main concepts:

1) Operators: comprises of computation logic, such as maximum, average, used to transform and manipulate data stream. The operators take a set of data streams as input and transform them based on the computation logic to produce another set of output streams
2) Data Flow Graph: Streams application is written in the form of a graph, such that the nodes of the graph are the operators and the edges connecting the operators are the outgoing stream from one operator connecting to another operator as an input stream.
3) Processing Element (PE): Individual execution units, comprising of one or more operators, that data flow graph are broken down into to enable distribution and parallelization of streams application.

FIG. 8 shows the runtime execution of IBM Infosphere Streams, where one or more jobs are created corresponding to each runtime instance of IBM Infosphere Streams. Each stream application performing certain analytics operation, such as the word count problem, is submitted to a unique job. This stream application is then divided into more than one PEs based on the data flow graph of the application.

The concept of writing a data stream application in IBM Infosphere Stream is very similar to Apache Storm. We use the same word count example as used for Apache storm below in FIG. 9, to illustrate the running of the streams application in IBM Infosphere Streams. In this example, each operator is executed by individual PEs. The PEs in the same vertical column can be parallelized and the ones across horizontal rows can be distributed across multiple nodes.

Apache Spark Streaming is another distributed stream processing platform, which has become very popular recently. It is also a fault-tolerant, reliable and scalable system. However, the approach used by Apache Spark Streaming is different as compared to that of the above mentioned platforms. Apache Spark Streaming 1002 uses micro batch processing in order to process data streams, i.e. dividing the data stream into tiny batches and using the batch processing system, Apache Spark Engine 1004, to process the tiny batches of data, as shown in FIG. 10.

Apache Spark Streaming provides a high level abstraction called discretized stream (D-Stream). D-streams are data streams chopped into batches of small time intervals, called Resilient Distributed Dataset (RDD) and run as small deterministic batch jobs. FIG. 11 shows the concept of D-Stream and RDD.

FIG. 12 illustrates the D-stream processing. The data stream is divided into small batches called RDD based on the time intervals. These RDDs go through several rounds of transformation using the computation/aggregation logic to perform the analytics operations, to produce the final output. RDDs in each vertical column can be transformed independent of RDDs in other columns hence enabling parallelization and efficient load distribution.

The importance of data stream analytics is growing significantly in the IoT/M2M domain. With more and more number of devices connecting to the internet and the growing number of deployments of interconnected IoT/M2M devices, the dependence of these devices and their users on the data is growing too. It is becoming increasingly important to derive some quick insights from these various data streams almost as soon as they are generated. Some of the importance of real time analytics in IoT/M2M are as follows:

1) Real time information extraction/decision making: The IoT/M2M sensors and devices generate large amount of data. Enterprises and businesses can gain a lot by analyzing the data, deriving meaningful insights and act on the results quickly. In many IoT/M2M applications, the device/machine requires to make real time decisions autonomously or by using additional context Or relationships with other devices to take immediate and appropriate actions.
2) Timeliness of Data: In many cases, insights derived from the data generated by a device can result in maximum potential if the data is analyzed in real time, almost as soon as data is generated.
3) Limited Storage Resources: Due to limited resources, it can be cost effective if a part of the device data can be discarded after extracting useful information from it. Data stream analytics can filter, aggregate and analyze data without having to store all of it. The storage requirements, in many applications, can be reduced drastically, by processing the data stream in real time and in memory, and only persisting the resulting information which is of value.
4) Efficiency: In many cases, even if real-time analysis is not required, it can be much more efficient to process data as it is observed rather than storing the data and then doing batch processing to find information.

The above points are also applicable for most of the other domains requiring stream analytics, but these requirements can be strongly related with an IoT/M2M system. There are many vendors/companies that provide robust IoT platforms supporting data stream analytics. The following are the main benefits provided by most of these IoT infrastructures, either via the IoT platform or the integrated stream processing system:

Complex data analytics capabilities
Fault tolerance
Distributed service for load balancing and scalability
Parallel processing These features form an integral and important part of adding data stream analytics as a robust service to an IoT/M2M architecture. Below we discuss about a few popular IoT architectures with data stream analytics capabilities. While Microsoft Azure Stream Analytics (FIG. 13) and Intel IoT platform (FIGS. 14A-B) gives a detailed description of the architecture of IoT platforms, Oracle IoT platform (FIG. 15) illustrates the architectural framework of the service layer with data stream analytics capabilities. These platforms are very IoT specific and use DSPS concepts discussed above as a component for their data stream analytics.

FIG. 13 shows the architectural framework of the Microsoft Stream Analytics platform. The data stream produced by the Event Producers is received by the Ingestor (the Event Hub), which is based on a publish-subscribe model and is used to consume large volumes of data at high rates. This serves as a single collection point for data streams from various applications. Once a data stream is received by the Ingestor, it is analyzed using the stream processing system and then sent out for long term storage.

The IoT platform uses Microsoft Azure Streaming service for data stream processing. Microsoft Azure Streaming is a Microsoft proprietary stream processing cloud service used for real time analytics. This system uses complex data stream analytics modules such as a machine learning module. The IoT devices can be registered to this system using the device registration capabilities. As an alternative, this platform also gives the flexibility of adding Apache Storm as a stream processing system in the infrastructure.

FIGS. 14A-B show the detailed architectural framework of the Intel IoT platform. The data stream is transmitted from the Gateway to the stream processing system via a Load Balancer. This system also uses cloud service for data stream analytics.

FIG. 15 shows the IoT service layer proposed by Oracle, which has integrated data stream analytics as one of the services at the service layer, under Event Processing and Big Data & Analytics. The real time analytics service of the Oracle service layer is capable of performing complex event stream processing and uses the query language Continuous Query Language (CQL) for query processing. It is a proprietary service layer for IoT by Oracle, and is made scalable and distributed by using Oracle licensed products.

This section briefly introduces the background information related to the service layer 1602. From a protocol stack perspective, a service layer 1602 is typically situated above the application protocol layer 1606 and provides value added services (e.g. device management, data management, etc.) to applications 1604 (see FIG. 16 for illustration) or to another service layer. Hence a service layer 1602 is often categorized as 'middleware' services.

An example deployment of an M2M/IoT service layer 1602, instantiated within a network, is shown in FIG. 17. In this example, a service layer instance 1602 is a realization of the service layer 1602. A number of service layer instances 1602 are deployed on various network nodes (i.e. gateways and servers) for providing value-added services to network applications, device applications as well as to the network nodes themselves. Recently, several industry standard bodies (e.g., oneM2M—"oneM2M-TS-0001 oneM2M Functional Architecture-V-2.4.0") have been developing M2M/IoT service layers to address the challenges associated with the integration of M2M/IoT types of devices and applications into the deployments such as the Internet, cellular, enterprise, and home networks.

An M2M service layer 1602 can provide applications and devices access to a collection of M2M-oriented service capabilities. A few examples of such capabilities include security, charging, data management, device management, discovery, provisioning, and connectivity management.

These capabilities are made available to applications via Application Programming Interfaces (APIs) which make use of message primitives defined by the M2M service layer 1602.

The goal of oneM2M is to develop technical specifications which address the need for a common service layer that can be readily embedded within hardware apparatus and software modules in order to support a wide variety of devices in the field. The oneM2M common service layer supports a set of Common Service Functions (CSFs) (i.e. service capabilities), as shown in FIG. 18. An instantiation of a set of one or more particular types of CSFs is referred to as a Common Services Entity (CSE) 1802 which can be hosted on different types of network nodes (e.g. Infrastructure Node (IN) and Middle Node (MN), and Application-Specific Node (ASN)). Such CSEs are termed IN-CSE, MN-CSE and ASN-CSE respectively as defined in oneM2M-TS-0001 oneM2M Functional Architecture-V-2.4.0. The CSEs provide the service capabilities to other CSEs 1802 as well as to Application Entities (AEs) 1804. Typically, AE 1804 represents an instantiation of application logic for end-to-end M2M solutions and examples of the AE 1804 can be an instance of a fleet tracking application, a remote blood sugar monitoring application, a power metering application, or a controlling application, etc.

Initially, oneM2M service layer was developed to be compliant to the Resource-Oriented Architecture (ROA) (oneM2M-TS-0001 oneM2M Functional Architecture-V-2.4.0) design principles, in the sense that different resources are defined within the oneM2M ROA RESTful architecture (as shown in FIG. 19). A resource is a uniquely addressable element in the architecture and can be manipulated via RESTful methods such as Create, Retrieve, Update, and Delete. These resources are addressable using Uniform Resource Identifiers (URIs). A resource may contain child resource(s) and attribute(s).

Recently, oneM2M has started developing an M2M Service Component Architecture (as shown in FIG. 20), to consider deployments that are not RESTful based. This architecture is primarily suitable for the infrastructure domain where the CSE is viewed as a set of service components. It largely re-uses the existing service layer architecture shown in FIG. 19 but within the service layer it organizes various M2M services and multiple services into service components. In addition to existing reference points, the SoA architecture introduces the inter-service reference point Msc. Communication between M2M Service Components (passing over the Msc reference point) utilizes a web service approach, which is the most popular technology for building Service-Oriented Architecture (SOA)-based software systems.

SUMMARY

Data Stream analytics (or real time analytics) involves processing and analyzing the streaming data in real time. It is the process of extracting and deriving useful information from continuous and streaming data in real time. A few types of real time analytics operations that can be performed on a data stream include pattern/anomaly detection, statistical aggregation, predictive analysis, machine learning. Data stream analytics plays a key role in IoT/M2M system due to the need to extract insightful information from the IoT/M2M device generated data in real time.

Since the IoT service layer acts as a middleware between the M2M devices and the enterprise infrastructure servers, responsible for data management and other services in all the intermediate nodes, the stream analytics capabilities can be integrated at the IoT/M2M service layer. The real time analysis can be performed on the data stream close to the source of generation of data, before the data is stored by the service layers at the data collection points (which is different from the traditional data analytics that are conducted normally after data get stored).

Existing IoT/M2M platforms depend on cloud services at different levels (such as the cloud services connected to the edge devices or the gateways) of the IoT platforms for data stream analytics. No modular design for physical service layer nodes is described in the literature for data stream analytics. A modular and distributed architecture for data stream processing and analysis is described to incorporate data stream analytics capabilities, called Data Stream Analytics Service (DSAS) in the IoT/M2M service layer. Each service layer node hosting DSAS can be been split into two independent modules, Stream Forwarder and Stream Analytics Engine. Stream Forwarder is a light weight processing modules that can be responsible for data preprocessing and routing, whereas Stream Analytics Engine can be responsible for performing actual analytics on the data stream. Separating the two functionalities enables the service layer nodes to efficiently distribute stream analytics tasks across multiple nodes.

Current service layers, such as oneM2M, lack a standardized service to provide data stream analytics capabilities. Data analytics capabilities are enabled only for the data that has already been stored. A detailed end to end solution of a standard service is described to enable distributed stream analytics capabilities at the IoT/M2M service layer. Having a standard solution for integrating data stream analytics in the service layer will enable data stream real time analysis across multi-domain applications and across different vendors.

Embodiments include:
  A standard service to enable data stream analytics capabilities at the IoT/M2M service layer, called Data Stream Analytics Service (DSAS)
  Architectural layout and components of DSAS
  Detailed operational procedures of DSAS
  Distributed layout of DSAS hosting nodes in service layer This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein:

FIG. 4A-C are diagrams that illustrate a counting problem in data stream.

FIGS. 21A-B is a diagram that illustrates an Intelligent Intersection Traffic System.

FIG. 39 is a diagram that illustrates a oneM2M resource for DSAS.

FIG. 40 is a diagram that illustrates a <streamDescriptor> resource.

FIG. 41 is a diagram that illustrates a <queryDescriptor> resource.

FIG. 47 is a diagram that illustrates a GUI for DSAS Clients to trigger a query.

FIGS. 48A-B are a diagram that illustrates a GUI for query deployment.

DETAILED DESCRIPTION OF ILLUSTRATIVE EMBODIMENTS

Figure 1:
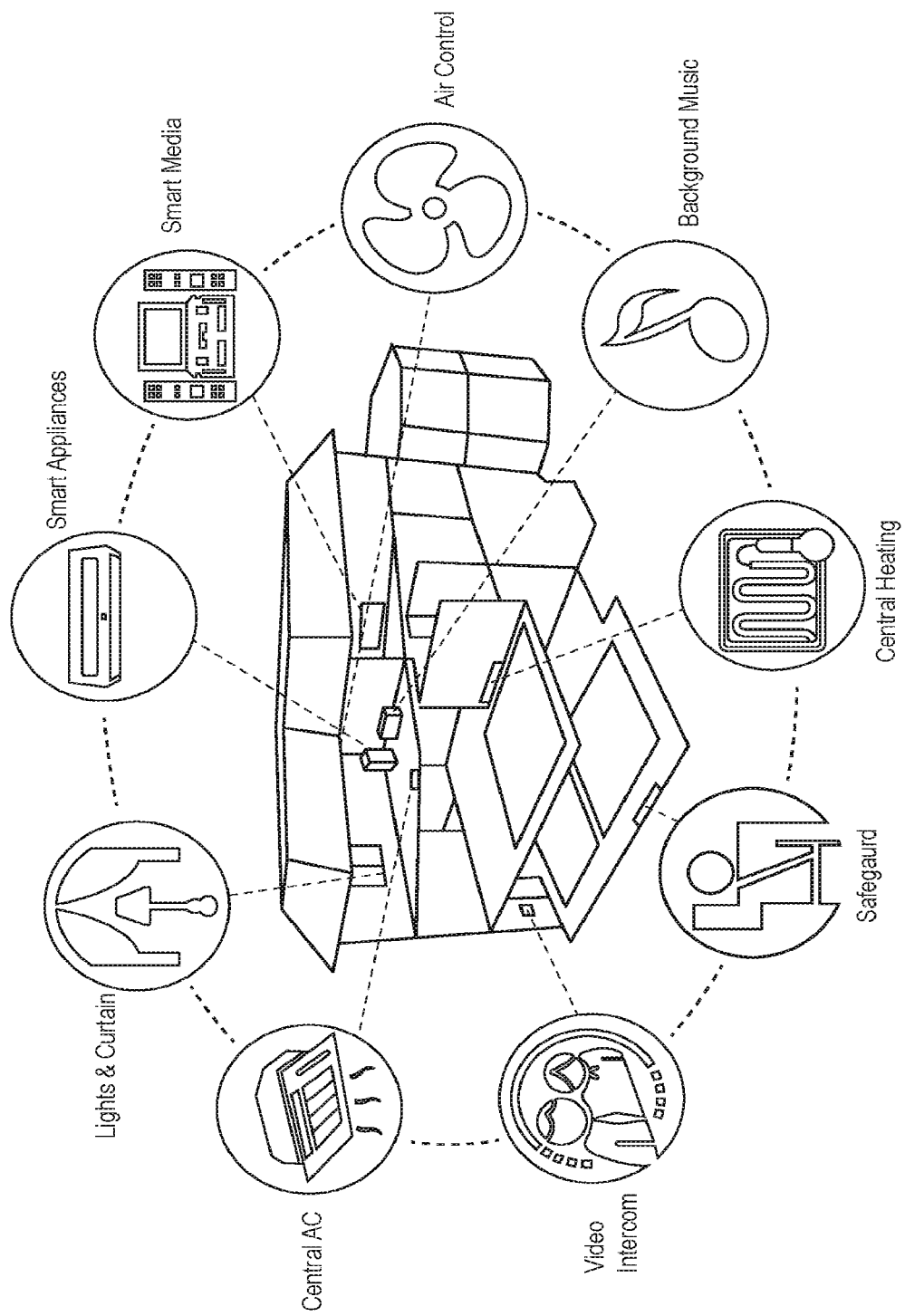
FIG. 1 is a diagram that illustrates a data stream in smart home.
Figures 2, 3:
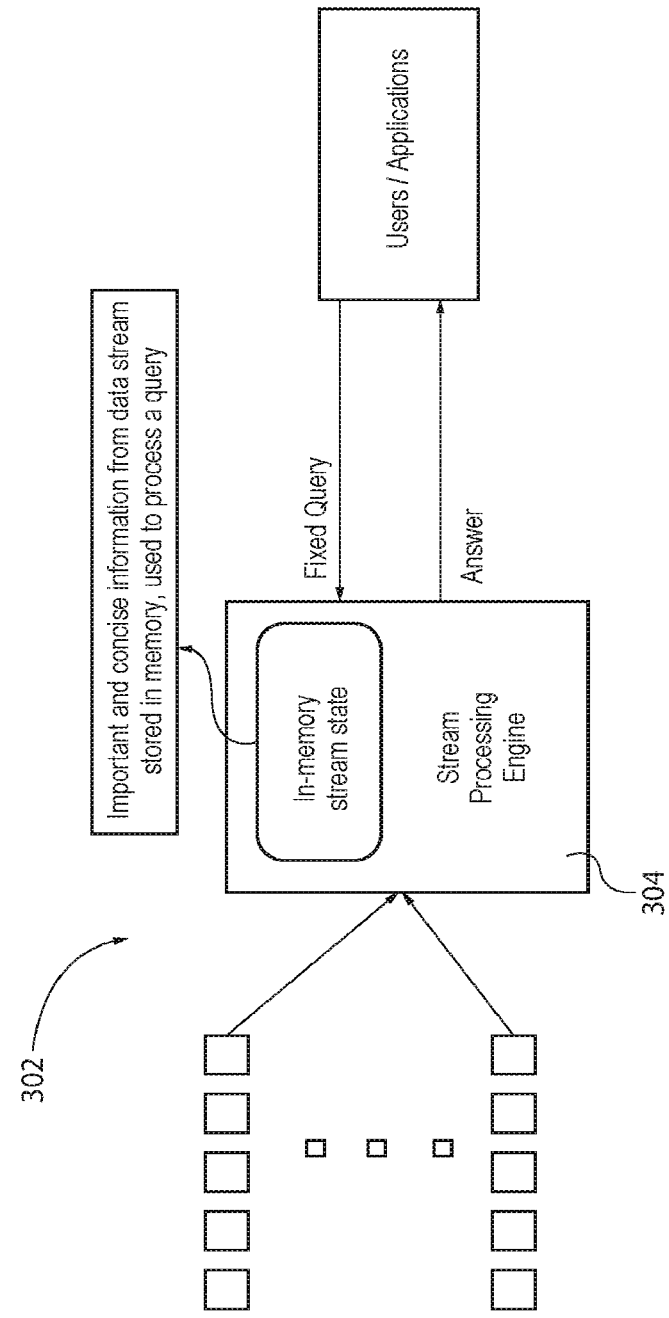
FIG. 2 is a diagram that illustrates an exemplary data stream from a GPS probe device.
FIG. 3 is a diagram that illustrates a general logical framework of Data Stream Processing System (DSPS).
Figure 4C:
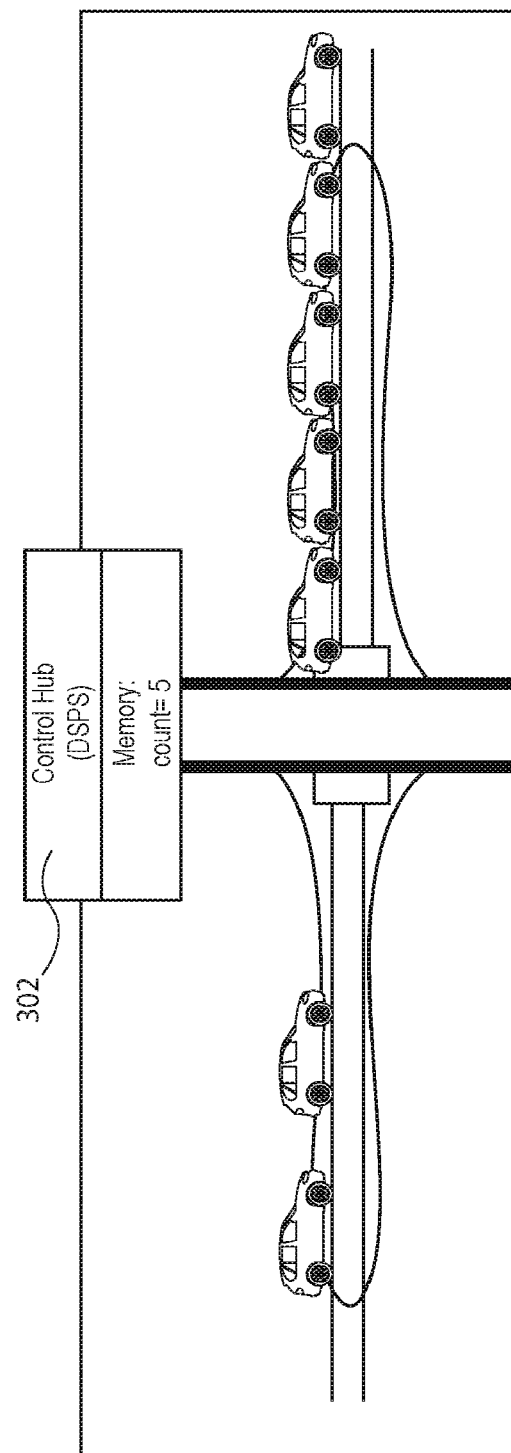
Figure 5:
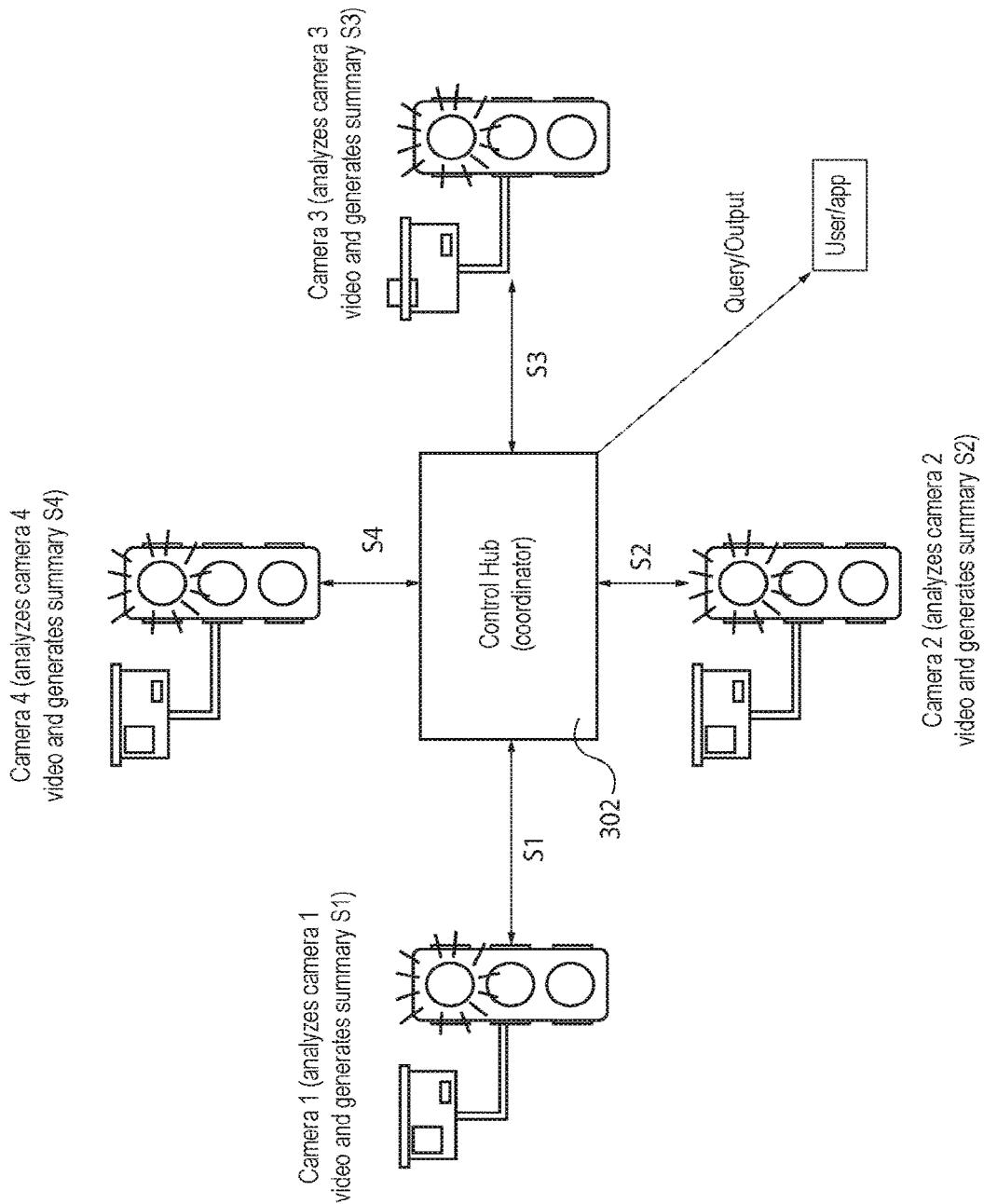
FIG. 5 is a diagram that illustrates an exemplary distributed data stream processing system.
Figure 6:
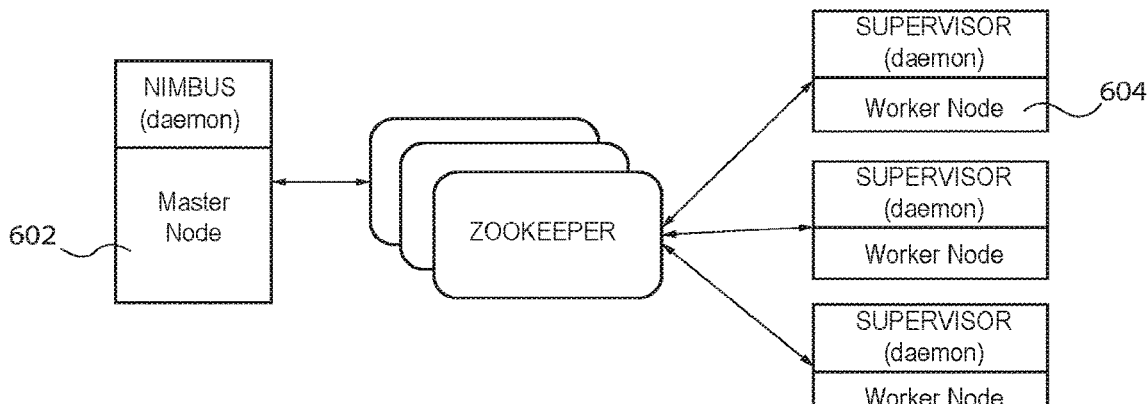
FIG. 6 is a diagram that illustrates an Apache Storm architectural layout.
Figure 7:
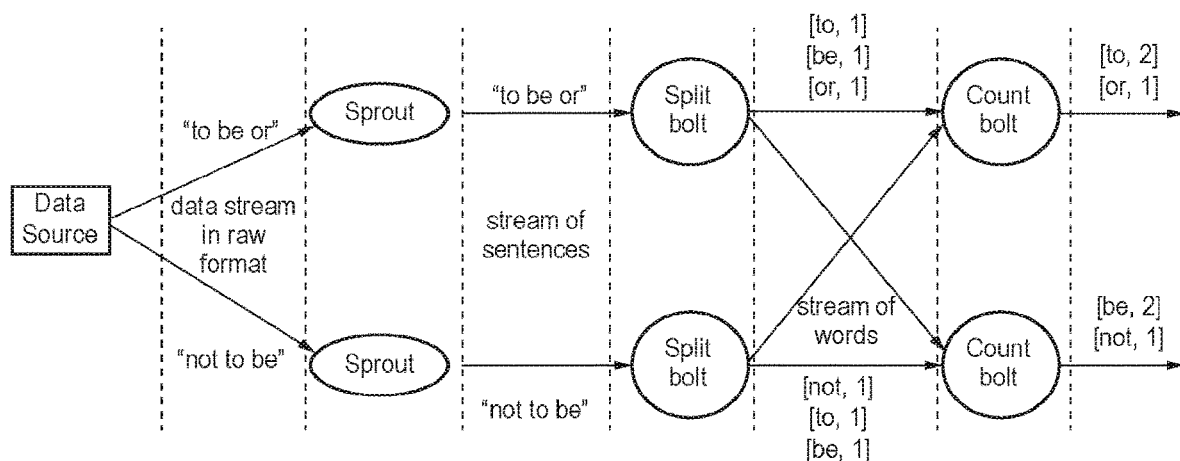
FIG. 7 is a diagram that illustrates an Apache Storm topology for the word count application.
Figure 8:
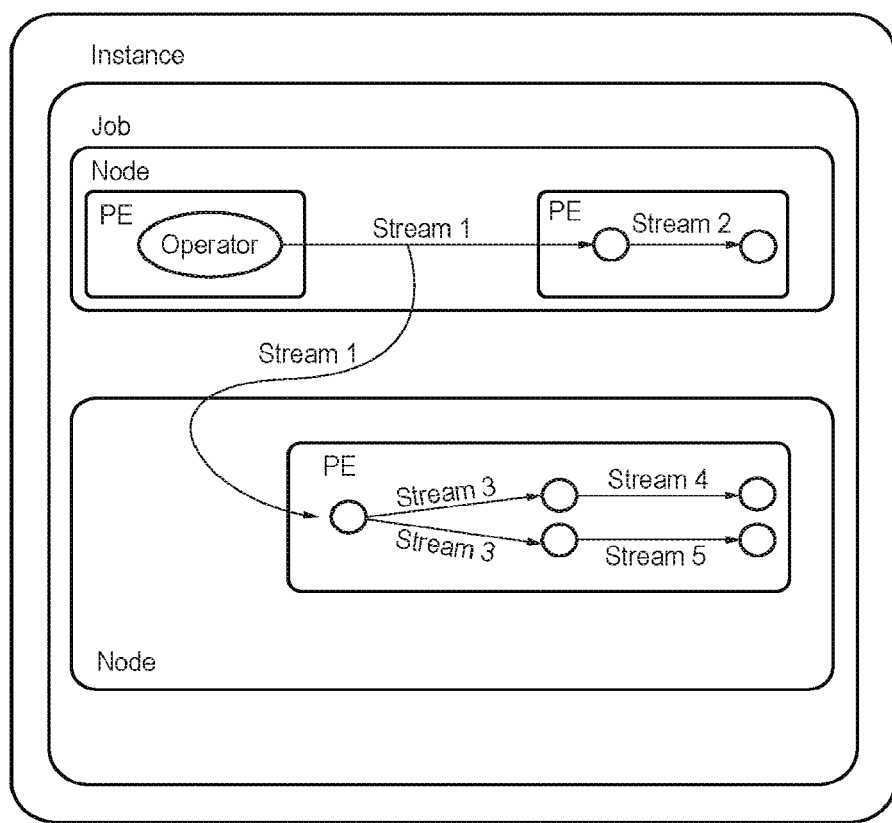
FIG. 8 is a diagram that illustrates IBM Infosphere streams runtime execution.
Figure 9:
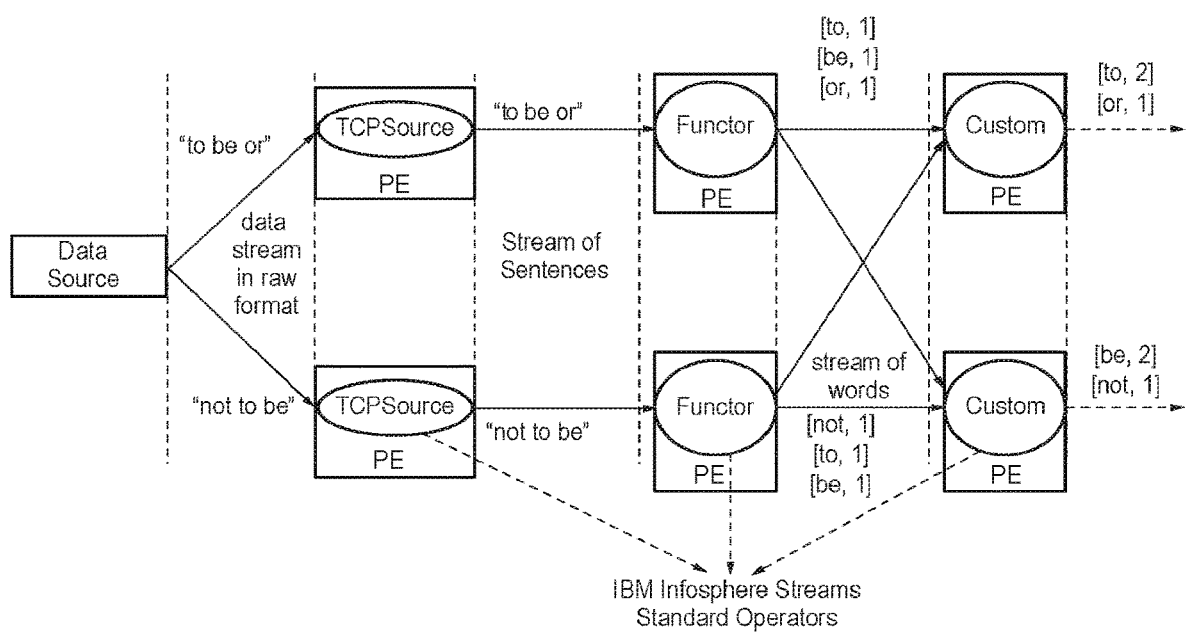
FIG. 9 is a diagram that illustrates IBM Infosphere streams data flow graph for word count example.
Figure 10:
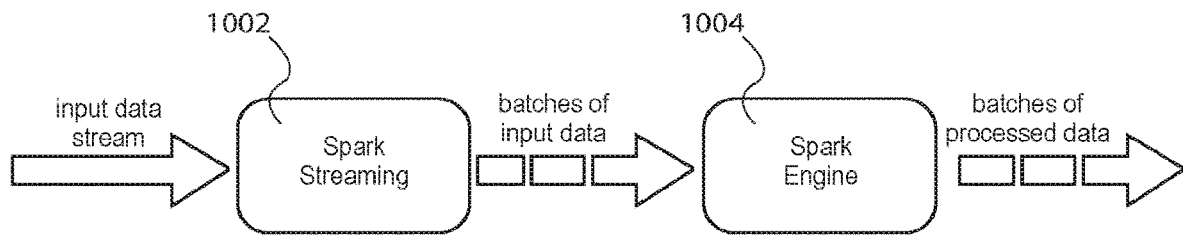
FIG. 10 is a diagram that illustrates micro batch processing in Apache Spark streaming.
Figure 11:
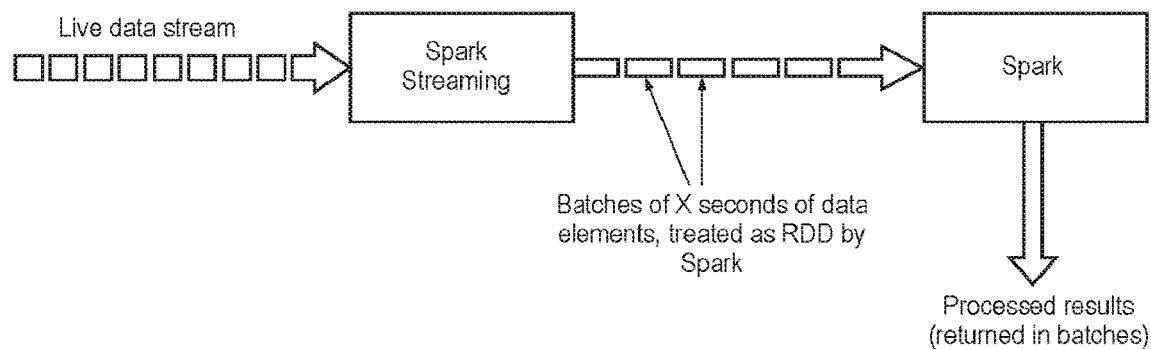
FIG. 11 is a diagram that illustrates Apache Spark streaming and Resilient Distributed Dataset (RDD).
Figure 12:
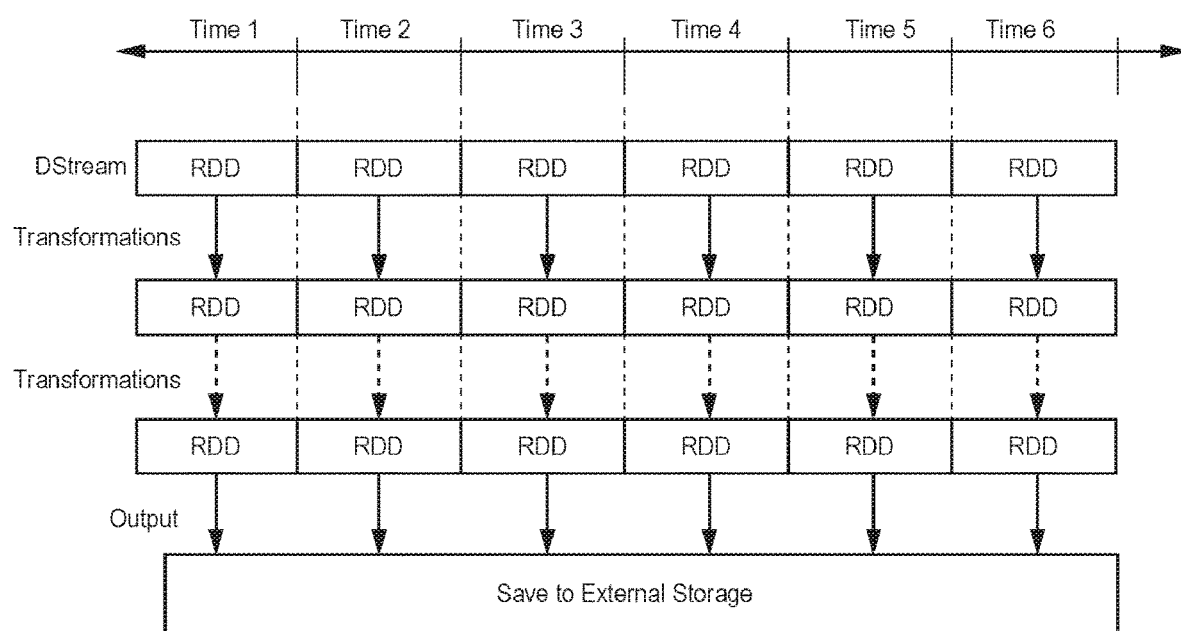
FIG. 12 is a diagram that illustrates discretized stream processing in spark streaming.
Figure 13:
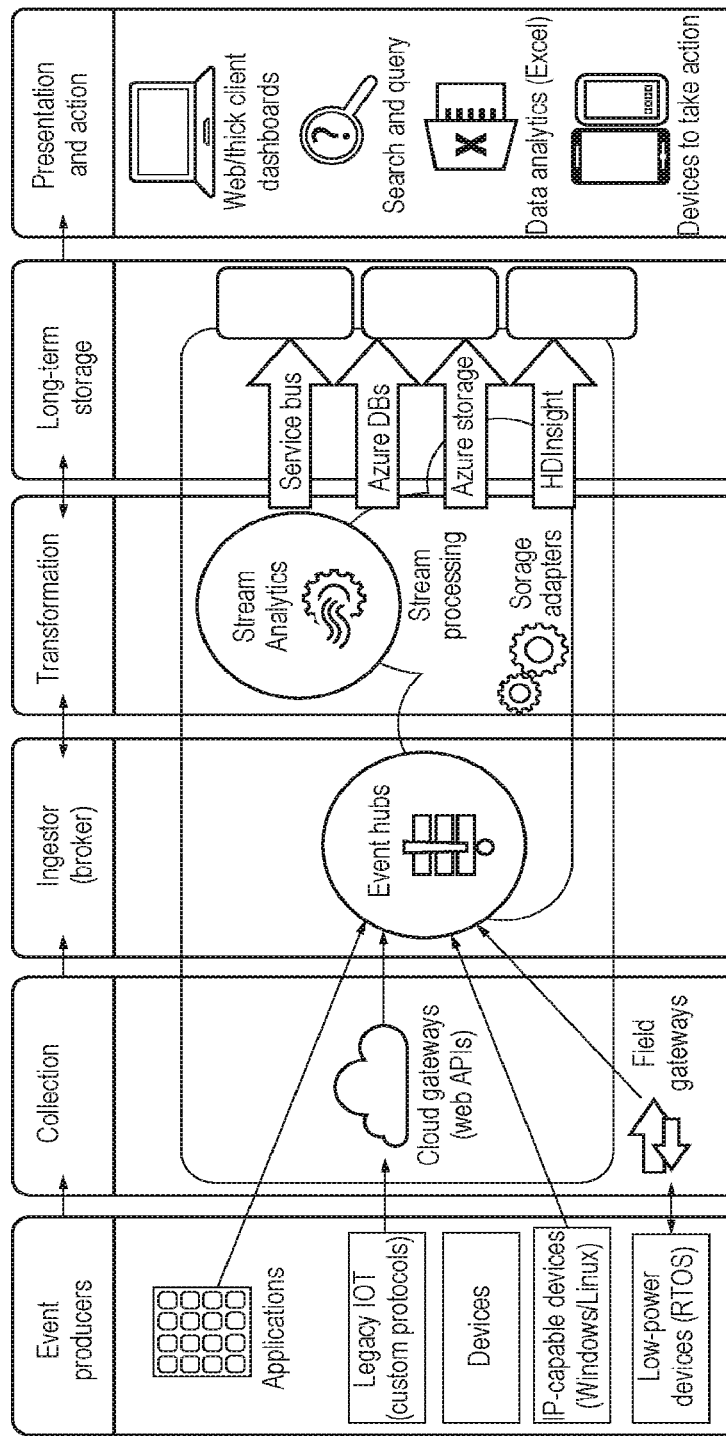
FIG. 13 is a diagram that illustrates an architectural framework of Azure Stream analytics platform for IoT.
Figure 14A:
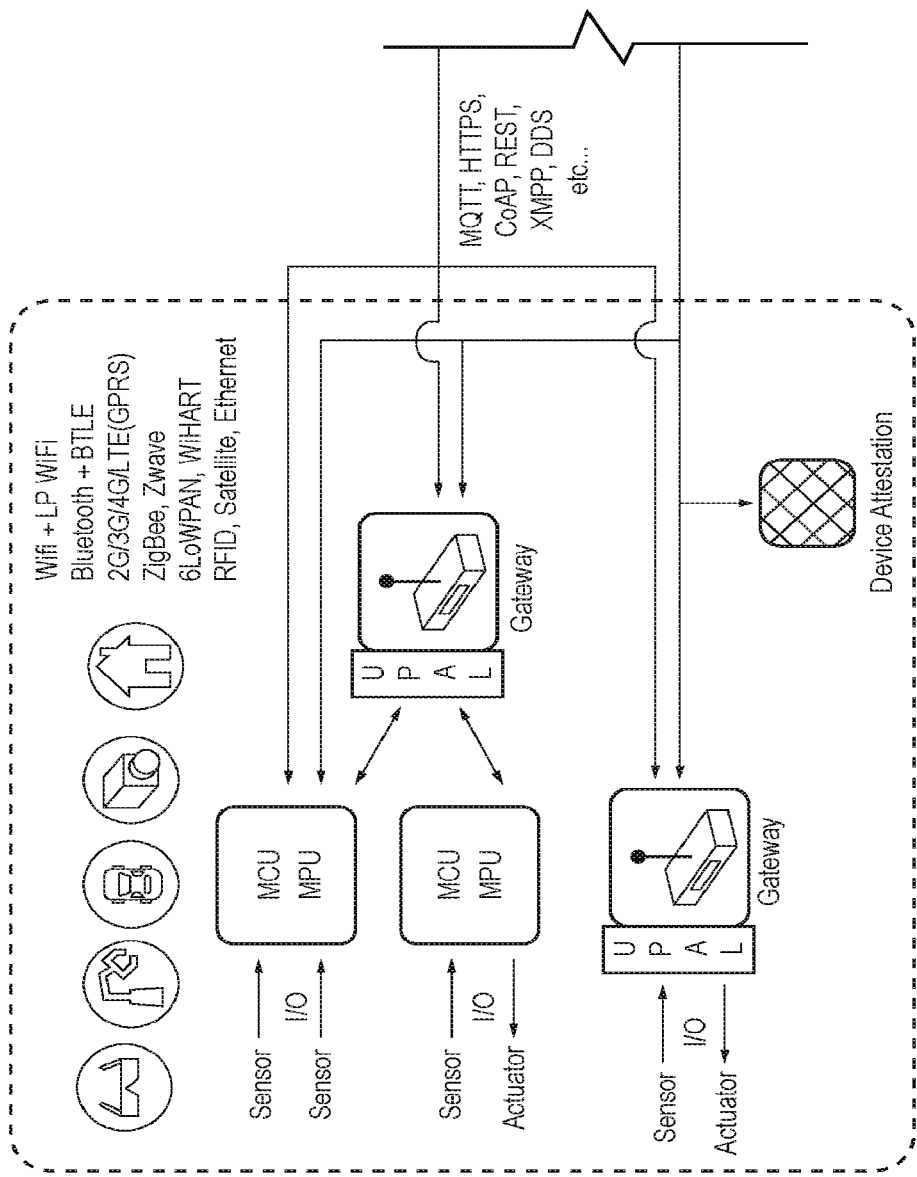
FIGS. 14A-B is a diagram that illustrates an architectural framework for IoT Platform by Intel.
Figure 14B:
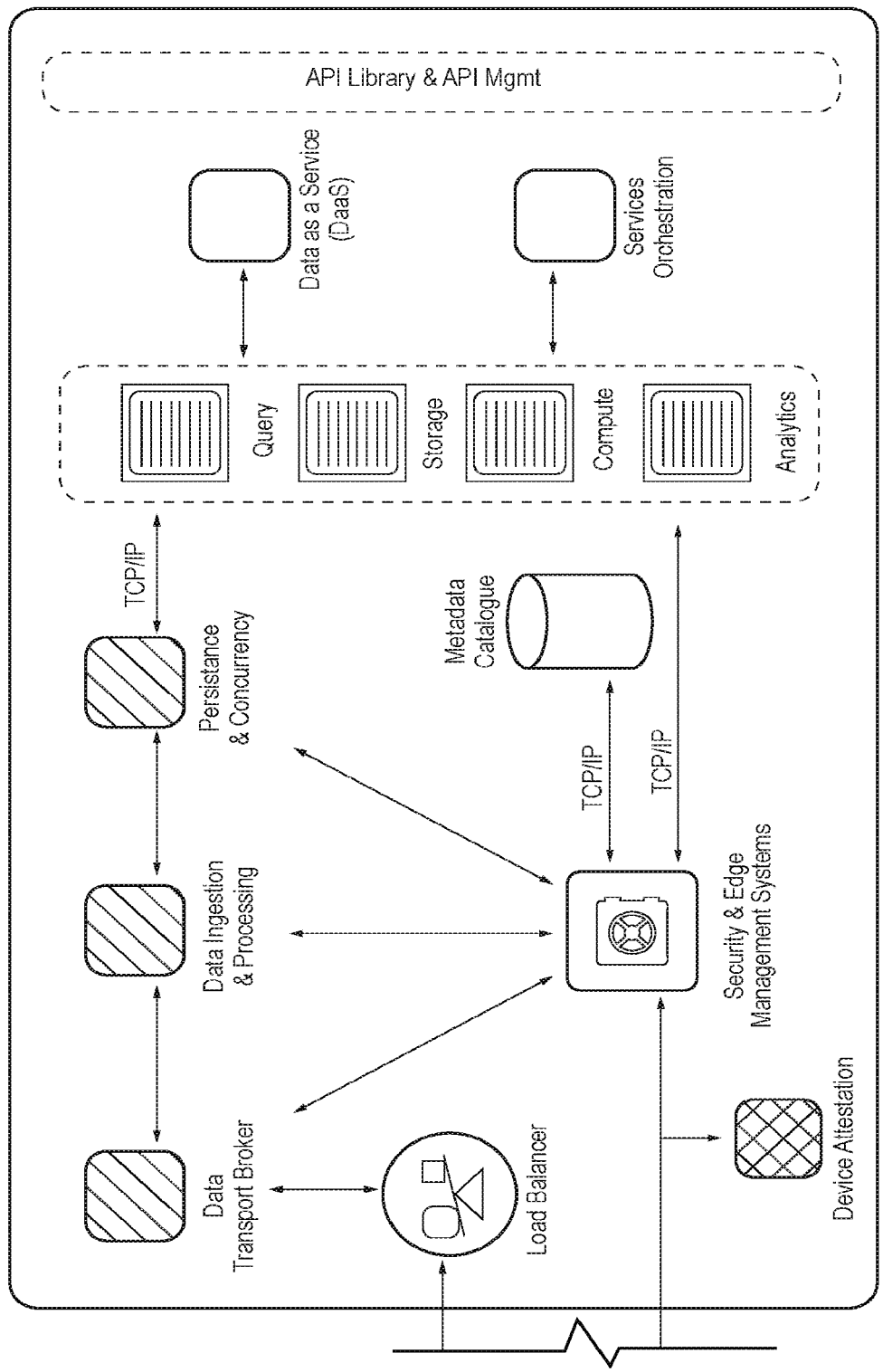
Figure 15:
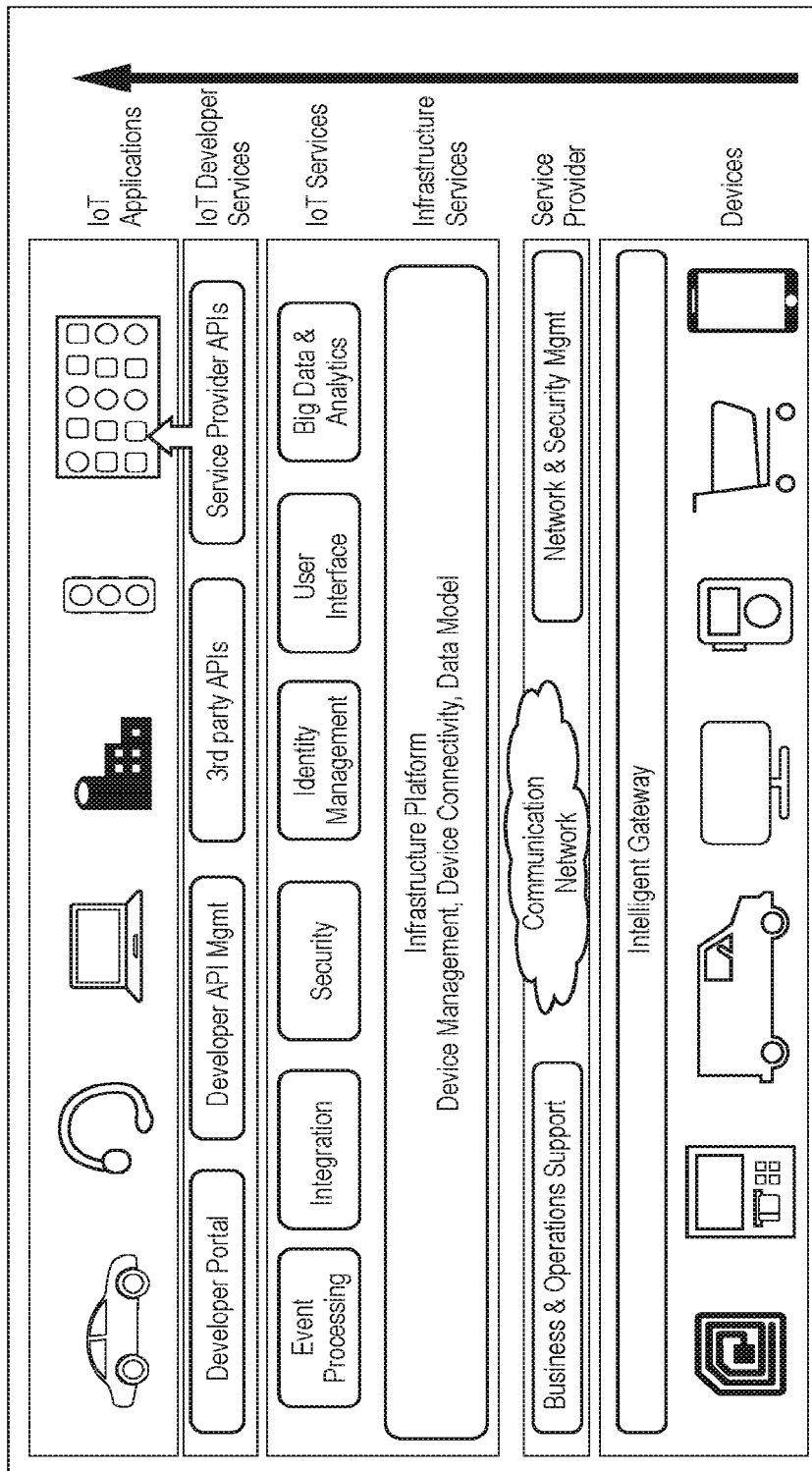
FIG. 15 is a diagram that illustrates an architectural framework for IoT Service Layer by Oracle.
Figure 16:
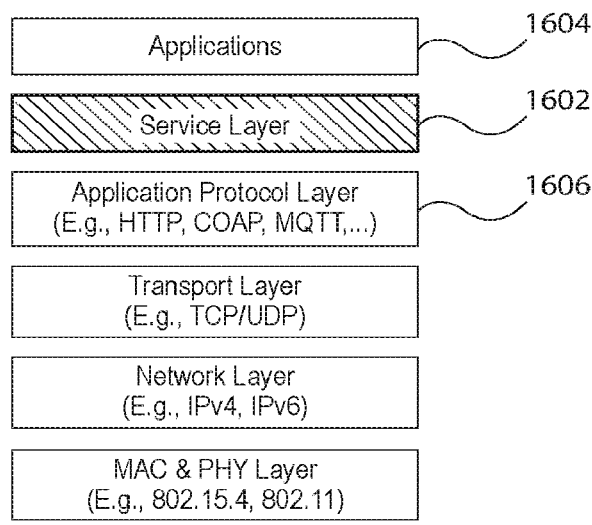
FIG. 16 is a diagram that illustrates an exemplary protocol stack supporting a service layer.
Figure 17:
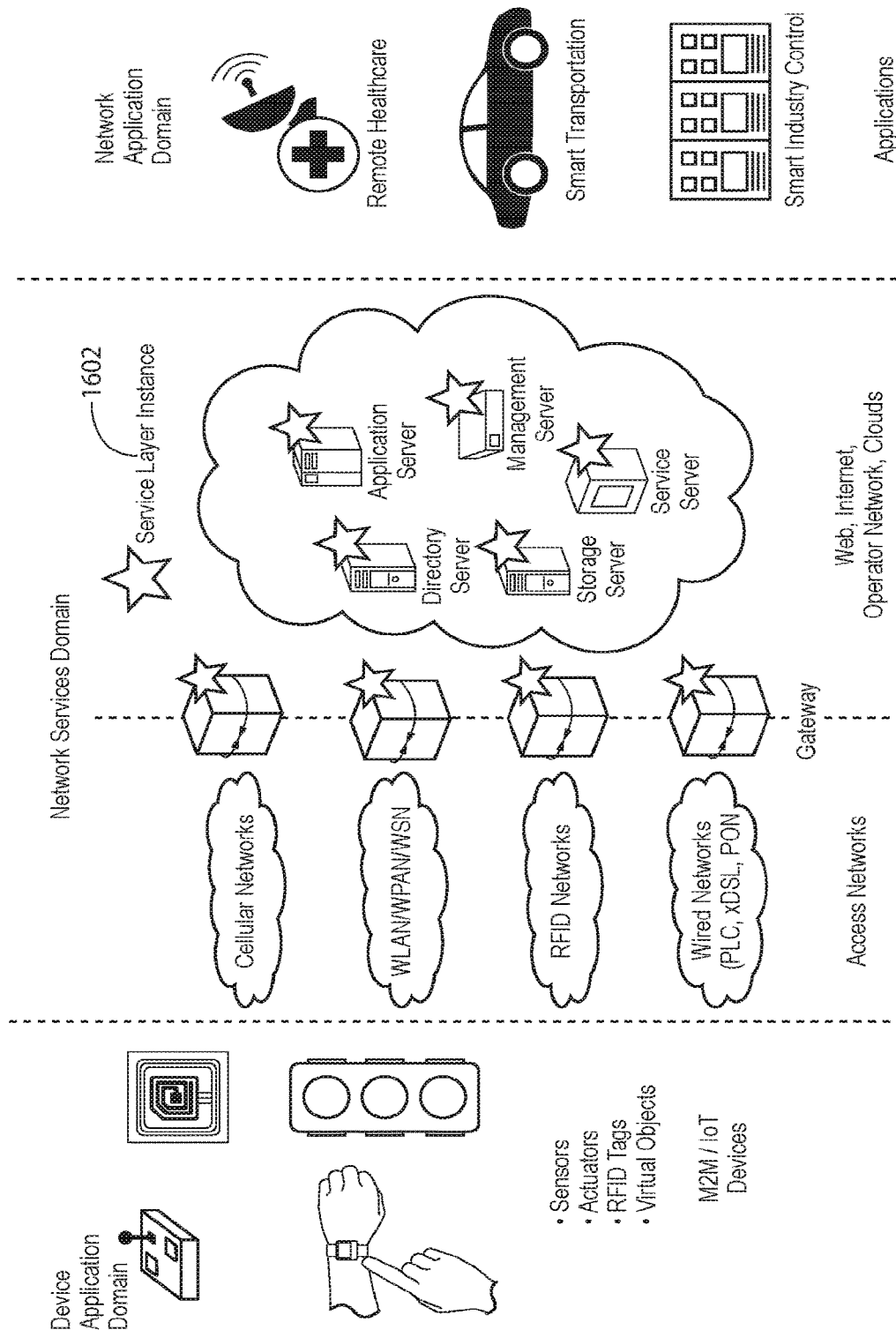
FIG. 17 is a diagram that illustrates an exemplary M2M/IoT service layer deployment within a network.
Figure 18:
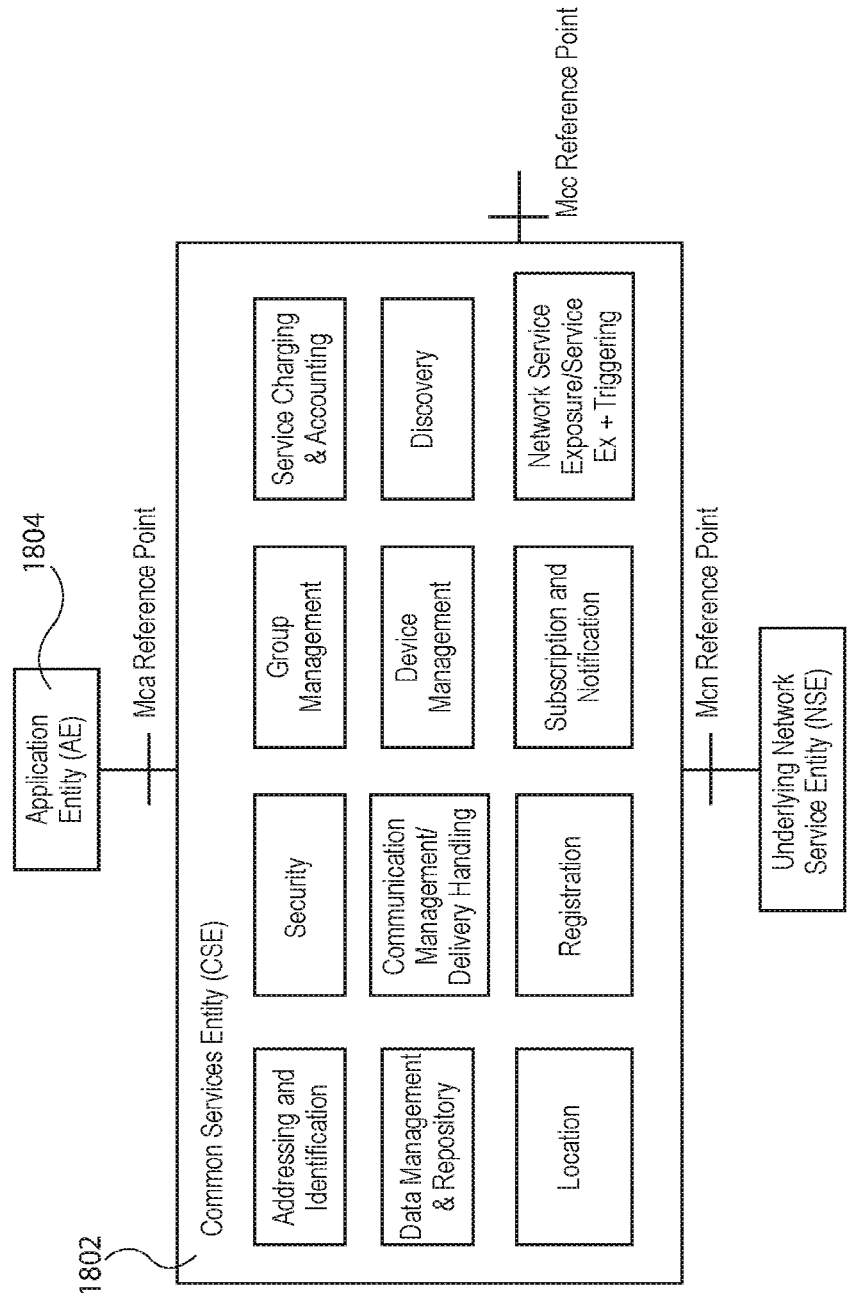
FIG. 18 is a diagram that illustrates Common Services Functions (CSFs) in oneM2M Service Layer.
Figure 19:
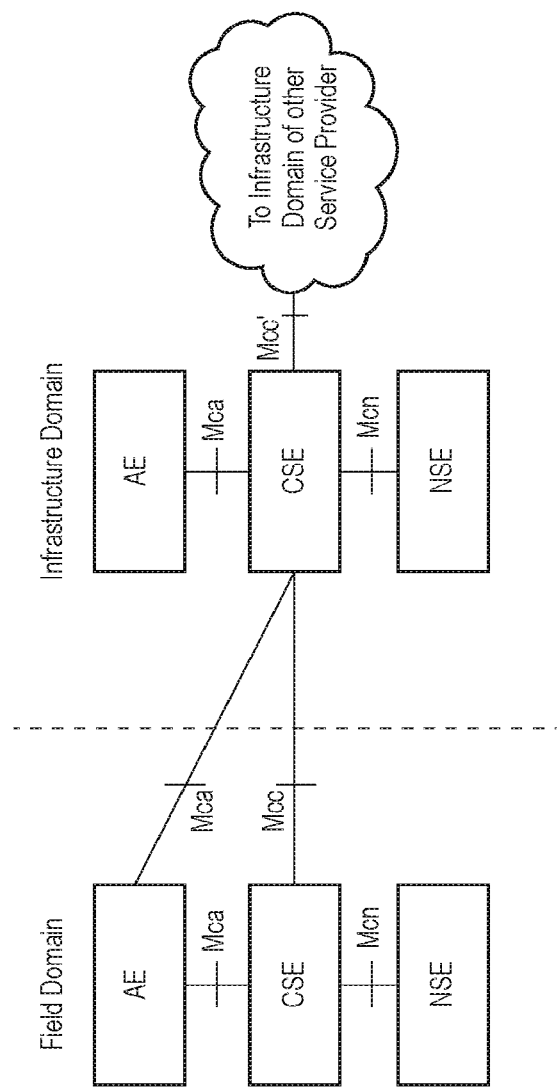
FIG. 19 is a diagram that illustrates a oneM2M service layer Resource-Oriented Architecture (ROA).
Figure 20:
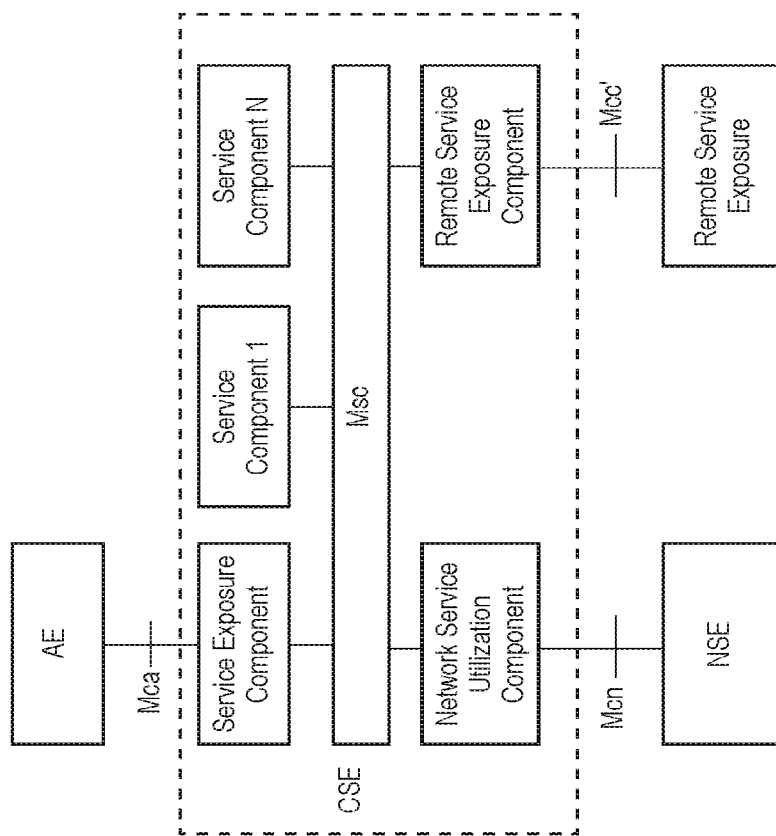
FIG. 20 is a diagram that illustrates a oneM2M Services Component Architecture.

In this section, we review the Intelligent Intersection Traffic System (IITS) case with more details in order to justify why service layer needs stream analytics capability and how it can help in this IITS use case or other realistic applications.

The IITS can be implemented at different levels. At the simplest level, the traffic lights at the intersection are made smart to automatically change phases based on the traffic conditions, and the alert systems are made intelligent to generate real time alerts to warn cars and pedestrians of any possible collisions based on the traffic situation. At the most complex level, the intersection does not have a traffic or stop signal and the vehicles are all expected to be autonomous. A central coordinator at the intersection, say we call it the Intersection Management Gateway, directly communicates with all the vehicles within the communication range from the intersection, guiding them to change lanes, reduce/increase speed or take other necessary actions to cross the intersection efficiently, avoiding collision with other vehicles, bicycles or pedestrians.

In this system, the end devices, such as the GPS probes and the sensors installed in the vehicles, the traffic cameras at the intersection and other road sensors, transmit continuous stream of traffic data (for instance, GPS data stream by GPS probes, video stream by traffic cameras, etc) to the Intersection Management Gateway, that in turn analyzes the traffic data received from the devices to make real time decisions for efficient traffic management at the intersection. The Intersection Management Gateway generally also forwards this traffic data to the infrastructure servers and cloud servers for further analysis for better future predictions and correlational analysis, and possible permanent storage. In this use case shown in FIGS. 21A-B, for simplicity, we considered only GPS probe in vehicles and traffic camera as the two types of M2M devices.

The Intersection Management Gateway is able to perform real time decision making due to the stream analytics services hosted at the gateway. The streaming analytics service at the gateway equips the gateway to process and analyze the traffic data. The stream analytics is mainly performed based on the queries that it receives from devices, users or applications.

Just for illustration, below are two simple example queries made on this system:

1. Query 1: Calculate the time to collision between any two vehicles within the communication range of an intersection—This query uses GPS data and traffic camera video analysis to make real time decisions of how cars should change lanes and change speeds or stop, if need be, to cross the intersection and avoid collisions
2. Query 2: Calculate the time to collision between any car within communication range of the intersection and a pedestrian—This query uses GPS data and road sensors to send out real time alerts to pedestrians if there is a risk of collision and warn the cars about the pedestrians if there is a chance of collision.

The service layer of an IoT/M2M system plays a key role as a middleware, acting as a bridge between the end devices, infrastructure servers and providing necessary services and infrastructure to improve operational efficiencies. The IoT/M2M service layer is responsible for managing data between the end devices and the enterprise infrastructure, along with each intermediate node, via data management and other services, providing needed reliability and security during the entire lifecycle of the data.

Figure 21B:
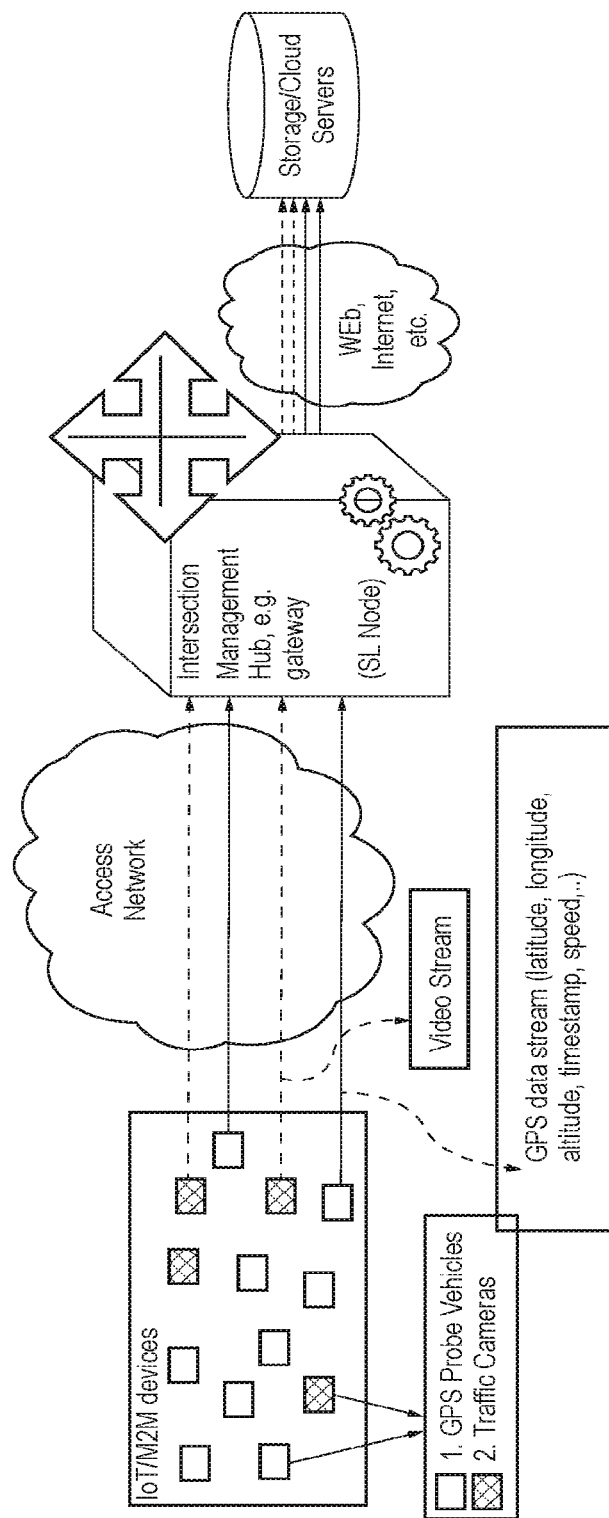

In order to implement the IITS, and similarly other smart IoT/M2M solutions, such that the intersection is efficiently managed in real time, the service layer is given stream analytics capabilities because the data is managed by the service layer during the entire lifecycle of the data. For example, as shown in FIGS. 21A-B, the Intersection Management Hub receives the data stream continuously over the network channel, and extracts useful traffic information from the data to efficiently manage the traffic at the intersection before the data is forwarded to the storage nodes of the service layer. In this use case, the decision making has to be performed right after the data is generated (i.e. in real time), and before it stored at the intermediate collection points of the service layer. Storage of data into the disk (e.g magnetic disks, Solid State Drives (SSDs)) and later retrieving it for analysis is not suitable for real time analytics for the following reasons:

Disk Input/Output (I/O) operations due to writing data into or reading data from the disk adds additional significant delays due to I/O overheads. Processing data stored in a disk is slower than processing data on the fly using in-memory information by a magnitude in the order of tens and hundreds.

The process of storing data into the disk has other overheads too, e.g. indexing the data, which adds further delays unsuitable for real time analysis.

As stressed before, real time analytics has received a lot of focus by most of the enterprises and industries, in the context of an IoT/M2M system. Hence, it is very important to integrate data stream analytics capabilities in an IoT/M2M system, which has been discussed in the previous use case. Now, since the IoT service layer provides various services for the entire lifecycle of the data within an end to end IoT system, it is very useful to add the data stream analytics capabilities to the service layer of an IoT/M2M system.

By adding data stream analytics as another service at the IoT/M2M service layer, necessary services can be availed to derive useful insights from the data in real time, and it can be ensured that real time analytics is performed on the data stream before the data is stored at any of the intermediate service layer nodes or permanent storage nodes at the infrastructure servers. There are many studies, such as Fog Computing and Cloudlet, that have proposed techniques to enable real time analytics as close to the data source (edge) as possible. However, the following issues have not been fully addressed by the existing solutions and are the major focus of this work.

In the current existing IoT platforms, most of the techniques to enable efficient real time analytics in IoT are implemented on cloud servers or virtual machines. The cloud system is built in a hierarchical and federated fashion to optimize data stream analytics near the edge. However, there is almost no focus on building a modular system for incorporating stream analytics capabilities on the physical service layer nodes of IoT/M2M system near the edges, such as on gateways or routers.

In fact, within IoT/M2M service layer scenario, it is very important to build a modular streaming analytics system at the service layer nodes, with defined independent functionalities for each separate module so that the streaming analytics architecture can be incorporated into service layer with high flexibility and robustness. Back to the example shown In FIGS. 21A-B, since the Intersection Management Hub is close to the edge, the amount of resources available to the hub might be limited. In such cases, it is desired to have a framework so that complex analytics can be moved to a more powerful node farther away from the edge and light weight stream processing is performed by the nodes near the edge. A modular design of stream analytics capability at service layer nodes can be used.

Current IoT/M2M service layer standardization efforts do not support data stream analytics—As discussed before, several proprietary as well as open source architectures have been proposed to integrate stream analytics in IoT. However, existing deployments are mostly proprietary and specific to a certain industry. Currently, there is no standard streaming analytics service in IoT/M2M service layer that can enable streaming analytics capabilities across multi domain applications. Current IoT/M2M service layer standards, such as, oneM2M, provide mechanisms to store the data retrieved from the sensors or other M2M devices to the M2M servers for later retrieval, reasoning and analysis. A service can extract useful information from the data in real time before it is stored anywhere.

Figure 22:
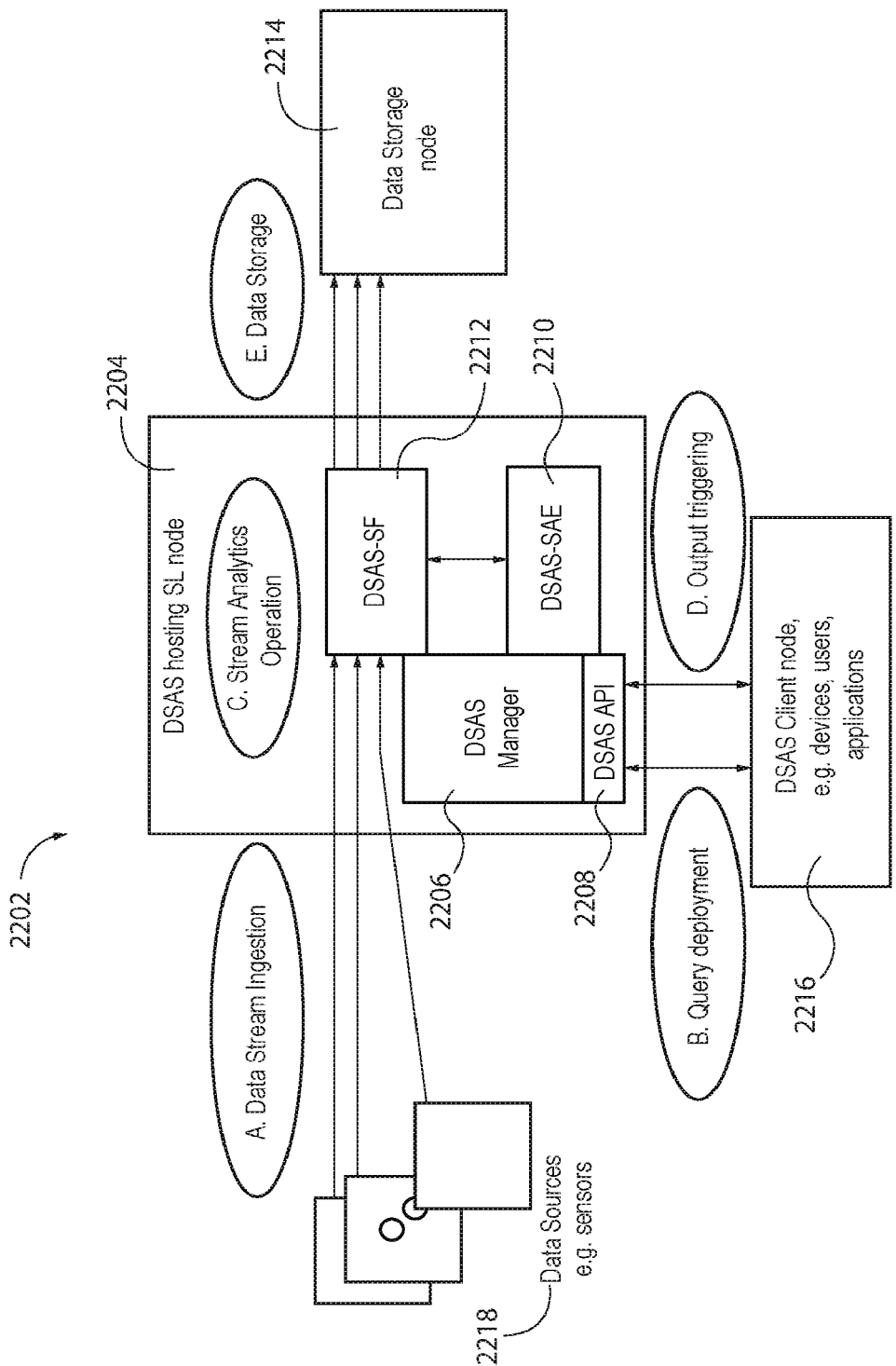
FIG. 22 is a diagram that illustrates a DSAS Layout in an IoT/M2M service layer.

In FIG. 22, the Data Stream Analytics Service (DSAS) 2202 at the IoT/M2M service layer integrates streaming analytics capabilities at the layer. In particular, a modular data stream analytics service at the IoT/M2M Service Layer has been defined: DSAS 2202 is designed into two main modules—a) a lightweight data stream processing module, called DSAS Stream Forwarder 2212 or DSAS-SF 2212, which performs light weight tasks such as data preprocessing and data routing, and b) stream analytics operation based on the user, application or device requirements, which is a more resource consuming data stream processing module, called DSAS Stream Analytics Engine or DSAS-SAE 2210. By separating the two functionalities, we make the data stream analytics architecture more flexible and modular, such that the analytics operation can be easily distributed across the distributed stream analytics system within IoT service layer and cloud.

In general, DSAS 2202 mainly has the following four main components, DSAS Stream Forwarder (DSAS-SF) 2212, DSAS Stream Analytics Engine (DSAS-SAE) 2210, DSAS Manager 2206, DSAS API 2208.

DSAS Stream Forwarder (DSAS-SF) 2212 is a light weight stream processing module that
- Acts as an entry point for data stream for stream analytics.
- Identifies unique data stream with its properties and attributes, and uses access control policy (ACP) to manage control over the data.
- Preprocesses the stream and routes only the reduced stream (only the data stream attributes required for analysis) to the main stream analytics engine (DSAS-SAE 2210), hence controlling the size of the traffic being forwarded to the stream analytics engine
- Acts as a router to forward the incoming stream to the data storage node (may be different from the stream analytics engine), after preprocessing the data as per the requirement of the storage DSAS Stream Analytics Engine (DSAS-SAE) 2210 is the module that performs main stream analytics operation such as statistical aggregation, pattern/event detection and predictive analysis. This module receives data stream for analysis from a DSAS-SF 2212 or another DSAS-SAE 2210.

DSAS Manager 2206 is the main management module of DSAS 2202, which
- Manages the resources allocated to DSAS 2202 such as the physical resources required to store metadata, tables, logs, etc.
- Is responsible for invoking individual services and modules, such as the Security manager 2302, Query manager 2316, etc., within DSAS components 2202 and monitoring these services to make sure they run without errors.
- Is responsible for fault tolerance. In case of failures, it tries to recover the failed processes and jobs in the system, ensuring that the system continues to operate smoothly. One of the approaches is to checkpoint the state of the system periodically.
- Is responsible for providing a secured access over ACP to the external client connecting to the DSAS hosting node to configure and monitor the management services within DSAS 2202 (to be discussed in details under DSAS API 2208 below).
- Is responsible for communicating with other DSAS hosting nodes in a distributed system for fault recovery, load balancing and other communications. In a distributed system, DSAS hosting nodes communicate with each other via their respective DSAS Manager 2206.

DSAS API 2208 contains the implementation of the Application Programming Interfaces (APIs) for DSAS 2202. The DSAS API 2208 can be used for the following purposes:
- To connect the clients interested in deriving values from the IoT/M2M device data, for instance, users, applications or devices, to the DSAS 2202 hosted on a service layer node, so that the clients can build/deploy queries in DSAS 2202 and access the analytical results outputted by the query deployed in DSAS 2202.
- To manage and control the DSAS 2202 itself—this API 2208 is responsible for configuring the management services, for instance, to
  - manage the fault tolerance policy
  - dynamically configure the access control mechanisms, such as ACP, in the Security manager 2302
  - updating the policy to access resources (e.g. locking mechanism for concurrent reads/writes in a table by multiple entities)
  - configure the preprocessor 2306 so that the data stream is preprocessed based on the storage policy of the storage nodes or the information provided by the device guidelines
  - update the stream identification policy (in case of Out-of-Band Stream Identification) based on device guidelines.

FIG. 22 shows the general layout of DSAS 2202 in IoT/M2M service layer. We categorize the nodes connected to the IoT/M2M service layer (SL) into 4 different types:
1) DSAS Hosting Service Layer (SL) node 2204: The DSAS 2202 is hosted in these SL nodes. Each DSAS hosting SL node has its own independent DSAS 2202. However, multiple service layer nodes with hosted DSAS 2202 can be connected to each other, via a messaging protocol e.g. MQTT (message queueing telemetry), to provide distributed data stream analytics capabilities to the IoT/M2M service layer.
2) Data Source 2218: These nodes are the producers of the IoT/M2M data. The data is transmitted as a stream across the communication channels, starting from these nodes. Examples of a data sources in the previous IITS use case are the traffic cameras generating local traffic video and the GPS probe vehicles generating GPS data. Logically, data source and DSAS hosting SL node are separate entities, but they may be hosted in the same device or physical node.
3) DSAS Client node 2216: Hosts the entity, such as a user, an application or an IoT/M2M device, that is interested in deriving useful information or insights from the streaming data in real time. The client 2216 may either be an SL or a non-SL node.
4) Data Storage node 2214: An optional node where the data stream is forwarded for storage, if required for later analysis, once useful information has been extracted from it. The storage node 2214 may be a temporary data collection node in the service layer, e.g. oneM2M <contentInstance> resource node, or an infrastructure server/data warehouse for permanent storage.

It is understood that the functionality illustrated in FIG. 22, may be implemented in the form of software (i.e., computer-executable instructions) stored in a memory of, and executing on a processor of, an apparatus of an M2M network (e.g., a server, gateway, device, or other computer system), such as one of those illustrated in FIG. 49C or 49D described below.

Figure 23:
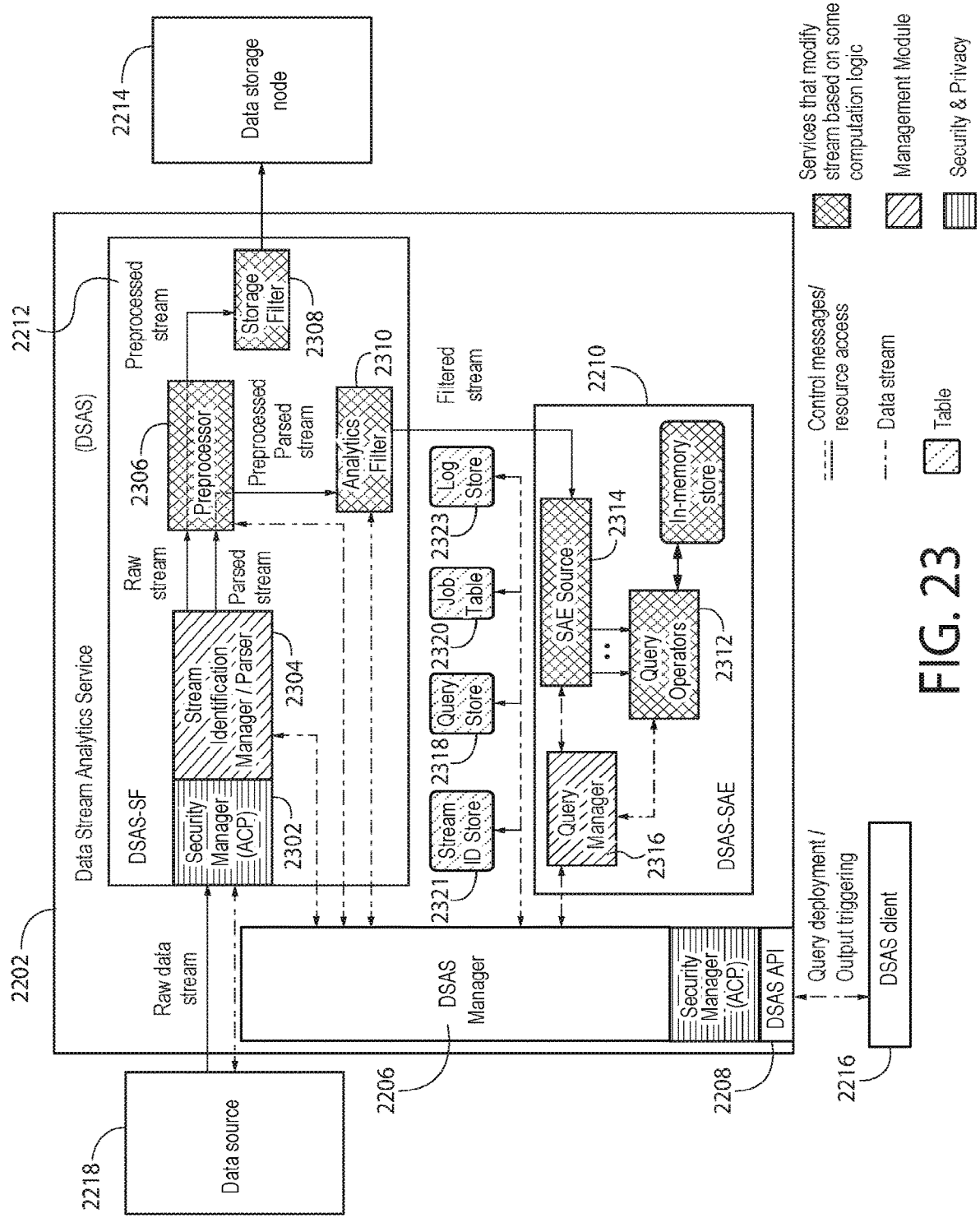
FIG. 23 is a diagram that illustrates details of a DSAS.

FIG. 23 shows the components and modules inside DSAS 2202. As discussed above, DSAS 2202 has four main components—DSAS-SF 2212, DSAS-SAE 2210 and DSAS API 2208 and a main management service to support these components, called DSAS Manager 2206. These components also use shared resources that are stored in the form of tables, trace files, etc. Below, the detailed descriptions of each those components will be presented in each of following sub sections.

DSAS Stream Forwarder (DSAS-SF) 2212: As discussed above, DSAS-SF 2212 is a light weight stream processing component of DSAS 2202. Preprocessing may be done for cleaning data before storage and analysis, discarding unrequired data before being sent to the storage nodes and reducing the dimension of the data stream, per the requirement of DSAS-SAE 2210, before being forwarded to the DSAS-SAE 2210. It may also act as a simple router. The following modules run in DSAS-SF 2212:

Security Manager 2302 is responsible for secured access of data stream using mechanisms such as an Access Control Policy (ACP), that can be pre-defined by the service layer or vendors or dynamically configured via a management interface. The Security Manager 2302 is mainly used for mutual authentication via access control mechanisms (e.g. ACP). The three main authentications are: 1) ensuring that data stream received from a certain device is authorized to access DSAS 2202, 2) ensuring that a certain data stream from a device is authorized to access DSAS 2202 and 3) ensuring that the DSAS 2202 is authorized to access the incoming data stream of a particular device Stream Identification Manager/Parser (SIM/P) 2304 identifies each unique stream, assigns it a unique Stream Identifier if the stream does not already have one, and maintains the table, called Stream ID Store (shown later in Table 2), which stores information of all unique stream received (in other words, observed) by DSAS 2202. It also parses the stream based on its attributes.

Preprocessor 2306 preprocesses the data generated by the stream. IoT data generally requires preprocessing in order to remove redundancy and noise since from IoT device data are generally very dirty and noisy with several missing points and redundancies. Preprocessing is also used for lossy compression of data using known sampling or aggregation techniques. The preprocessing of data achieves the following main purposes: 1) cleaning the device data, which is generally dirty and full of noise, by removing redundancy and noise from the data, 2) compressing the data by means of aggregation, sampling or other techniques, and 3) the above two purposes in turn reduce the communication cost of the data across transmission channel and the cost of storage of the data.

Storage Filter 2308 reduces the size of the data stream, forwarded by the preprocessor 2306 for storage, by removing unnecessary attributes from the data stream, based on the policies pre-defined by the storage nodes or the device guidelines, or dynamically configured by a client via the management interface, hence also reducing the transmission and storage cost incurred. The storage policy may also define methods for compressing the data, best optimized for storage.

Analytics Filter 2310 filters out the attributes from the preprocessed data stream, which are not required for any of the analytics operations, based on the queries deployed in the system. The resulting stream is called the filtered stream. This filtering is done to reduce the dimension of the data stream that is sent by Analytics Filter 2310 from DSAS-SF 2212 to SAE source 2314 in DSAS-SAE 2210 for actual analytics operation, in order to minimize the size of the data stream handled by DSAS-SAE 2210 for efficiency and reducing the load on DSAS-SAE 2210. In the case of a distributed setup, this also reduces the communication cost if the analytics operation is performed on SAE module of a DSAS 2202 hosted on a different node.

DSAS Stream Analytics Engine (DSAS-SAE) 2210 can include:

Query Operators 2312—A query is a mechanism to retrieve specific information from the data stream and/or perform certain actions based on the occurrence of certain conditions or events. These queries pertain to specific data stream analytics operations in the system. Algorithms consisting of computation, statistical, aggregation or more complex logic, are implemented in order to process the query deployed in the system and perform corresponding data stream analysis. The implementations of these algorithms are termed as Query operators 2312. These implementations can be done in native programming languages such as C/C++ or Java, or platform specific languages, depending on the stream analytics engine used within DSAS 2202 to run the query operators 2312. Each query operator maybe used to process one or more queries in DSAS 2202. An instance of query operator is invoked by the Query manager 2316 to process the corresponding query.

SAE Source 2314 is the first module in the DSAS-SAE 2210 to receive the filtered data stream from 'Analytics Filter' module 2310 in DSAS-SF 2212. The SAE source 2314 refers to the Query ID store 2318 to feed the required stream or set of streams with the desired attributes to each Query Operator instance.

Query Manager 2316 manages the Query ID store 2318 that contains the metadata and the description of each query deployed in DSAS 2202. The Query Manager 2316 is also responsible for invoking and executing the query operator to process the corresponding query and perform data stream analytics operations. The runtime instance of the query operator, executed by the Query Manager 2316, to process a query is called as Job and the information pertaining to all the jobs, such as the Job ID, corresponding Query ID that the job is processing, job status, corresponding log/trace information, are stored in the Job table 2320 (shown later in Table 9). The Query Manager 2316 is also responsible for the maintenance of the Job table 2320 and monitoring of all the jobs.

DSAS Manager 2206: As discussed above, the primary functions of DSAS Manager 2206 includes resource management and allocation within DSAS hosting node, managing fault tolerance in case of process failures, monitoring management services within DSAS 2202 and in the case of a distributed system, communicating with other DSAS hosting nodes via their respective DSAS Managers 2206.

DSAS Application Programming Interface (API 2208): DSAS API 2208 is an interface built on both the client end and DSAS hosting node end, comprising of a set of routines and protocols that decide how DSAS client 2216 components will interact with DSAS components hosted on the same or different nodes. DSAS API 2208 is used to establish connection between the DSAS hosting SL node and the clients (e.g. IoT devices, applications, users) who are interested in deriving useful insights from the data using DSAS 2202. This connection is qualified by ACP functionality (that can either be pre-defined at the service layer or dynamically configured) to validate client 2216 access into DSAS hosting node.

The working details of FIG. 23 is presented part by part and in details, during the discussion of the detailed procedures below.

To facilitate the data stream analytics service, some metadata is stored in the form of tables or repositories in the DSAS hosting SL node, such as the Stream ID store (maintains list of unique streams analyzed by DSAS 2202), Query store 3218 (maintains list of queries being processed by DSAS 2202) and Job table 2320 (maintains list of jobs being handled by DSAS 2202 to process the queries). The resources used by these tables are managed by the DSAS manager 2206 and are shared across all the components of DSAS 2202.

It is understood that the functionality illustrated in FIG. 23, may be implemented in the form of software (i.e., computer-executable instructions) stored in a memory of, and executing on a processor of, an apparatus of an M2M network (e.g., a server, gateway, device, or other computer system), such as one of those illustrated in FIG. 49C or 49D described below.

Figure 24:
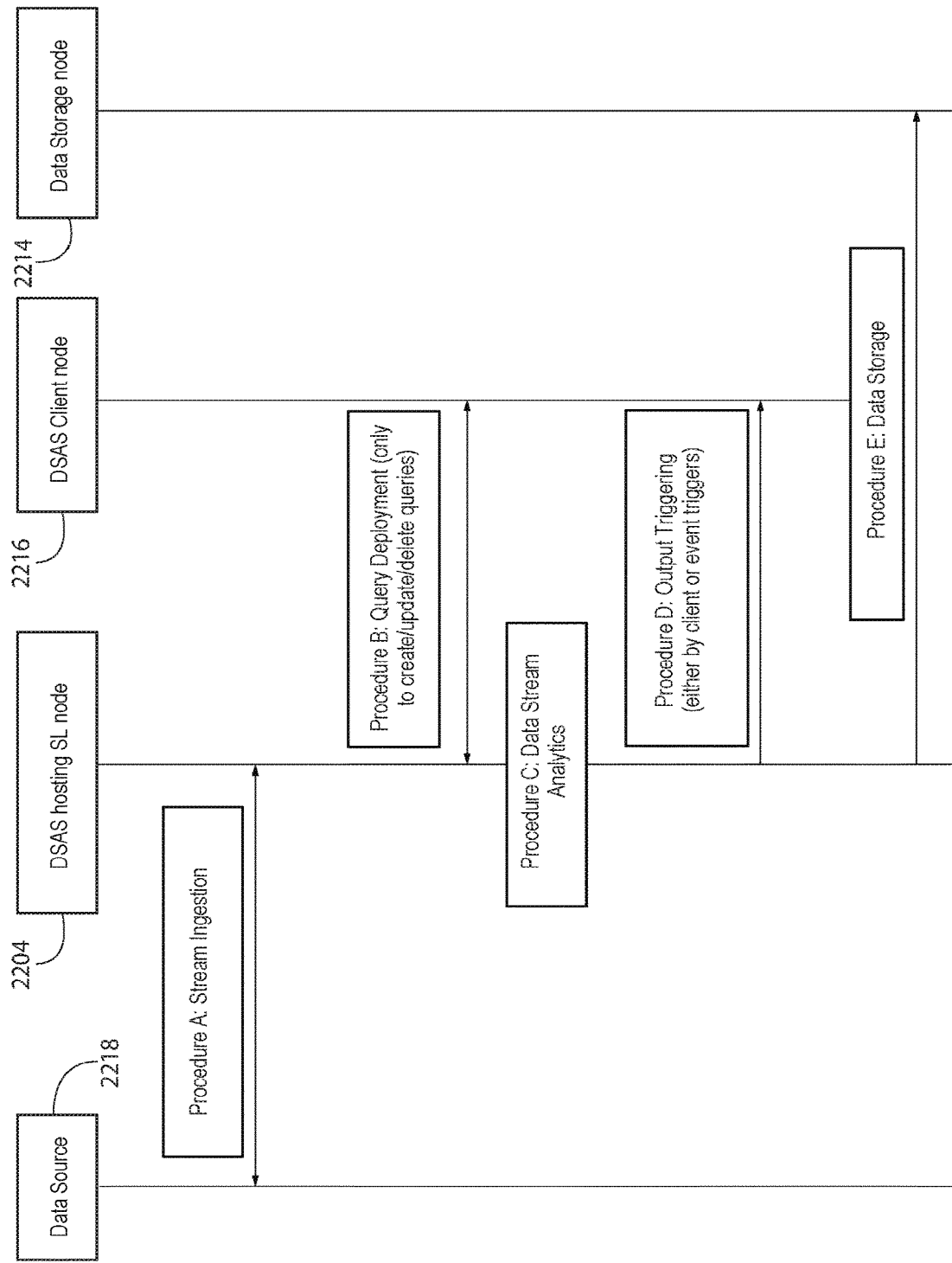
FIG. 24 is a flow chart that illustrates an overall procedural description of DSAS.

FIG. 24 shows the overall general procedural description of DSAS 2202. The general steps are as follows:

A. Stream Ingestion—This is the first procedural step in DSAS dealing with data stream. The data stream is ingested into DSAS 2202 via the Security Manager 2302 over ACP, assigned a unique ID for identification purpose, and parsed before being forwarded for further processing. This will be discussed in details later.

B. Query Deployment—This is required to deploy query in DSAS 2202, based on which the data stream analytics is performed over the data stream. Procedure A and B may occur in any order. A query maybe deployed in DSAS 2202 after the stream ingestion, or the query may have been deployed in DSAS 2202 before even it started receiving the concerned data streams.

C. Data Stream Analytics—The actual data stream analytics is performed based on the query deployed in the system.

D. Output Triggering—Though the data stream is processed and analyzed continuously, but the answer to the query may not be outputted continuously. The output maybe explicitly requested by a client 2216 or may be generated as a response to a trigger.

E. Data Storage—After important information is extracted from the data stream, the data may be forwarded for storage.

A basic scenario has only one DSAS 2202 in place. As described below, in a distributed scenario, multiple DSAS can be deployed in the system.

Figure 49A:
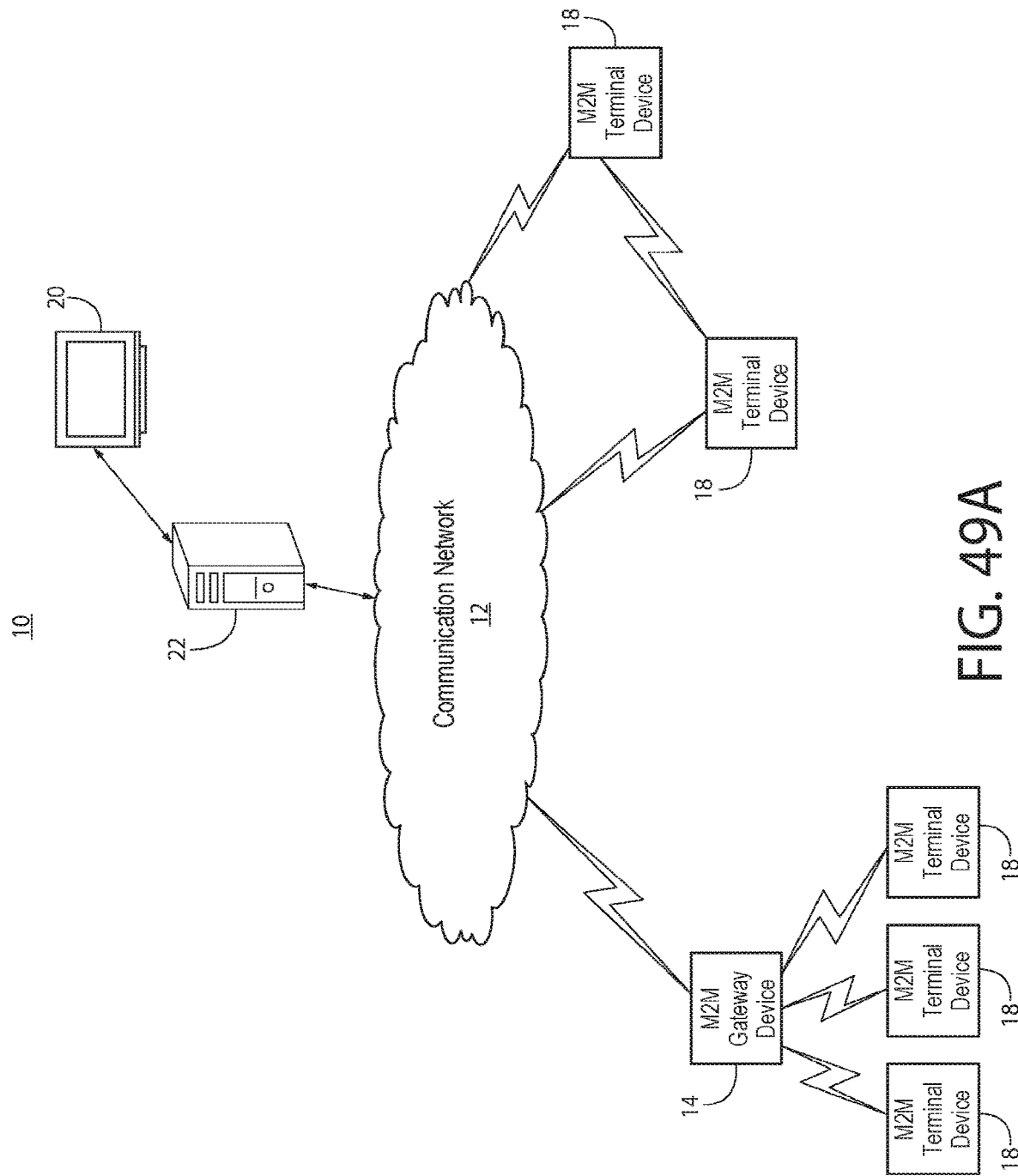
FIG. 49A is a diagram of a M2M/IoT/WoT communication system that includes a communication network.
Figure 49B:
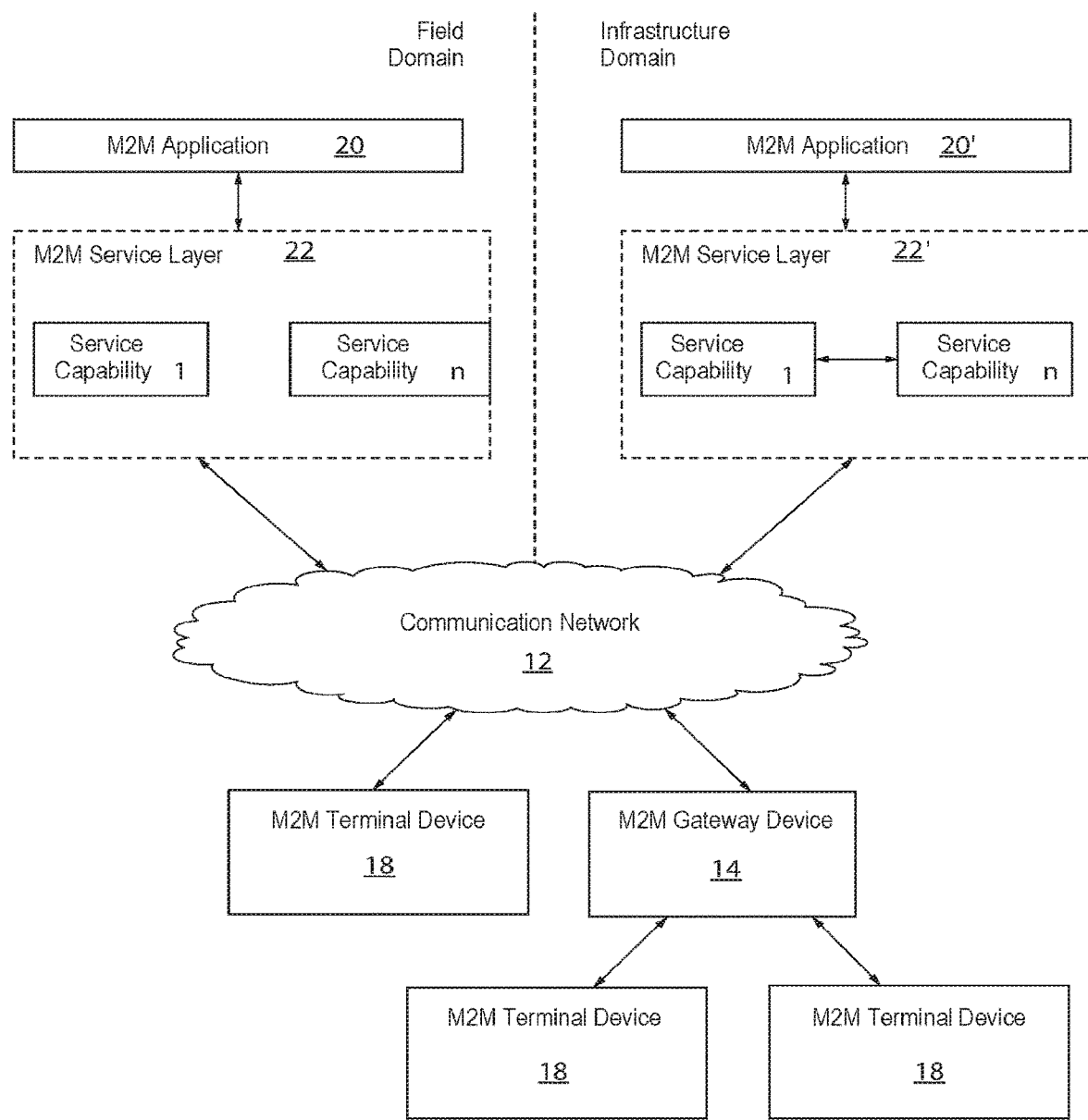
FIG. 49B is a diagram of an illustrated M2M service layer in the field domain that provides services for the M2M application, M2M gateway devices, and M2M terminal devices and the communication network.
Figure 49C:
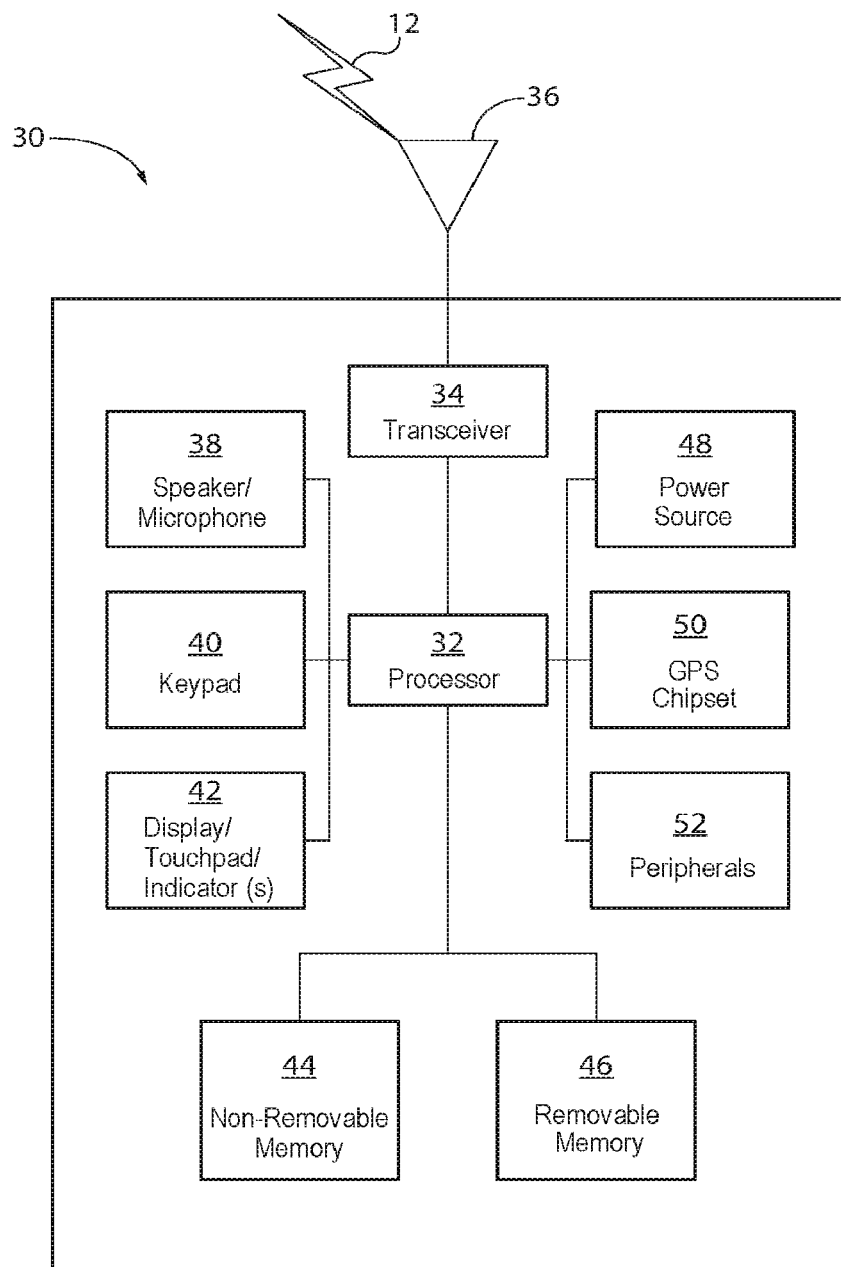
FIG. 49C is a diagram of an exemplary device that may be used to implement any of the network nodes, devices or apparatuses described herein.
Figure 49D:
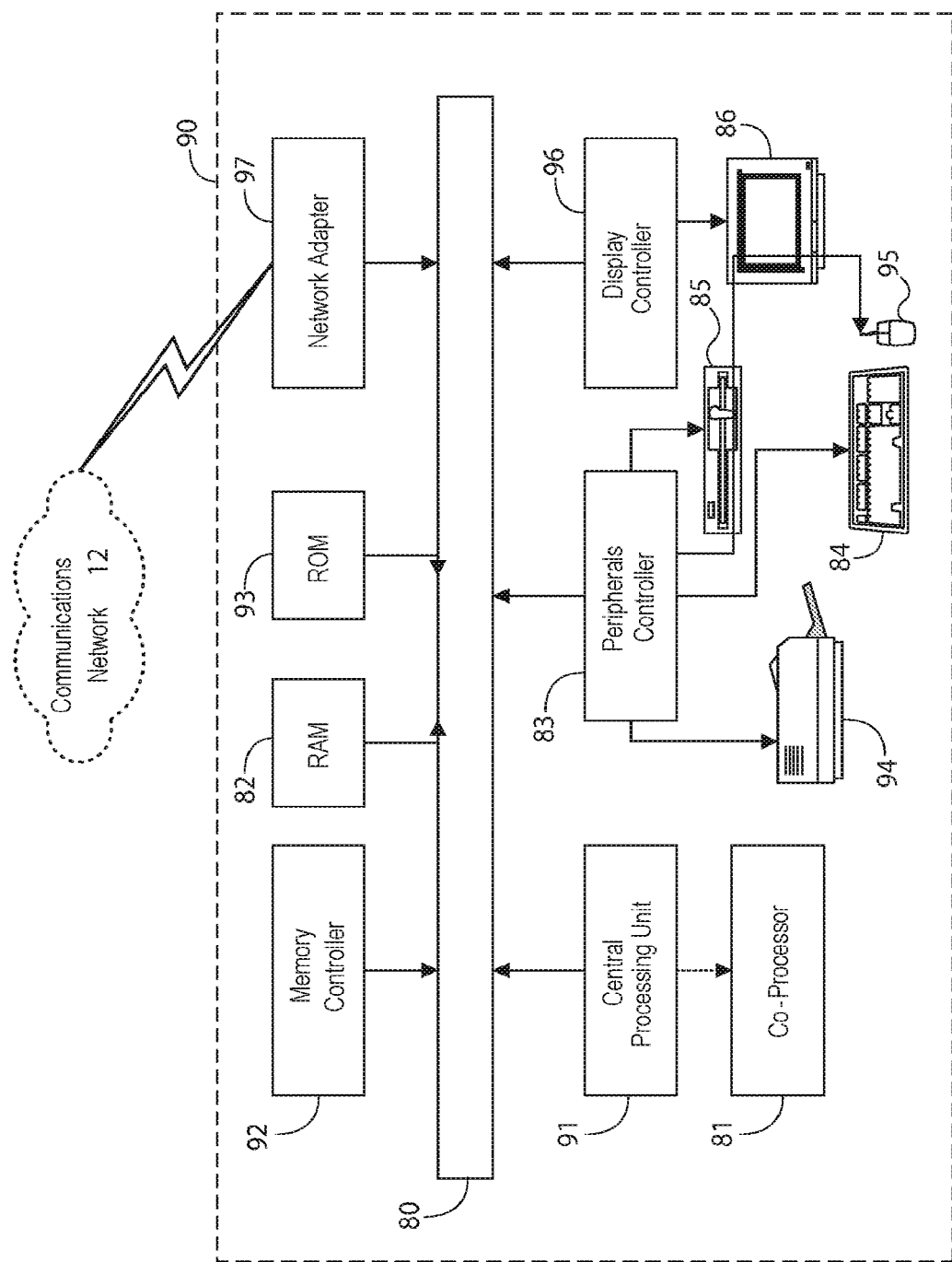
FIG. 49D is a block diagram of a computer system or server that may be used to implement any of the network nodes, devices or apparatuses described herein.

It is understood that the entities performing the steps illustrated in FIG. 24 are logical entities that may be implemented in the form of software (i.e., computer-executable instructions) stored in a memory of, and executing on a processor of, a network apparatus or computer system such as those illustrated in FIG. 49C or FIG. 49D. That is, the method(s) illustrated in FIG. 24 may be implemented in the form of software (i.e., computer-executable instructions) stored in a memory of a network apparatus, such as the apparatus or computer system illustrated in FIG. 49C or FIG. 49D, which computer executable instructions, when executed by a processor of the apparatus, perform the steps illustrated in FIG. 24. It is also understood that any transmitting and receiving steps illustrated in FIG. 24 may be performed by communication circuitry of the apparatus under control of the processor of the apparatus and the computer-executable instructions (e.g., software) that it executes.

Procedure A: Stream Ingestion

In general, the Stream Ingestion will have the following three major steps: 1) Data Source Registration, 2) Data Stream Identification and 3) Data Stream Parsing, which will be descried in details as follows.

Data Source Registration

This is the initial set up process for a data source in the IoT/M2M system to register to the service layer node hosting the DSAS 2202. The procedural detail of Data Source Registration has been shown in FIG. 25.

Figure 25:
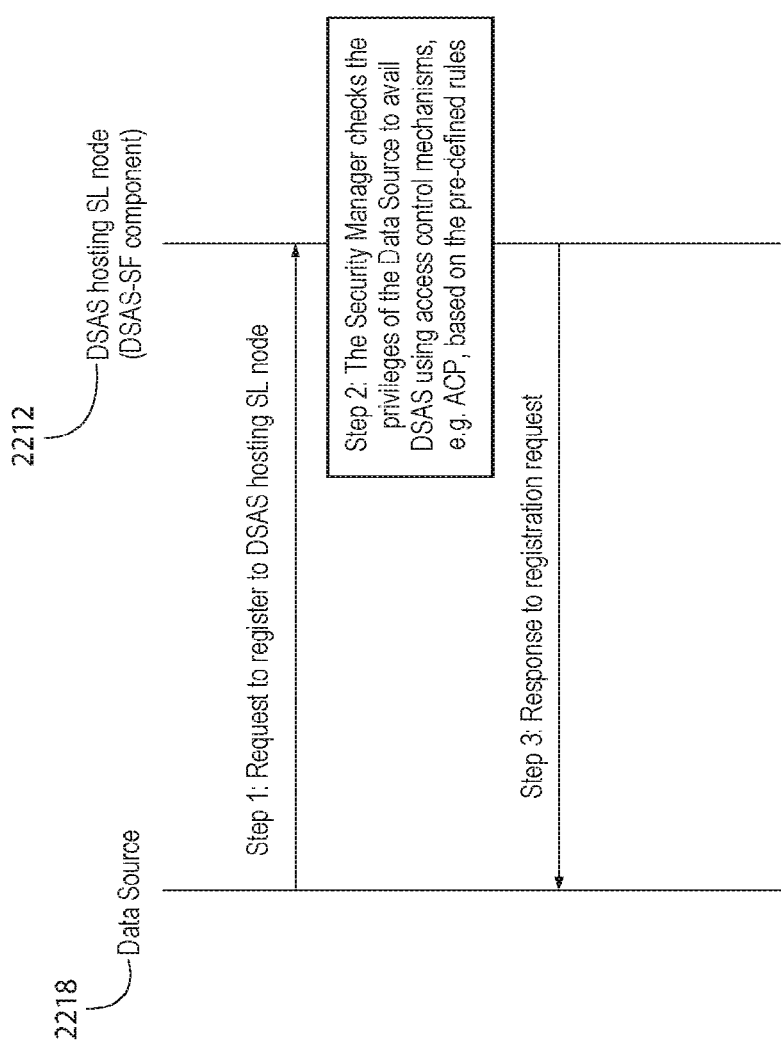
FIG. 25 is a flow chart that illustrates data source registration.

In step 1 of FIG. 25, the data source sends a request message to connect (or register) to the DSAS hosting service layer node. The data source may or may not be aware of DSAS 2202 in the service layer node. The data source might simply be interested in registering to the service layer node to forward the data to the next destination.

In step 2 of FIG. 25, the registration of the data stream to DSAS hosting service layer node is performed based on the standard device registration process in the service layer using the standard access control mechanism. However, regardless of the fact that the data source is aware or unaware of the existence of DSAS 2202 in the node, along with the standard device registration, the Security Manager 2302 in DSAS-SF 2212 component also checks the privileges of the data source using an access control mechanism, such as ACP, to ensure that the data source has necessary privileges to avail DSAS 2202. These privileges are specified by the client 2216 (such as users or applications) during the deployment of the data source in the network or later as and when required. The client 2216 uses DSAS API module 2308 to setup privileges for the data sources using the access control mechanism defined for DSAS 2202. The check is performed on the following information of the data source (or device)—the device host address, the device type, such as a car or a smart phone (if available, since the type of the device may not always be defined) and the device ID (if available, since not all devices may have an ID assigned to it).

In step 3 of FIG. 25, the DSAS hosting SL node sends back a response to the data source confirming the completion of the registration of the data source at the SL node.

It is understood that the entities performing the steps illustrated in FIG. 25 are logical entities that may be implemented in the form of software (i.e., computer-executable instructions) stored in a memory of, and executing on a processor of, a network apparatus or computer system such as those illustrated in FIG. 49C or FIG. 49D. That is, the method(s) illustrated in FIG. 25 may be implemented in the form of software (i.e., computer-executable instructions) stored in a memory of a network apparatus, such as the apparatus or computer system illustrated in FIG. 49C or FIG. 49D, which computer executable instructions, when executed by a processor of the apparatus, perform the steps illustrated in FIG. 25. It is also understood that any transmitting and receiving steps illustrated in FIG. 25 may be performed by communication circuitry of the apparatus under control of the processor of the apparatus and the computer-executable instructions (e.g., software) that it executes.

Data Stream Identification

This is the process of identifying each unique stream that is received by DSAS 2202 and assign a unique ID, called Unique Identifier, if not already assigned, to each of the unique streams. The data stream identification is done by the Stream Identification Manager/Parser (SIM/P) 2304.

In particular, it can be done in one of two ways in DSAS 2202: Out-of-Band Stream Provisioning and In-Band Stream Provisioning, which will be described below.

Out-of-Band Stream Provisioning

Each stream can be uniquely identified in DSAS-SF 2212 by a Stream Identification Manager, using the information provided by the client 2216 based on the IoT device guidelines and the pre-provisioning documents. The DSAS 2202 do not depend on the data sources, i.e. the IoT/M2M devices, to obtain stream information for identification. DSAS-SF 2212 does not receive any information from the data source. In this case, the data sources may be completely oblivious about the existence of data stream analytics system in the service layer. More information about Out-of-Band Stream Provisioning can be found in the procedural description shown in FIGS. 26A-B.

Figure 26A:
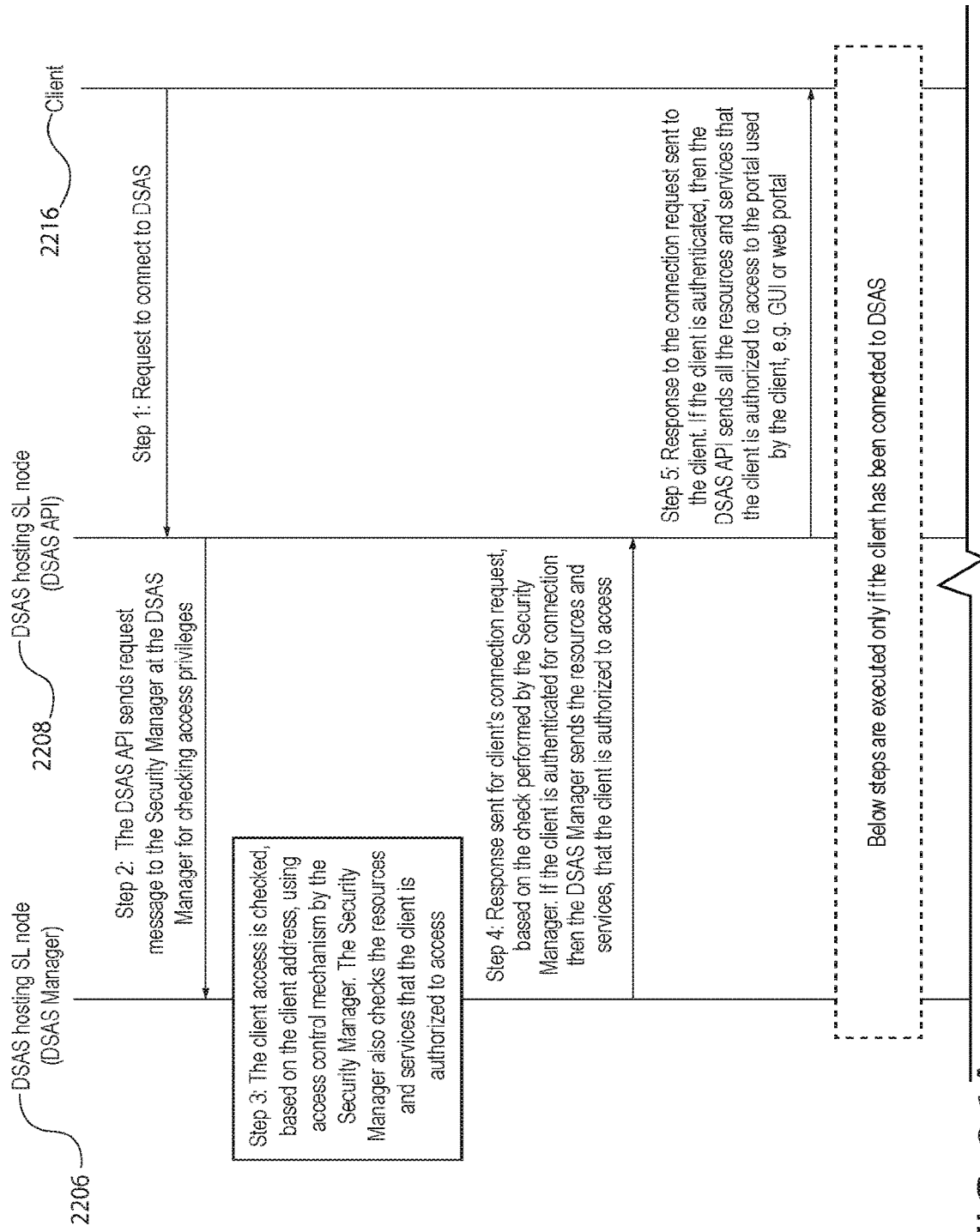
FIGS. 26A-B is a flow chart that illustrates out-of-band stream provisioning.
Figure 26B:
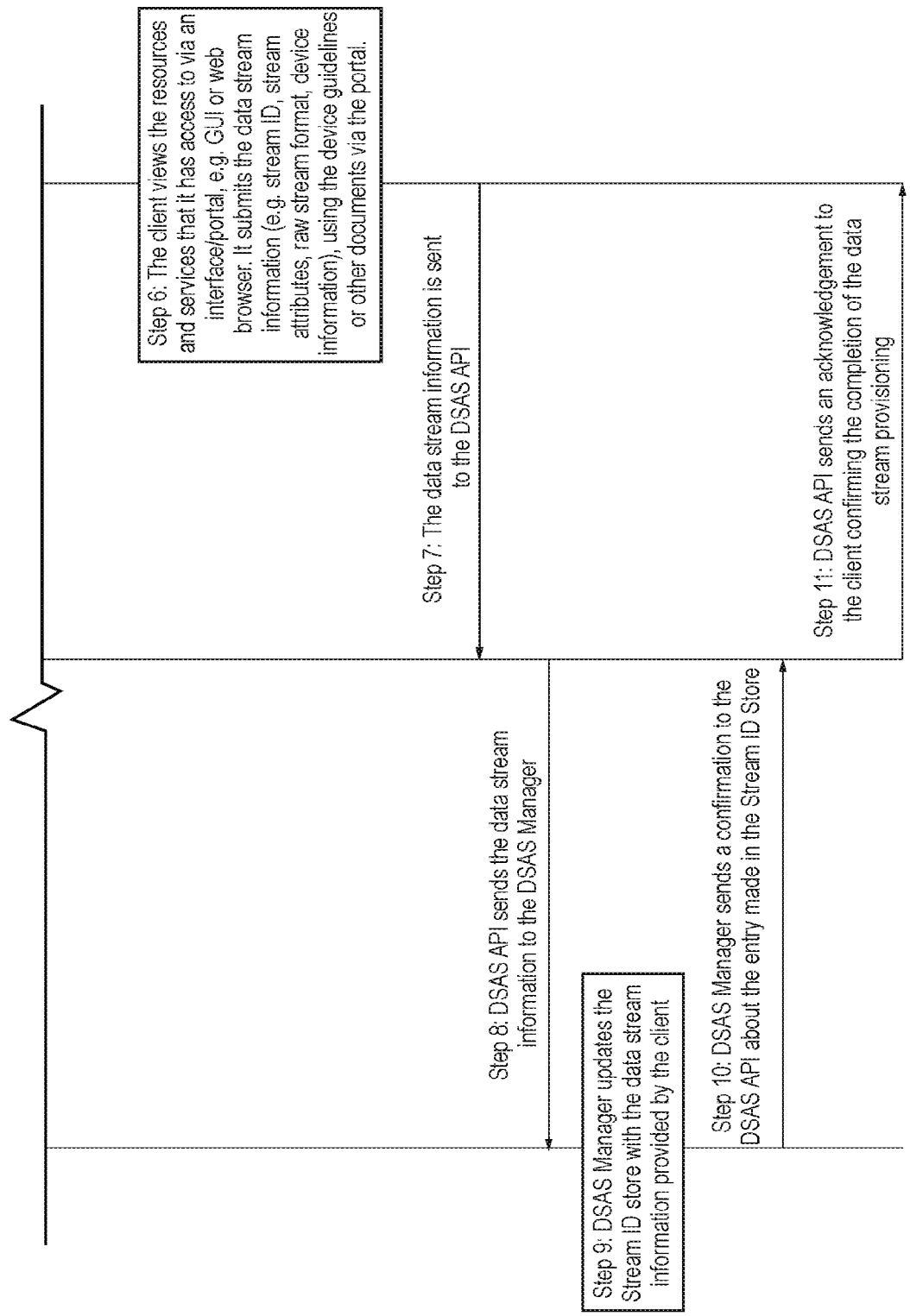

In step 1 of FIGS. 26A-B, the client 2216 (e.g. a user or an application) sends a request via the portal, for instance a GUI or web browser, to establish connection with DSAS 2202. This request contains the client address that will be used for authentication and authorization.

In step 2 of FIGS. 26A-B, the client request for connection is received by the DSAS API component 2308 of DSAS 2202, which contains the API 2208 to enable the client side portals to interact with DSAS 2202. This request is forwarded to the DSAS Manager 2206 component.

In step 3 of FIGS. 26A-B, the Security manager 2302 within DSAS Manager 2206 uses predefined access control mechanism to check the privileges of the client 2216 within DSAS 2202. It checks whether the client 2216 has the privileges to access DSAS 2202. It also finds the resources and services that the client 2216 is authorized to access. Resources comprise of the tables that a client 2216 can access—read and write access for Stream ID Store 2321 (described later) and Query Store 2318, and read only access for the Log table. Services comprise of the management services that a client 2216 can configure, such as the access control mechanism and the preprocessor configuration.

In step 4 of FIGS. 26A-B, the Security manager 2302 in the DSAS Manager 2206 sends back a response to the DSAS API 2208 for the client's connection request. If the client 2216 is authenticated by the Security manager 2302 and has the privileges to access DSAS, the Security manager 2302 also sends the resources and services which the client 2216 is authorized to access.

In step 5 of FIGS. 26A-B, the DSAS API 2208 sends the response message to the client portal, e.g. web browser or GUI. If the client 2216 is authenticated, as specified in the response message, then the response message also includes the resources and the services that the client 2216 is authorized to access.

In step 6 of FIGS. 26A-B, if the client 2216 has been authenticated by the Security manager 2302 using access control mechanism, as specified by the response message received, then a connection is established between the client 2216 and the DSAS 2202 via the client 2216 side portal, e.g. the web browser or the GUI. The client 2216 gets the view of the resources and services that it can access via the portal. If the client 2216 is authorized to access the Stream ID Store 2321, it enters the information of the data stream it is interested in provisioning within DSAS 2202, via the portal. Table 2 shows a description of the Stream ID Store 2321. For example, the information entered are stream ID (if available), device information (device address, ID and type, if available) of the device that generates the data stream, stream attributes with metrics for each attribute, and raw data stream format. For instance, consider a raw GPS data stream of ID 'A1' generated from a device of ID 'VH1' and of vehicle type, denoted as 'VH'. The possible information submitted by the client 2216 to DSAS 2202 could be (Normally, in this case, it is assumed that the client 2216 could use the device guidelines or other pre-provisioning document to obtain related information):

Stream ID: A1
Device address: IP address of the device and the port number for the port transmitting data
Device ID: VH1
Device Type: VH
List of attributes contained in each message of the data stream: <Latitude, Longitude, Altitude (meters), Timestamp (hh:mm:ss:ff), Speed (mph)>
Message format: comma separated value (CSV)

TABLE 2

Description of the Stream ID Store 2321

| Property name | Multiplicity | Property description |
|---|---|---|
| Stream ID | 1 | A unique identifier for the data stream |
| Device ID | 1 | The identifier of the device generating the data stream (the source of the data stream) |
| Device Type | 1 | Type of the device generating the data stream, e.g. smartphone |
| Device Address | 1 | The host address of the device |
| Stream Attributes | 1 . . . n | List of attributes of the stream, with the respective metrics |
| Raw Stream Format | 1 | Format of the raw stream, e.g. CSV, JPEG |
| Stream Observed | 1 | No, if the stream has not yet been observed or received by DSAS, else Yes |

In step 7 of FIGS. 26A-B, the data stream information submitted by the client 2216 through the portal is received by the DSAS API 2208.

In step 8 of FIGS. 26A-B, the DSAS API 2208 sends the data stream information submitted by the client 2216 to the DSAS Manager 2206.

In step 9 of FIGS. 26A-B, the DSAS Manager 2206 updates the Stream ID Store with all the information provided by the client 2216 that it received via the DSAS API 2208. Table 3 shows the example entries made by the client 2216 for two data streams in Stream ID Store 2321 (still using the IITS use case, i.e., GPS data stream). These streams are only being provisioned and have not yet been observed or received by the DSAS 2202, hence, the last column has been marked as 'No'.

TABLE 3

Example Entries of the Stream ID Store 2321

| Stream ID | Device ID | Device Type | Device Address | List of Stream Attributes with metrics | Raw Stream Format | Stream Observed |
|---|---|---|---|---|---|---|
| A1 | VH1 | VH | <IP address: port no.> | <Latitude, Longitude, Altitude (meters), Timestamp (hh:mm:ss:ff), Speed (mph)> | CSV | No |
| A2 | VH2 | VH | <IP address: port no.> | <Latitude, Longitude, Altitude (meters), Timestamp (hh:mm:ss:ff), Speed (mph)> | Text | No |

In step 10 of FIGS. 26A-B, the DSAS Manager 2206 sends a confirmation to the DSAS API 2208 about the entry it made in the Stream ID Store with the information provided by the client 2216.

In step 11 of FIGS. 26A-B, the DSAS API 2208 sends an acknowledgement to the client 2216, confirming the completion of data stream provisioning, i.e information of a new unique data stream has been provided to DSAS 2202, to facilitate identification of the corresponding data stream.

It is understood that the entities performing the steps illustrated in FIGS. 26A-B are logical entities that may be implemented in the form of software (i.e., computer-executable instructions) stored in a memory of, and executing on a processor of, a network apparatus or computer system such as those illustrated in FIG. 49C or FIG. 49D. That is, the method(s) illustrated in FIGS. 26A-B may be implemented in the form of software (i.e., computer-executable instructions) stored in a memory of a network apparatus, such as the apparatus or computer system illustrated in FIG. 49C or FIG. 49D, which computer executable instructions, when executed by a processor of the apparatus, perform the steps illustrated in FIGS. 26A-B. It is also understood that any transmitting and receiving steps illustrated in FIGS. 26A-B may be performed by communication circuitry of the apparatus under control of the processor of the apparatus and the computer-executable instructions (e.g., software) that it executes.

In-Band Stream Provisioning

In the case of In-band stream provisioning, DSAS-SF 2212 uses the information/metadata directly sent by the data sources to uniquely identify each stream. This information is sent out once a connection is established between the data sources and DSAS-SF 2212, even before the devices start sending out the actual data to the DSAS 2202. In this set up, it is assumed that DSAS 2202 makes itself discoverable on being deployed within the service layer so that the data sources are able to establish a connection with the DSAS 2202. Hence, in this case, the data sources are generally aware of the existence of data stream analytics tool in the system and explicitly send them information about their respective streams. The data stream information is received by the Stream Identification Manager which makes an entry in the Stream ID Store corresponding to the information received for each unique stream. More information about this technique can be found in FIG. 27.

Figure 27:
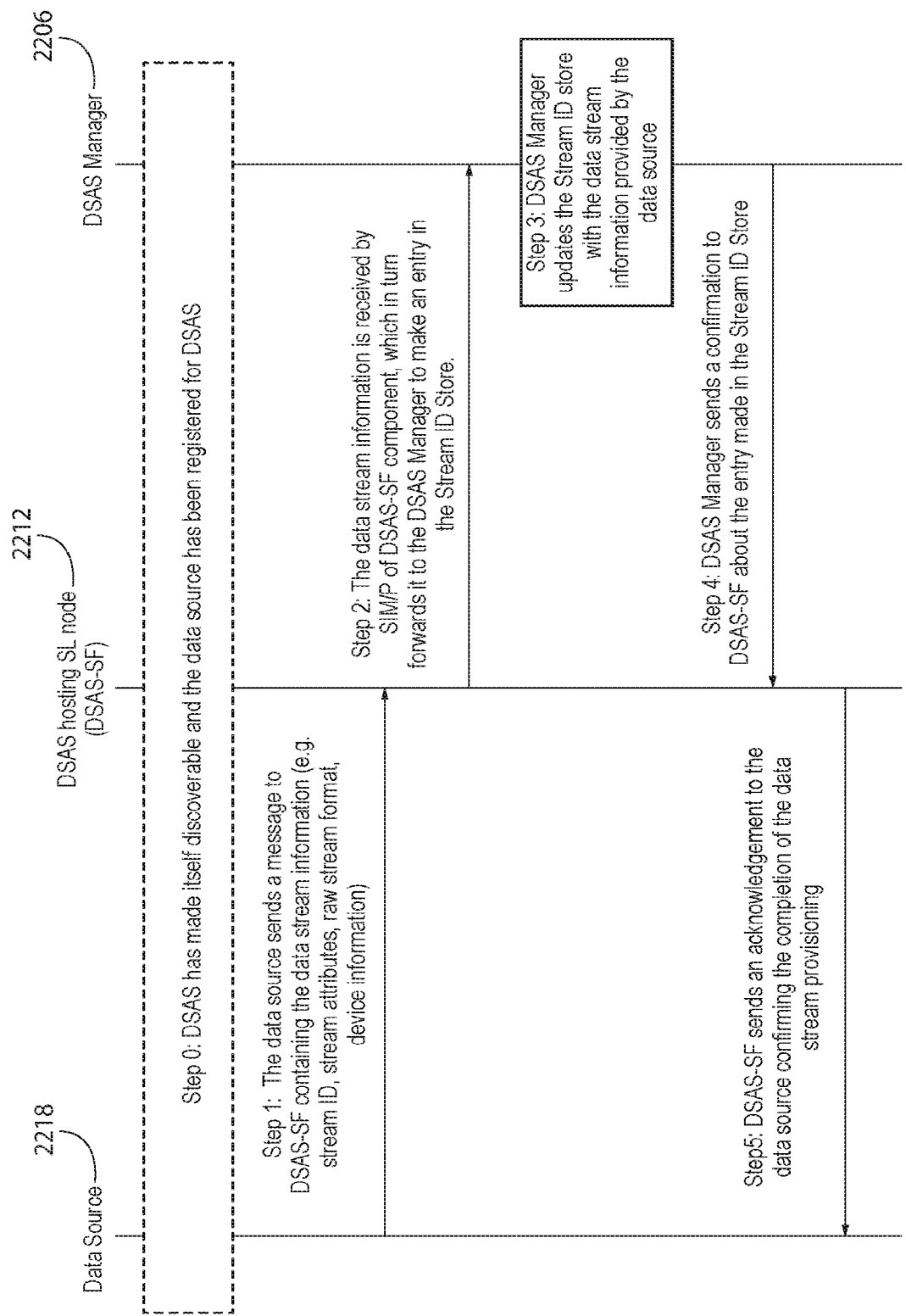
FIG. 27 is a flow chart that illustrates in-band stream provisioning.

For step 0 of FIG. 27, it is considered that the DSAS 2202 has made itself discoverable via the service layer specified service discovery procedure. The data source has been registered to DSAS 2202 using the procedure described in FIG. 27. The data source may or may not be aware of the existence of DSAS 2202, during the time of registration, and it may only be interested in registering to the Service Layer node for data forwarding and storage. However, even if the data source were not aware of DSAS 2202 during registration, in some cases it may become aware of DSAS 2202 later and may explicitly send out its data stream information as a part of Out-of-Band provisioning.

In step 1 of FIG. 27, the data source sends out its data stream information, for which it wants the avail the data stream analytics service, to the DSAS-SF 2212 for stream provisioning, so that DSAS 2202 can uniquely identify the corresponding data stream based on the information provided. The stream information sent by the data source is the same as shown in Step 6 in FIGS. 26A-B of the procedural description of Out-of-Band Stream Provisioning. Alternatively, if an SL node maintains data stream registry, then the data source only sends out the Stream ID to DSAS 2202, which then performs a lookup to the data stream registry, based on the stream ID provided, to discover other information of the data stream from the semantic description.

In step 2 of FIG. 27, Stream Identification Manager/Parser (SIM/P) 2304 module of DSAS-SF 2212 receives the information from the data source and forwards it to the DSAS Manager 2206, so that corresponding entry is made in the Stream ID Store 2321.

In step 3 of FIG. 27, if the data source has the required privileges to avail DSAS 2202, as checked by the Security manager 2302, an entry for the data source is made in the Stream ID Store 2321 (Table 2), such that the Device Address property in the table is set to the host address of the data source, Device Type property in the table is set to the type of the device sending out the stream, such as a smartphone, if the information is available, Device ID property in the table is set to the device identifier, if available, and the rest of the properties in the table are set to NULL. DSAS Manager 2206 makes an entry in the Stream ID Store 2321 for the data stream information it received from the data source. The example Stream ID Store 2321 entry made by the DSAS Manager 2206 has been shown in Table 3.

In step 4 of FIG. 27, the DSAS Manager 2206 sends a confirmation to the SIM/P module 2304 of DSAS-SF 2212 about the entry it made in the Stream ID Store 2321 with the information provided by the data source.

In step 5 of FIG. 27, SIM/P module 2304 of DSAS-SF 2212 sends an acknowledgement back to the data source, confirming the completion of data stream provisioning, i.e information of a new unique data stream has been provided to DSAS 2202, to facilitate identification of the corresponding data stream.

It is understood that the entities performing the steps illustrated in FIG. 27 are logical entities that may be implemented in the form of software (i.e., computer-executable instructions) stored in a memory of, and executing on a processor of, a network apparatus or computer system such as those illustrated in FIG. 49C or FIG. 49D. That is, the method(s) illustrated in FIG. 27 may be implemented in the form of software (i.e., computer-executable instructions) stored in a memory of a network apparatus, such as the apparatus or computer system illustrated in FIG. 49C or FIG. 49D, which computer executable instructions, when executed by a processor of the apparatus, perform the steps illustrated in FIG. 27. It is also understood that any transmitting and receiving steps illustrated in FIG. 27 may be performed by communication circuitry of the apparatus under control of the processor of the apparatus and the computer-executable instructions (e.g., software) that it executes.

Data Stream Parsing

It is the process of breaking down each stream tuple (or message) of the data stream into individual attributes, so that the attributes are identifiable by the stream processing system. It is also used to retrieve the Stream ID of the concerned data stream for authorization check and used by later analytics operation.

Figure 28:
FIG. 28 is a diagram that illustrates data stream parsing.

For instance, consider the following stream tuple <37, 145, 9:41:00.01, 30, A1, VH>. FIG. 28 shows output stream tuple on passing input stream tuple through a parser 2304.

Figure 29:
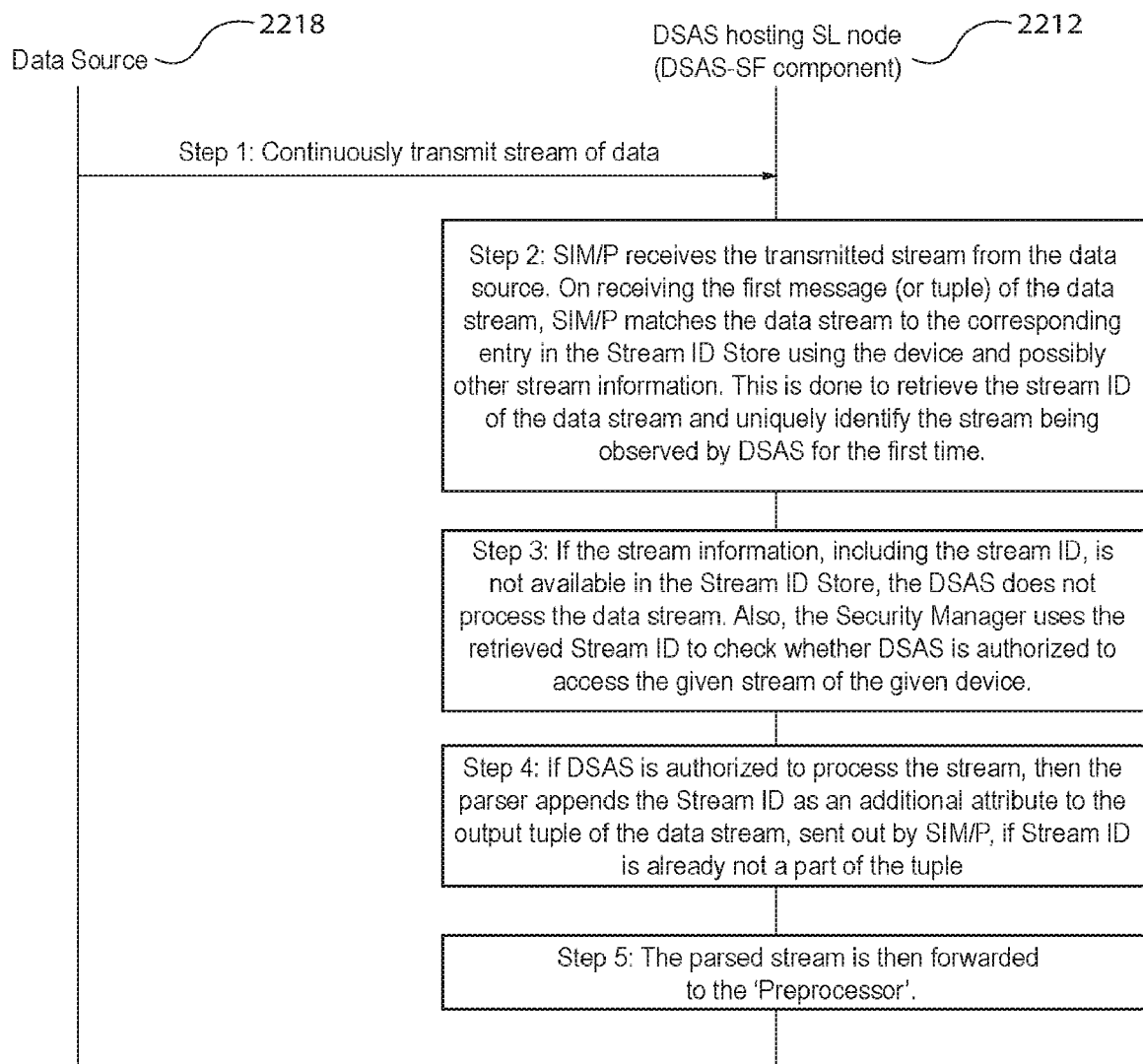
FIG. 29 is a flow chart that illustrates the procedure for stream parsing.

FIG. 29 illustrates the stream parsing procedural details to uniquely identify the data stream using the information stored in Stream ID Store 2321.

In step 1 of FIG. 29, data stream is ingested into DSAS 2202 via the SIM/P module 2304 of DSAS-SF 2212 component. The DSAS 2202 may be hosted in the data source itself.

In step 2 of FIG. 29, the streaming data is then passed through the Stream Identification Manager/Parser (SIM/P) 2304. On receiving the first message of a data stream, SIM/P 2304 matches the data stream with the corresponding entry (or entries) in the Stream ID Store 2321 based on the information of the device from which the data stream is received. If there are multiple streams from a single device, device port number is used to identify the stream. If the device port number is not available, then other information of the stream, such as the data stream format, is used to parse the data stream using a Parser 2304. The parsed data stream attributes are then matched with the Stream ID Store 2321 entries to find the corresponding stream. This step is done to retrieve the stream ID of the data stream.

In step 3 of FIG. 29, if the stream entry is not found in the Stream ID Store 2321 then DSAS 2202 does not proceed with processing the concerned data stream. If the stream entry of the corresponding stream is found, then the stream ID is used by the Security manager 2302 to check if DSAS 2202 has proper authorization to access the given stream.

In step 4 of FIG. 29, if the data stream clears the authorization check, then the parser 2304 checks if the Stream ID is one of the attributes of the parsed stream. If not, the parser 2304 appends the stream ID as one of the attributes. It is useful for later data stream analytics operation to identify and distinguish between streams. SIM/P 2304, via DSAS Manager 2206, updates the 'Stream Observed' property in Stream ID Store 2321 to 'Yes', if previously set to 'No'.

In step 5 of FIG. 29, the parsed stream is then forwarded to the Preprocessor 2306 for preprocessing of the data stream. In addition to the parsed stream, SIM/P 2304 also forwards the raw data stream to the Preprocessor 2306 for preprocessing before the raw data is sent out for storage. There has been lots of work done on the real time preprocessing of IoT data stream. It is an important part of IoT data processing, since the data is generally dirty and noisy. Dirty data implies that the data may have missing points, or have redundancies. Real time preprocessing methods, called data cleaning, are used to handle missing data and remove noise and redundancies from the data. Data cleaning methods, in some cases, are approximate. Preprocessing is also used to perform compression of the data for reducing the communication cost over the transmission channel. The compression techniques, in some cases, may be lossy. In order to reduce the communication cost, the size of the data may also be reduced using techniques such as sampling, statistical aggregations.

It is understood that the entities performing the steps illustrated in FIG. 29 are logical entities that may be implemented in the form of software (i.e., computer-executable instructions) stored in a memory of, and executing on a processor of, a network apparatus or computer system such as those illustrated in FIG. 49C or FIG. 49D. That is, the method(s) illustrated in FIG. 29 may be implemented in the form of software (i.e., computer-executable instructions) stored in a memory of a network apparatus, such as the apparatus or computer system illustrated in FIG. 49C or FIG. 49D, which computer executable instructions, when executed by a processor of the apparatus, perform the steps illustrated in FIG. 29. It is also understood that any transmitting and receiving steps illustrated in FIG. 29 may be performed by communication circuitry of the apparatus under control of the processor of the apparatus and the computer-executable instructions (e.g., software) that it executes.

Procedure B: Query Deployment

Query Deployment procedure in DSAS 2202 comprises of the following activities:

Adding a new query to DSAS 2202—a DSAS client 2216 adds a new query to DSAS 2202 via DSAS API module 2208 which contains API implementation for the clients to interact with the resources pertaining to the query, such as the Query Store 2318 and the Query operators 2312. Upon adding a new query to DSAS 2202, all the information sent by the client 2216 pertaining to the query are added to the Query Store 2318 (shown in Table 4) and the implementation of the query is saved as a Query Operator. All the properties specified in the Query Store 2318 (described in Table 4) are specified by the client 2216. For instance, adding a query "Calculate the time to collision between any two vehicles within the communication range of an intersection" to DSAS 2202 of the service layer of the Intersection Management System in the IITS use case, creates a new entry in the Query Store 2318 as the example shown in Table 5. When a query is added to DSAS 2202, the default value of the Switch property of the corresponding query in the Query Store 2318 can be set as "Enable" or "Disable" depending on the requirement of the application.

Modifying an existing query in DSAS 2202—a DSAS client 2216 modifies an existing query. Modifying an existing query implies updating the corresponding query entry in the Query Store 2318 and/or updating the corresponding Query Operator. E.g.: Modify the above query to "Calculate the time to collision between any two vehicles, and generate an alert if the time to collision goes below 10 s". The modification of an existing query also includes enabling or disabling a query in the system by updating the value of the Switch in the Query Store 2318 for the concerned query.

Deleting an existing query from DSAS 2202—a DSAS client 2216 may delete a query from DSAS 2202 via DSAS API, which leads to deleting corresponding entry from the Query Store 2318 and deleting the corresponding Query Operator.

TABLE 4

Description of the Query Store 2318

| Property name | Multi-plicity | Property description |
| --- | --- | --- |
| Query ID | 1 | Each query is assigned a unique ID |
| Query description | 1 | Description of what query does |
| Operator name | 1 | Name of the operator (i.e. the implementation of the algorithm to process the query) |
| Operator Parameter | 1 . . . n | The input parameters accepted by the operator, e.g. window length, i.e. scope of data required for querying |
| Priority level | 1 | The priority level of the query to enable DSAS 2202 to rank and prioritize its processing and response time to the query |
| Input stream ID | 1 . . . n | List of input streams on which the query is executed (assuming there are 'm' number of streams in the network) |
| Attribute list | 1 . . . n | The list of attributes, corresponding to each data stream, that is required to process the concerned query |
| Switch | 1 | Assumes the value 1 to 'Enable' and 0 to 'Disable' the query in DSAS 2202 |
| Output format | 1 | Format of the analytical results for the query, e.g. HTML, CSV |

TABLE 4-continued

Description of the Query Store 2318

| Property name | Multi-plicity | Property description |
|---|---|---|
| Output location | 1 | Location where the output (analytical results) of the query is stored |
| Host address | 1 | Assumes value 'localhost' if Analytics Filter in DSAS-SF forwards the filtered stream to DSAS-SAE in the same host. In a distributed system, DSAS-SF may forward the filtered stream to DSAS-SAE component of another DSAS hosting node for stream analytics, in which case it is the address (IP address/port number) of that host. |

TABLE 5

Example of a Query Store 2318

| Query ID | Query description | Operator name | Operator parameters | Input stream ID | List of attributes for all input streams | Switch (Enable/Disable) |
|---|---|---|---|---|---|---|
| Q1 | Continuously compute time to collision between any two vehicles | TTC_V2V | Window length = 1 minute | A1, A2 | A1: {Latitude, Longitude, Altitude, Timestamp, Speed} A2: {Latitude, Longitude, Altitude, Timestamp, Speed} | Enable |
| Q2 | Calculate the time to collision between any car within communication range of the intersection and a pedestrian | TTC_V2P | Window length = 1 minute | A1, A2 | A1: {Latitude, Longitude, Altitude, Timestamp, Speed} A2: {Latitude, Longitude, Altitude, Timestamp, Speed} | Enable |

Figure 30A:
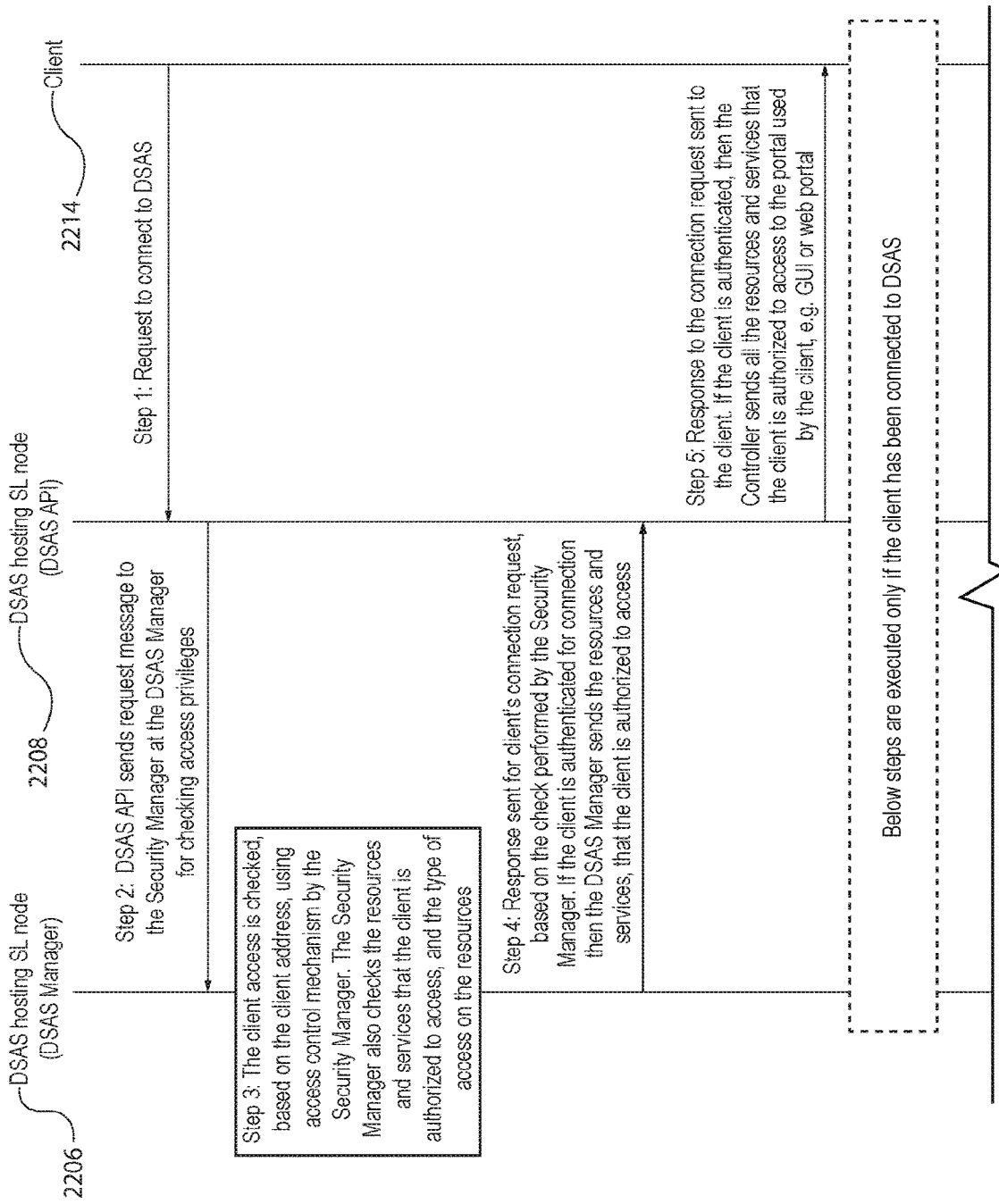
FIGS. 30A-B are a flow chart that illustrates details of query deployment procedure.
Figure 30B:
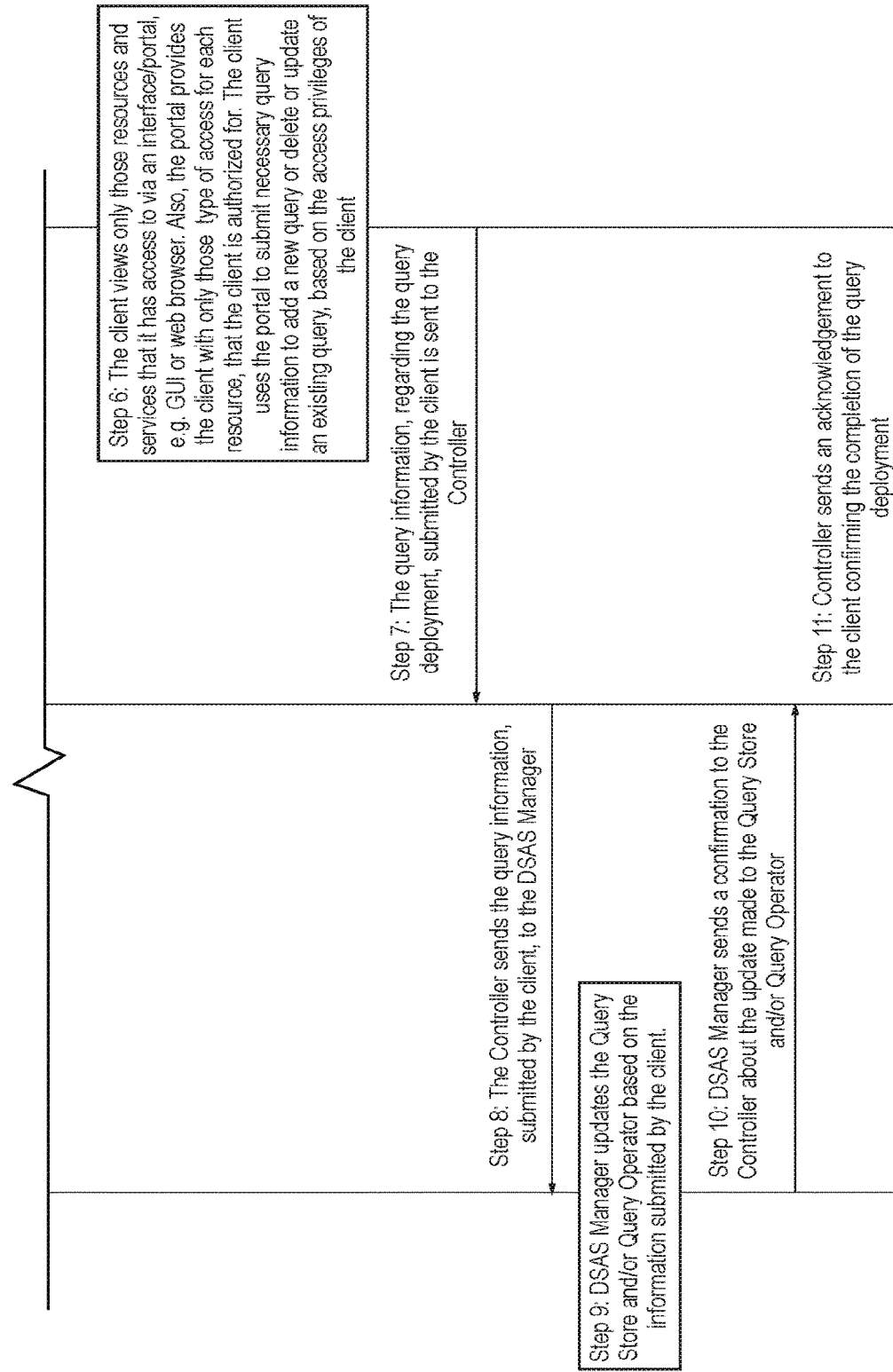

FIGS. 30A-B show detailed procedural description of Query Deployment.

In step 1 of FIGS. 30A-B, the client 2216 may be a user, an application or an IoT/M2M device who is interested in deriving some useful insight from a data stream observed by DSAS 2202. In order to deploy a query in DSAS 2202, as a first step, the client 2216 initiates a connection with the DSAS hosting node via the DSAS API 2208. The client 2216 sends a request via the portal, for instance a GUI or web browser, to establish connection with DSAS 2202. This request contains the client address that will be used to determine whether the client 2216 has necessary access privileges to connect to DSAS 2202, the resources and services that it has access to, and the kind of access it has for each of the resources.

In step 2 of FIGS. 30A-B, the client request for connection is received by the DSAS API 2208 component of DSAS 2202, which contains the API 2208 to enable the client side portals to interact with DSAS 2202. This connection request is forwarded to the DSAS Manager 2206 component, via the management API within DSAS API 2208.

In step 3 of FIGS. 30A-B, the Security manager 2302 within DSAS Manager 2206 uses predefined access control mechanism to check the privileges of the client 2216 within DSAS 2202. It checks whether the client 2216 has the privileges to access DSAS 2202. It also finds the resources and services that the client 2216 is authorized to access. Resources comprise of the tables that a client 2216 can access to, such as the Stream ID Store 2321 and the Query Store 2318. The access control mechanism also checks the kind of access the client 2216 have for each of these resources. The client 2216 may have read and write access for Stream ID Store 2321 and Query Store 2318. For the Log table, the client 2216 can only have read access, since the Log table can only be updated by the DSAS modules. More restrained authorization may limit the access of the client 2216 to only specific stream and queries within the Stream ID Store 2321 and Query Store 2318 respectively. Services comprise of the management services that a client 2216 can configure, such as the access control mechanism and the preprocessor configuration.

In step 4 of FIGS. 30A-B, the Security manager 2302 in the DSAS Manager 2206 sends back a response to the DSAS API 2208 for the client's connection request. If the client 2216 is authenticated by the Security manager 2302 and has the privileges to access DSAS, the Security manager 2302 also sends the resources and services which the client 2216 is authorized to access (discussed in Step 3 of FIGS. 30A-B).

In step 5 of FIGS. 30A-B, the DSAS API 2208 sends the response message to the client portal, e.g. web browser or GUI. If the client 2216 is authenticated, as specified in the response message, then the response message also includes the resources and the services that the client 2216 is authorized to access.

In step 6 of FIGS. 30A-B, if the client 2216 has been authenticated by the Security manager 2302 using access control mechanism, as specified by the response message received, then a connection is established between the client 2216 and the DSAS 2202 via the client 2216 side portal, e.g. the web browser or the GUI. The client gets the view of the resources and services that it can access via the portal. If the client has necessary authorization, as described by the client to perform query deployments, then the client submits required query information via the portal to DSAS 2202.

Based on the kind of query deployment the client is interested in performing, the client may send out corresponding query information, which may have the following different cases:

If the client is interested in adding a new query to the system, then the client submits the information, as shown in Table 6, via the portal. The client also deploys an implementation of the query operator within DSAS 2202.

TABLE 6

Parameters sent by Client for Adding New Query to DSAS 2202

| Parameter name | Property description |
|---|---|
| Query description | Description of what query does |
| Operator name | Operator implemented to deploy the query |
| Operator parameters | Set of input parameters to be used while invoking the operator |
| Input stream ID | List of input streams on which the query is executed (assuming there are 'm' number of streams in the network) |
| Attribute list | The list of attributes, corresponding to each data stream, that is required to process the concerned query |
| Priority level | Parameter to define the priority level of the query such that the DSAS 2202 can rank and prioritize its processing and response time to the query |
| Switch | Assumes the value 1 to 'Enable' and 0 to 'Disable' the query in DSAS 2202 |
| Output format | Format of the analytical results for the query, e.g. HTML, CSV |
| Output location | Location where the output (analytical results) of the query is stored |

If the client is interested in modifying an existing query in DSAS 2202, then the client submits the information, as shown in Table 7, via the portal. The client may be interested in updating just one property of the Query Store 2318. Hence, apart from the Query Description, which the client is required to select to identify the query it is interested in modifying, rest of the parameters which does not require updating by the client is optional. The client may also be interested in updating the query operator implementation, in which case it re-uploads a new query operator implementation or directly updates the implementation within DSAS 2202 via the portal.

TABLE 7

Parameters sent by Client for Modifying Existing Query to DSAS 2202

| Parameter name | Property description |
|---|---|
| Query description | Description of the query that needs to be modified |
| Operator name <optional> | Operator implemented to deploy the query |
| Operator parameters <optional> | Set of input parameters to be used while invoking the operator |
| Input stream ID <optional> | List of input streams on which the query is executed (assuming there are 'm' number of streams in the network) |
| Attribute list <optional> | The list of attributes, corresponding to each data stream, that is required to process the concerned query |
| Priority level <optional> | Parameter to define the priority level of the query such that the DSAS can rank and prioritize its processing and response time to the query |
| Switch <optional> | Assumes the value 1 to 'Enable' and 0 to 'Disable' the query in DSAS |
| Output format | Format of the analytical results for the query, e.g. HTML, CSV |
| Output location | Location where the output (analytical results) of the query is stored |

If the client is interested in deleting a query from DSAS 2202, then the client submits the information, as shown in Table 8, via the portal. Hence, the client only requires to send the Query Description via the portal.

TABLE 8

Parameters sent by Client for Deleting Existing Query from DSAS

| Parameter name | Property description |
|---|---|
| Query description | Description of the query that needs to be modified |

In step 7 of FIGS. 30A-B, the query information submitted by the client through the portal is received by the DSAS API 2208.

In step 8 of FIGS. 30A-B, the DSAS API 2208 sends the query information, submitted by the client, to the DSAS Manager 2206.

In step 9 of FIGS. 30A-B, the DSAS Manager 2206 updates the Query Store 2318 based on the information sent by the client via the portal. In case of adding a new query to the system, the DSAS Manager 2206 assigns a unique Query ID to each new query added to the system, and makes a new entry in the Query Store 2318 against the Query ID, based on the information sent by the client. The Query Operator implementation is also stored in DSAS 2202 via the DSAS Manager 2206. In case of modifying an existing query, the DSAS Manager 2206 refers to the list of parameters sent by the client to update the Query Store 2318 accordingly. The Query Operator is modified via the DSAS Operator, if the client requested for operator implementation update. In case of deleting a query from DSAS 2202, the DSAS Manager 2206 refers to the Query Description sent by the client, and deletes the entry from Query Store 2318 and corresponding operator implementation from DSAS-SAE 2210. The 'Host address' field in Query Store 2318 is set to localhost since the same node that receives the query performs stream analytics to answer the query. The value of the 'Host address' in the distributed scenario has been discussed later in the next section (Data Stream Analytics Service as a Distributed Service).

In step 10 of FIGS. 30A-B, the DSAS Manager 2206 sends a confirmation to the DSAS API 2208 about updates made to the Query Store 2318 and the query operator.

In step 11 of FIGS. 30A-B, DSAS API 2208 sends an acknowledgement to the client, confirming the completion of the query deployment procedure Besides the above procedures, some more discussions are presented for Intelligent Query Deployment: As described above, a query can be deployed in DSAS 2202 by an external client, who can create, modify, delete or enable/disable a query in DSAS 2202. However, it is possible to introduce a smart Query manager 2316 in DSAS 2202. A query manager 2316 can be made intelligent by implementing machine learning algorithms in the system, and using the machine learning techniques to train the query manager 2316 to make smart decisions regarding the query.

A smart query manager 2316 can be used to check for queries, which have not been used for a long time and remove them from the system to free up resources. If required by the applications, it can also be used to make sure that query modifications in DSAS 2202 are not done frequently. Very frequent query modifications may affect the quality of the results generated and may not be desirable for certain applications. If the DSAS 2202 also has a batch analytics services incorporated in it, then the smart query manager 2316 may also be used identify the appropriate queries which are frequently used in batch analytics, and propose that these be deployed in the streaming analytics scenario, or deploy these queries automatically, if the translation of query from batch analytics to stream analytics is feasible.

Batch Analytics is a way of processing data, where large volumes of data is collected over a period of time and then, processed and analyzed in a batch. Hence, for batch analytics, data is generally stored in a data repository, such as database or a data warehouse.

It is understood that the entities performing the steps illustrated in FIGS. 30A-B are logical entities that may be implemented in the form of software (i.e., computer-executable instructions) stored in a memory of, and executing on a processor of, a network apparatus or computer system such as those illustrated in FIG. 49C or FIG. 49D. That is, the method(s) illustrated in FIGS. 30A-B may be implemented in the form of software (i.e., computer-executable instructions) stored in a memory of a network apparatus, such as the apparatus or computer system illustrated in FIG. 49C or FIG. 49D, which computer executable instructions, when executed by a processor of the apparatus, perform the steps illustrated in FIGS. 30A-B. It is also understood that any transmitting and receiving steps illustrated in FIGS. 30A-B may be performed by communication circuitry of the apparatus under control of the processor of the apparatus and the computer-executable instructions (e.g., software) that it executes.

Procedure C: Data Stream Analytics

Figure 31:
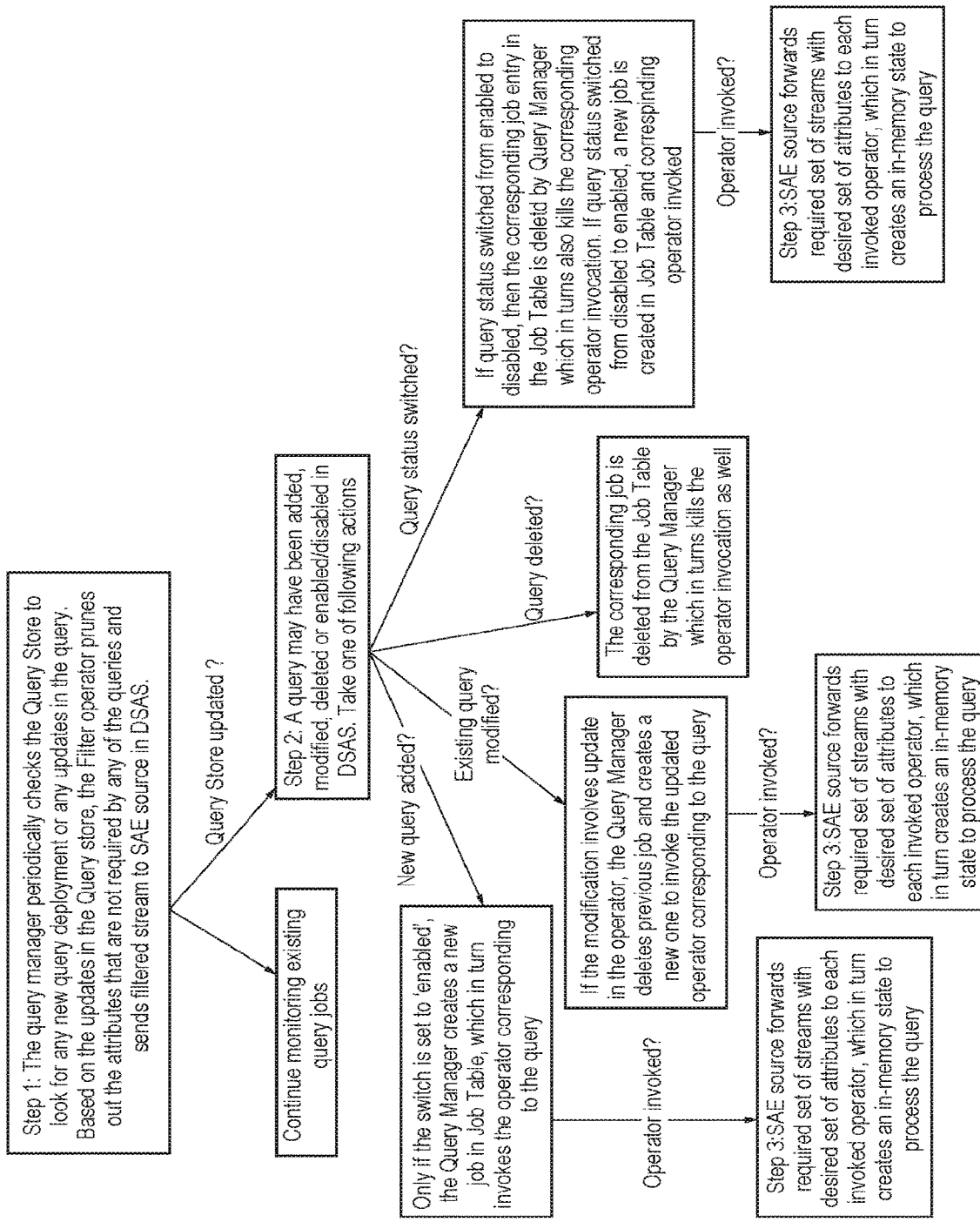
FIG. 31 is a diagram that illustrates details of a data stream analytics procedure.

As mentioned earlier, Data Stream Analytics are performed in order to process all the queries in the Query Store 2318 which have been set to 'Enabled'. FIG. 31 shows the detailed workflow for the data stream analytics process.

In step 1 of FIG. 31, as a first step, the query manager 2316 periodically checks for any updates in the Query Store 2318.

If the Query Store 2318 has been empty before, and the Query manager 2316 just found the first query entry in the Query Store 2318, it reports about the update to DSAS Manager 2206 which invokes the Analytics filter 2310 for the first time, and the preprocessed parsed data stream is now forwarded from Preprocessor 2306 to the Analytics filter 2310. The Analytics filter 2310 is used to prune out all the attributes from all the data stream observed by DSAS 2202, which are not required by any of the queries stored in the Query Store 2318. The filtered stream to SAE Source 2314 in DSAS-SAE 2210 component. We then move to step 2. The Analytics filter 2310 is implemented in an optimized manner, so that the unnecessary attributes are pruned based on the list of queries and the data stream.

If the Query Store 2318 is not empty, and there has been no update in the Query Store 2318 and/or Query Operators 2312, then the Query manager 2316 continues to manage the ongoing job.

If the Query Store 2318 is not empty, and there has been updates in the Query Store 2318 and/or Query Operators 2312, then move to step 2.

In step 2 of FIG. 31, depending on the update in the Query Store 2318, one of the following 4 steps are taken:

If a new query has been introduced in DSAS 2202 and a new entry is made in the Query Store 2318, then if the 'Switch' entry in the Query Store 2318 is set as enabled, then the Query manager 2316 creates a new job for this query and updates the Job Table 2320 (shown in Table 9). The Job ID field in the table uniquely identifies each job. The Job ID field may be the parent process ID of the job, which can also be used to monitor the related process and child processes. The job invokes the operator that is specified in the Query Store 2318 corresponding to the newly entered query.

If a query has been modified in DSAS 2202, then if the modification requires re-invocation of the corresponding operator, the Query manager 2316 deletes the previous job from the Job Table 2320 and creates a new job, re-invoking the operator processing the modified query.

If a query has been deleted in DSAS 2202, then the corresponding job is deleted from the Job Table 2320, killing the corresponding operator instances. The in-memory state are stored in volatile memory so killing the job also deletes the in-memory state automatically.

If a query switch is changed from disabled to enabled in the Query Store 2318, then the Query manager 2316 creates a new job for this query and updates the Job Table 2320 (shown in Table 9). The job invokes the operator that is specified in the Query Store 2318 corresponding to the newly enabled query. If the query is switched from enabled to disabled, then the corresponding job is deleted by the Query manager 2316 from the Job Table 2320.

TABLE 9

Description of Job Table 2320

| Property name | Multi-plicity | Property description |
| --- | --- | --- |
| Job ID | 1 | Each job is assigned a unique ID |
| Query ID | 1 | Each job mapped to individual query |
| Job status | 1 | Status of the job: running, terminated, running with error, etc |
| Log Names/Location | 1 . . . n | List of names and corresponding location of the log/trace generated by the job |

In step 3 of FIG. 31, SAE source 2314 feeds the required set of streams with the desired attributes to each operator corresponding to each query that in turn creates an in-memory state in order to process the query. This in-memory state is maintained continuously.

It is understood that the entities performing the steps illustrated in FIG. 31 are logical entities that may be implemented in the form of software (i.e., computer-executable instructions) stored in a memory of, and executing on a processor of, a network apparatus or computer system such as those illustrated in FIG. 49C or FIG. 49D. That is, the method(s) illustrated in FIG. 31 may be implemented in the form of software (i.e., computer-executable instructions) stored in a memory of a network apparatus, such as the apparatus or computer system illustrated in FIG. 49C or FIG. 49D, which computer executable instructions, when executed by a processor of the apparatus, perform the steps illustrated in FIG. 31. It is also understood that any transmitting and receiving steps illustrated in FIG. 31 may be performed by communication circuitry of the apparatus under control of the processor of the apparatus and the computer-executable instructions (e.g., software) that it executes.

Procedure D: Output Triggering

We know that the query in a data stream processing system is long standing and continuously running. Though the memory state for a query is maintained continuously, the state may not be used continuously to answer a query. An answer to the query may be generated continuously or may be required occasionally only when an event is triggered. Output triggering is the step that answers a query based on the requirement of the application. Let us review the Query 1 and Query 2 as discussed in the IITS use case:
1) Query 1: Calculate the time to collision between any two vehicles within the communication range of an intersection
2) Query 2: Calculate the time to collision between any car within communication range of the intersection and a pedestrian In the above example, output for the Query 1 is triggered continuously because the intersection management hub needs to continuously keep track of the time before collision between any two vehicles close to the intersection. However, output for Query 2 is triggered only when a pedestrian is detected at the intersection, about to cross the intersection. In this case, the event that triggers an output for Query 2 is the detection of a pedestrian at an intersection.

However a query output may also be triggered manually by a client 3202. For instance, consider a vehicle driver using a smart app to find out the condition of the traffic flow in an intersection. In this case, the smart app may be considered as a client 3202. The driver handling the app may explicitly request for the traffic condition at the intersection. In this example, though the traffic condition is continuously being analyzed in the backend, but it is shown on the app only on being explicitly requested by the driver/app.

If a client 3202 connects to the DSAS 2202 to trigger a result from the query, its permission is validated over ACP, and then given information about each query by DSAS via DSAS API 2208. The detailed description of Output Triggering procedure is given below.

If a client 3202 connects to the DSAS 2202 to trigger a query, its permission is validated over ACP, and then given information about each query by DSAS 2202 via DSAS API 2208. The detailed description of Query Triggering procedure is given below.

Figure 32A:
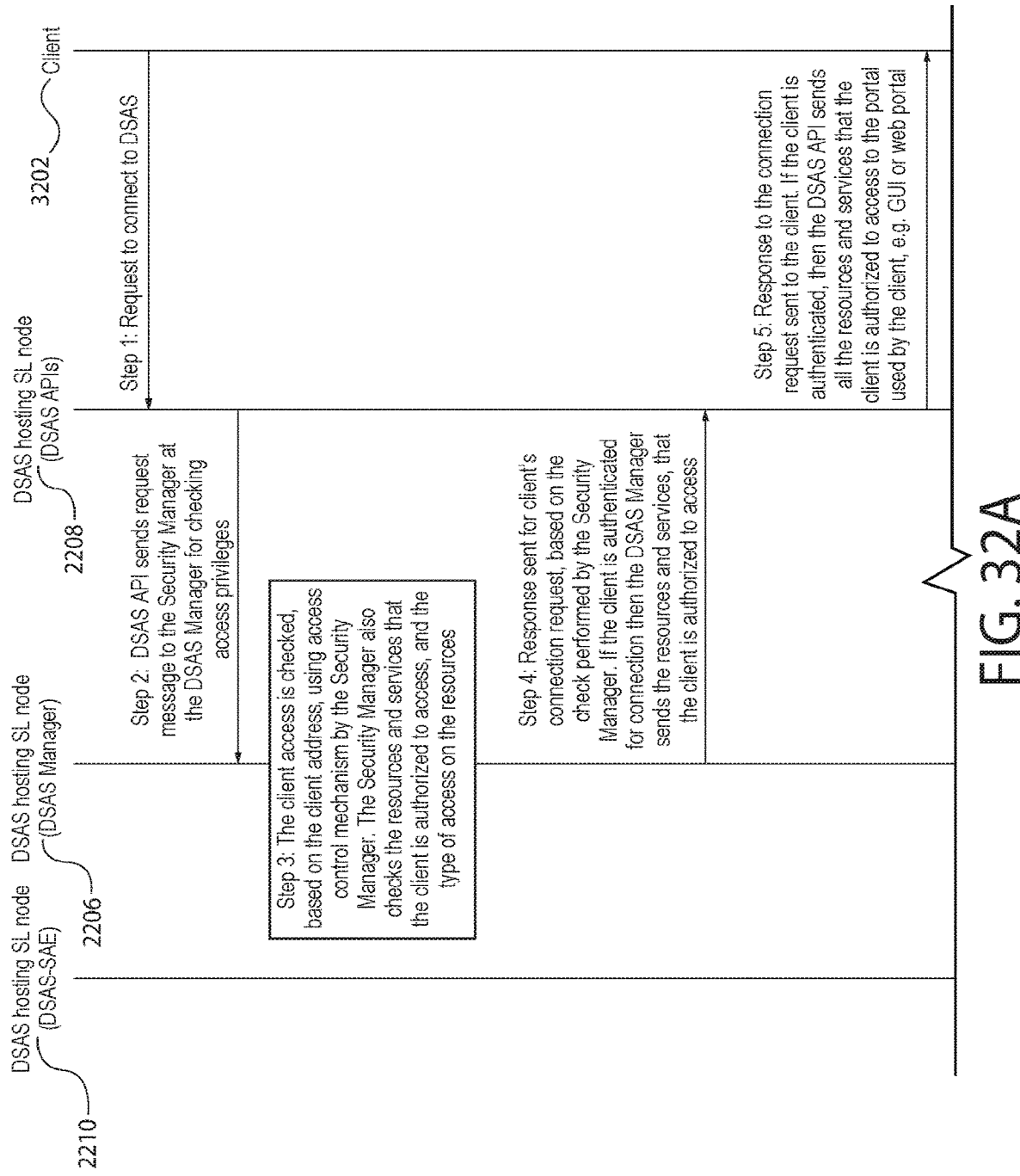
FIGS. 32A-B are a flow chart that illustrates details of output triggering.
Figure 32B:
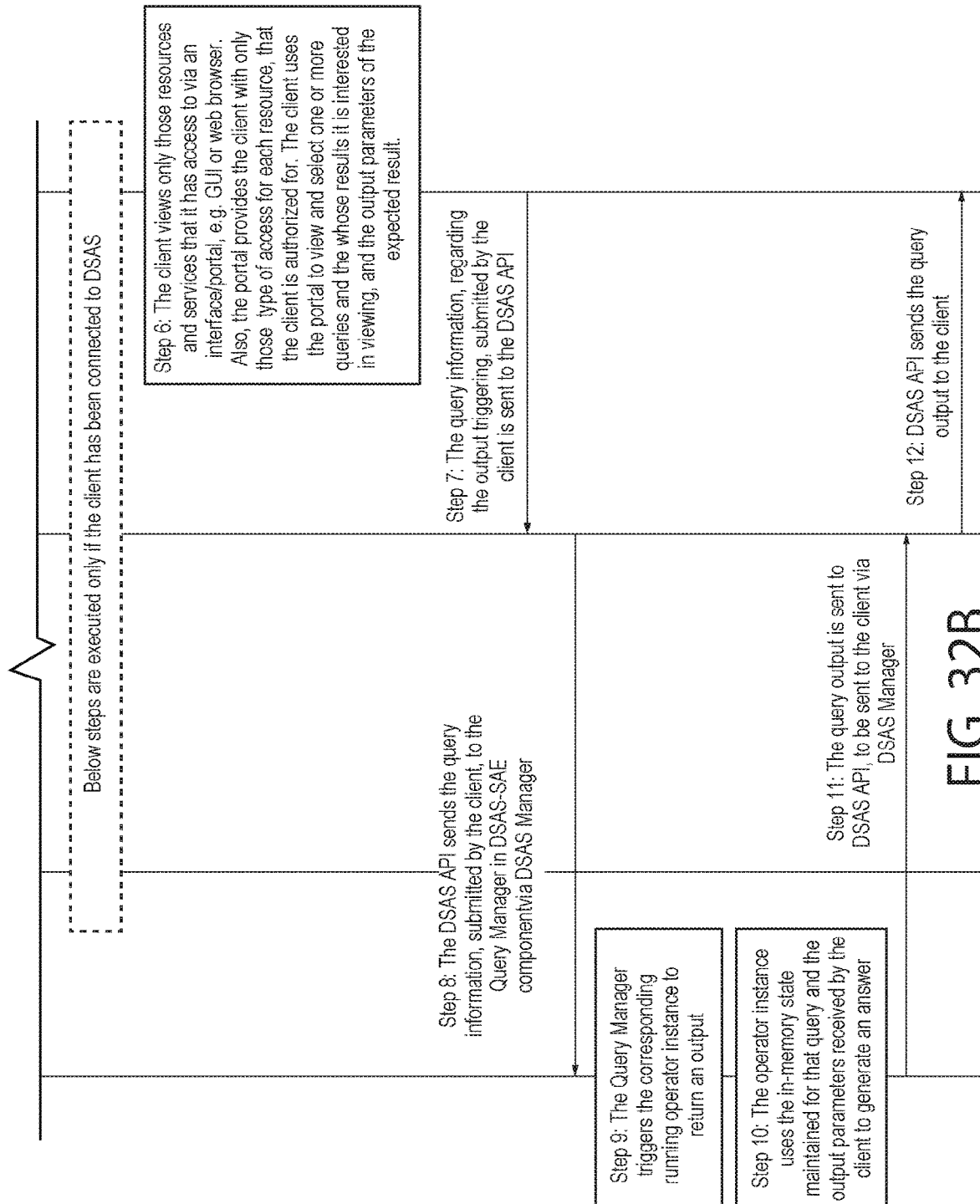

In step 1 of FIGS. 32A-B, the client 3202 may be a user, an application or an IoT/M2M device who is interested in deriving some useful insight from a data stream observed by DSAS 2202. The client 3202 can be a different client 2216 than the client 3202 shown in FIG. 22. In order to get an output or results for a query in DSAS 2202, as a first step, the client initiates a connection with the DSAS hosting node via the DSAS API 2208. The client 3202 sends a request via the portal, for instance a GUI or web browser, to establish connection with DSAS 2202. This request contains the client address that will be used to determine whether the client 3202 has necessary access privileges to connect to DSAS 2202, the resources and services that it has access to, and the kind of access it has for each of the resources.

In step 2 of FIGS. 32A-B, the client request for connection is received by the DSAS API 2208 component of DSAS 2202, which contains the API 2208 to enable the client side portals to interact with DSAS 2202. This connection request is forwarded to the DSAS Manager 2206 component, via the management API within DSAS API 2208.

In step 3 of FIGS. 32A-B, the Security manager 2302 within DSAS Manager 2206 uses predefined access control mechanism to check the privileges of the client 3202 within DSAS 2202. It checks whether the client 3202 has the privileges to access DSAS 2202. It also finds the resources and services that the client 3202 is authorized to access. Resources comprise of the tables that a client 3202 can access to, such as the Stream ID Store 2321 and the Query Store 2318. The access control mechanism also checks the kind of access the client 3202 have for each of these resources. In this case, the client 3202 requires a read access to the list of query descriptions for which it is interested in getting an output. It also requires access to send necessary parameters for the result to DSAS 2202.

In step 4 of FIGS. 32A-B, the Security manager 2302 in the DSAS Manager 2206 sends back a response to the DSAS API 2208 for the client's connection request. If the client 3202 is authenticated by the Security manager 2302 and has the privileges to access DSAS 2202, the Security manager 2302 also sends the resources and services which the client is authorized to access (discussed in Step 3). In this case, the client must receive the list of query description from DSAS 2202 for which it is interested in viewing the result.

In step 5 of FIGS. 32A-B, the DSAS API 2208 sends the response message to the client portal, e.g. web browser or GUI. If the client is authenticated, as specified in the response message, then the response message also includes the resources and the services that the client is authorized to access.

In step 6 of FIGS. 32A-B, if the client has been authenticated by the Security manager 2302 using access control mechanism, as specified by the response message received, then a connection is established between the client and the DSAS 2202 via the client side portal, e.g. the web browser or the GUI. The client gets the view of the resources and services that it can access via the portal. If the client has necessary authorization, as described by the client to trigger output for specific queries, then the client submits required query information via the portal to DSAS 2202.

Table 10 shows the parameters that the Client 3202 sends to trigger output for specific queries. The client 3202 can submit request to trigger output for one or more queries

TABLE 10

Parameters for Triggering Output for Queries within DSAS

| Parameter name | Property description |
| --- | --- |
| Query description | Description of the query for which output is required |
| Output Parameters | Set of parameters for the results, e.g. maximum error tolerance, window length, output format, etc |

In step 7 of FIGS. 32A-B, the query information submitted by the client 3202 through the portal is received by the DSAS API 2208.

In step 8 of FIGS. 32A-B, the DSAS API 2208 sends the query information, submitted by the client 3202, to the Query manager 2316 in DSAS-SAE 2210, via DSAS Manager 2206.

In step 9 of FIGS. 32A-B, the Query manager 2316 triggers the corresponding running operator instance(s)—the user may be interested in the results for more than one queries In step 10 of FIGS. 32A-B, the operator instances use their corresponding in-memory states that each maintain for their respective query, and the corresponding output parameters sent by the client 3202 for each query, to generate an output for the query.

In step 11 of FIGS. 32A-B, the Query manager 2316 sends out the corresponding results of the query to the DSAS API 2208 via DSAS Manager 2206. The output of the query is retrieved by the Query manager 2316 from the output location specified in the Query Store 2318. There may be other ways for the client 2216 to access the output, such as the output being sent by the Query operator 2312 directly to the client 2216 portal via DSAS Manager 2206 and the API 2208.

In step 12 of FIGS. 32A-B, DSAS API 2208 sends the required results to the client 3202, as desired by the client 3202.

It is understood that the entities performing the steps illustrated in FIGS. 32A-B are logical entities that may be implemented in the form of software (i.e., computer-executable instructions) stored in a memory of, and executing on a processor of, a network apparatus or computer system such as those illustrated in FIG. 49C or FIG. 49D. That is, the method(s) illustrated in FIGS. 32A-B may be implemented in the form of software (i.e., computer-executable instructions) stored in a memory of a network apparatus, such as the apparatus or computer system illustrated in FIG. 49C or FIG. 49D, which computer executable instructions, when executed by a processor of the apparatus, perform the steps illustrated in FIGS. 32A-B. It is also understood that any transmitting and receiving steps illustrated in FIGS. 32A-B may be performed by communication circuitry of the apparatus under control of the processor of the apparatus and the computer-executable instructions (e.g., software) that it executes.

Procedure E: Data Storage

In most of the cases, the data is stored at different data collection points of the service layer for management reasons. In many applications, these data are further forwarded to cloud or infrastructure nodes for warehousing the data for the purpose of later and/or deeper analysis.

Hence, once the SIM/P 2304 module of DSAS has parsed the data stream, the data is passed via the preprocessor 2306 and the Storage filter 2308 for storage, if applicable.

The Storage filter 2308 is used to reduce the dimension of the data stream by pruning out the unnecessary attributes from each tuple, such as attributes which are generated by IoT devices for their own specific usage and may be of no importance in the later part of transmissions. This filter also may use compression techniques, based on the storage policy, to optimize the data for storage. Storage filter 2308 provides the following two benefits to the IoT service layer:

1. Reduces the communication cost of transmitting data across service layer nodes to the infrastructure node.
2. Reduces the storage requirement of the data collection points in the service layer. The storage cost is also reduced drastically for the data warehouses in the cloud or at the infrastructure nodes.

Storage filter 2308 that reduces the data stream before sending it out for data storage is configured by the client, based on the storage policy of the storage nodes or the device guidelines. These policies define rules that specify which attributes in a data stream and/or the extracted from the pre-processor are stored. For instance, some attributes of a data stream may not be required later, and are present only for the reference of the device generating the data. Using the device guidelines, these attributes can be pruned out from the data stream using the pre-processor.

Data Stream Analytics Service as a Distributed Service

In this section, we consider the distributed scenario, in which multiple DSAS can be deployed in the system. In particular, a distributed DSAS service is needed for the below reasons:

Facilitate real time analytics on data stream from distributed data sources. The streaming analytics can be performed on the union of all or subset of the streams from distributed setup in a coordinator node or on cloud using cloud service. For example, the traffic flowing through an individual intersection can leverage real time analytics performed locally at the intersection itself. However, to optimize traffic flow across intersections (e.g. within an entire city), an additional level of analytics can be performed at a central location (e.g. in the cloud). This can be done by individual intersections providing data streams of their results back to the cloud, and the cloud can then perform analytics on these streams and enable intersections to make adjustments in a coordinated manner.

Facilitate edge analytics—move as much analytics as possible to the edge and move more complex analytics farther from the edge to avoid overloading of the edge nodes Load balancing—given massive data, the complex analytics can be distributed across several nodes for faster and possibly parallel analysis Scalability—to make the system more scalable with the increasing throughput or size of the data stream A distributed set up of DSAS hosting SL nodes will provide the above mentioned advantages to the service layer. Data stream can be communicated to different nodes over light weight message passing models such as MQTT, Extensible Messaging and Presence Protocol (XMPP) etc. These models also ensure reliability on message delivery. All or few of these SL nodes may also be connected to the light weight cloud services, so that the system is robust and may move the analytics operations to cloud as required. A distributed set up of the SL nodes, along with distributed cloud services add flexibility and robustness to DSAS 2202 in the context of data stream analytics.

We have identified the following 3 generic layouts of multiple distributed DSAS nodes in the IoT/M2M service layer.

Figure 33A:
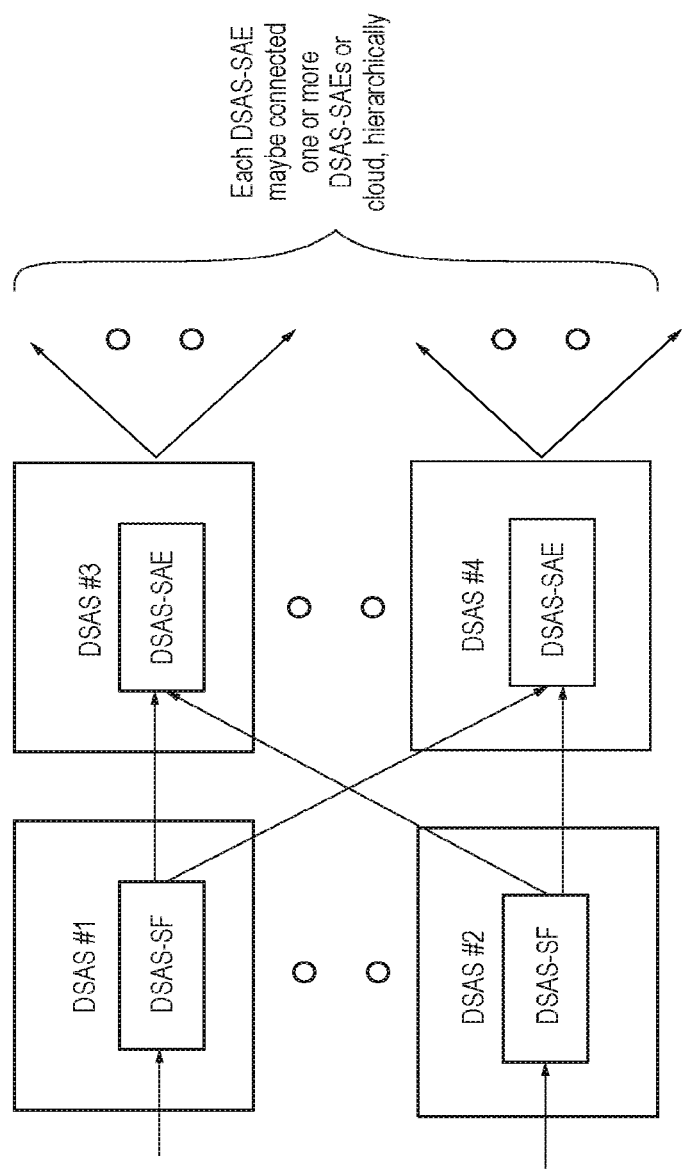
FIGS. 33A-C are diagrams that illustrates distributed layout of DSAS in the service layer.

FIG. 33A shows a distributed setup where DSAS-SF 2212 and DSAS-SAE 2210 components are hosted on two separate DSAS hosting service layer nodes. This covers the case where there are one or more DSAS nodes with DSAS-SF 2212 component, each receiving different set of data streams. These DSAS hosting nodes with DSAS-SF 2212 components are connected to one or more DSAS nodes with DSAS-SAE 2210 component only. This setup is useful specially when the node closer to the edge has low processing capabilities and are only used to preprocess and forward data stream to other nodes for stream analytics and storage.

The DSAS node with DSAS-SAE 2210 component maybe hierarchically connected to DSAS-SAE 2210 components of other DSAS nodes or to the cloud nodes with stream analytics capabilities, to distribute and parallelize the analytics operation across multiple nodes for faster and efficient data analysis.

Figure 33B:
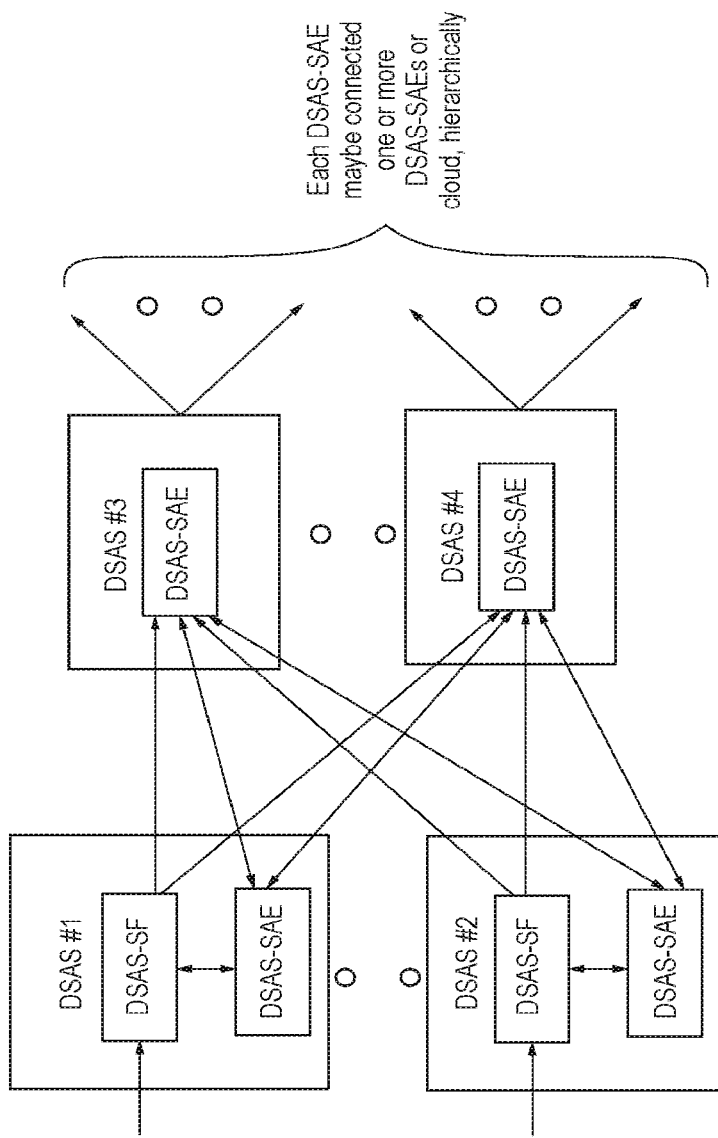

FIG. 33B shows a scenario where the DSAS hosting node closest to the data source has both DSAS-SF 2212 component for preprocessing and DSAS-SAE 2210 component for analytics operations. This covers the case where there are one or more DSAS nodes with DSAS-SF 2212 component, each receiving different set of data streams. Now a client deploys a query or requests for an output for a query via a DSAS hosting node which is not directly receiving the data stream. Consider that a client has made a request to deploy a query via DSAS #3 in FIG. 33B. Then this DSAS-SAE 2210 will communicate with DSAS-SF #1 and/or DSAS #2 depending on which DSAS-SF 2212 components receive the data streams required for the query. In this case, along with communicating with DSAS-SAE 2210 component of the same nodes for data analytics operations, these DSAS-SF 2212 components will also communicate with one or more DSAS-SAE 2210 component of other DSAS hosting SL nodes. The DSAS node with DSAS-SAE 2210 component maybe hierarchically connected to DSAS-SAE 2210 components of other DSAS nodes or to the cloud nodes with stream analytics capabilities, nodes to distribute and parallelize the analytics operation across multiple nodes for faster and efficient data analysis.

Figure 33C:
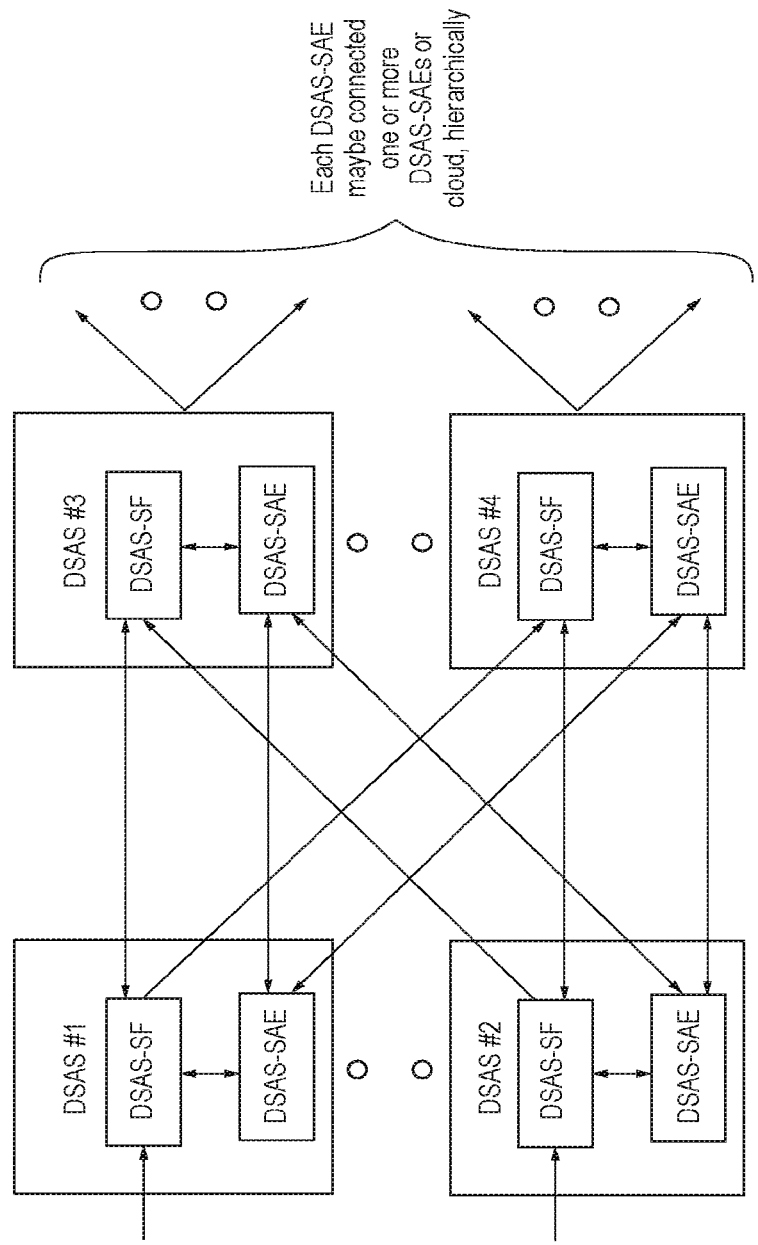

FIG. 33C shows a distributed setup where each of the DSAS hosting SL nodes contain both DSAS-SF 2212 and DSAS-SAE 2210 for data preprocessing and stream analytics. In the example given above, where the client makes a request to deploy a query via a DSAS hosting node which is not directly connected to the stream, the DSAS-SAE node of DSAS #3 (FIG. 33C) may directly connect to DSAS-SF 2212 components of DSAS #1 and/or DSAS #2, or may connect via the DSAS-SF 2212 component of its own node. This setup can be useful in a scenario where the first DSAS hosting node performs stream analytics operation but are also connected to other DSAS-SAE nodes and/or cloud with streaming analytics capabilities to for load distribution and parallelization.

In the FIG. 33, it is interesting to note that the communication between any two DSAS-SAE 2210 components of different DSAS hosting SL nodes for load distribution and parallelization of the data stream analytics operations mostly depends on the architectural setup and the implementation of the underlying distributed data stream analytics engine. Based on the logic used for distributing the stream analytics operation (for instance, Apache Storm and IBM Infosphere Stream use their own respective logic, Topology and Data Flow Graph respectively, for load distribution and parallelization of data stream application across distributed nodes.)

However, the communication between DSAS-SF 2212 and DSAS-SAE 2210 follows the same procedural details as specified above for single DSAS hosting node, with the difference that now the components would be hosted in different nodes and communicate with each other via DSAS Manager 2206.

A distributed system needs to operate in coordination with each other. This coordination is required for communication across distributed system, load balancing of services and streaming analytics operation across distributed system, parallelization of streaming analytics operation of streaming analytics system, scalability, such that the system can be scaled up or down based on the load on the system, and fault recovery, such that in case of failure of services or operations in a node other nodes can resume the failed services or operations. There are two ways to manage coordination between distributed nodes: Centralized Monitoring and Peer-to-Peer monitoring:

Distributed System with Centralized Monitoring: In the case of centralized monitoring, a single centralized node act as a coordinator for the distributed system. It is responsible for load balancing, fault recovery and communication across distributed system. This setup requires an additional management service in the coordinator node to perform the coordination across distributed node.

In a distributed system with centralized monitoring, the client connects to the coordinator to deploy query or request for analytical results and the coordinator distributes job across the system. One of the DSAS hosting SL node within the IoT/M2M service layer located on the network or in cloud may act as the coordinator. This node will have an additional component within DSAS 2202, called Coordinator module. The client communicates with DSAS via this Coordinator module using the DSAS API 2208. This coordinator is used to coordinate communication amongst all the distributed DSAS hosting SL nodes through DSAS Manager 2206 of each node. In this setup, the processes and services running within individual DSAS hosting node are still managed by the DSAS Manager 2206, but in case the DSAS Manager 2206 is unable to recover the failed processes or jobs, it communicates with the coordinator node, so that if possible, the failed job can be resumed in other node(s) by the Coordinator.

The Host ID field in the Query Store 2318 shown in Table 4 should be the host address of the coordinator node. DSAS-SF 2212 sends out the filtered data stream via the DSAS Manager 2206 to the DSAS-SAE 2210 component of the coordinator node which then deploys it across the distributed system via Coordinator 3402 component.

It is understood that the functionality illustrated in FIG. 33A-C, may be implemented in the form of software (i.e., computer-executable instructions) stored in a memory of, and executing on a processor of, an apparatus of an M2M network (e.g., a server, gateway, device, or other computer system), such as one of those illustrated in FIG. 49C or 49D described below.

Figure 34:
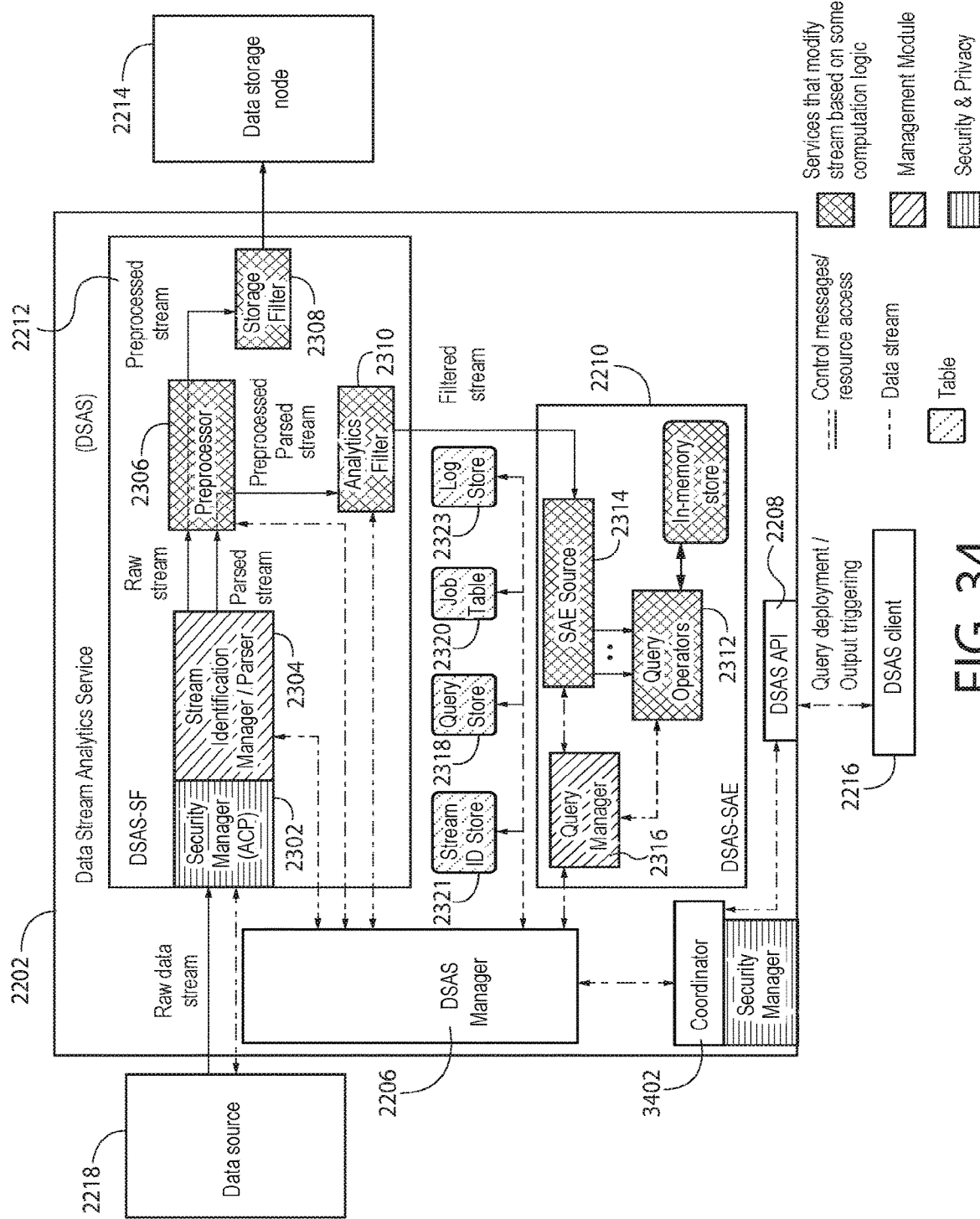
FIG. 34 is a diagram that illustrates an architecture of the central coordinator in a distributed system.

A possible architecture for DSAS with the Coordinator 3402 component has been shown in FIG. 34.

Distributed System with Peer-to-Peer Monitoring: In the case of peer to peer monitoring, each node in the system act as a coordinator 3402 for the distributed system. The client may connect to any of the node to deploy query or request for analytical results and that node is fully responsible for load balancing, fault recovery and communication across distributed system for the query that it receives. In this setup, the DSAS Manager 2206 within the node acts as a coordinator 3402 across the distributed system for the query it received. The Host ID field in the Query Store 2318 shown in Table 4 should be the host address of the DSAS hosting node where the query was deployed. DSAS-SF 2212 sends out the filtered data stream via the DSAS Manager 2206 to the DSAS-SAE 2210 component of the node specified in the host address, which is then responsible for distributing the analytics operation related to the query to other DSAS hosting nodes in the system via DSAS Manager 2206.

In this setup, the processes and services running within individual DSAS hosting node are still managed by the DSAS Manager 2206, but in case the DSAS Manager 2206 is unable to recover the failed processes or jobs, it communicates with the DSAS Manager 2206 of other DSAS hosting nodes, so that if possible, the failed job can be resumed in other node(s) by the respective DSAS Manager 2206.

Ease of Enabling/Disabling DSAS in Service Layer

Figure 35:
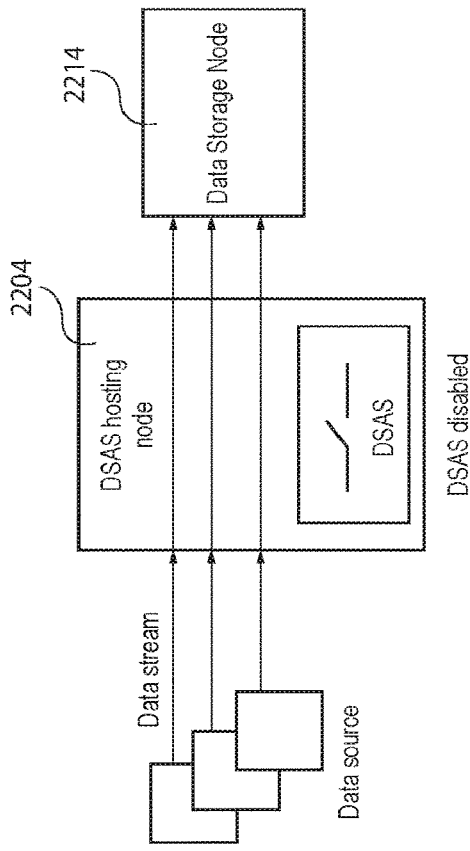
FIG. 35 is a diagram that illustrates the option of disabling DSAS in the service layer.
Figure 36:
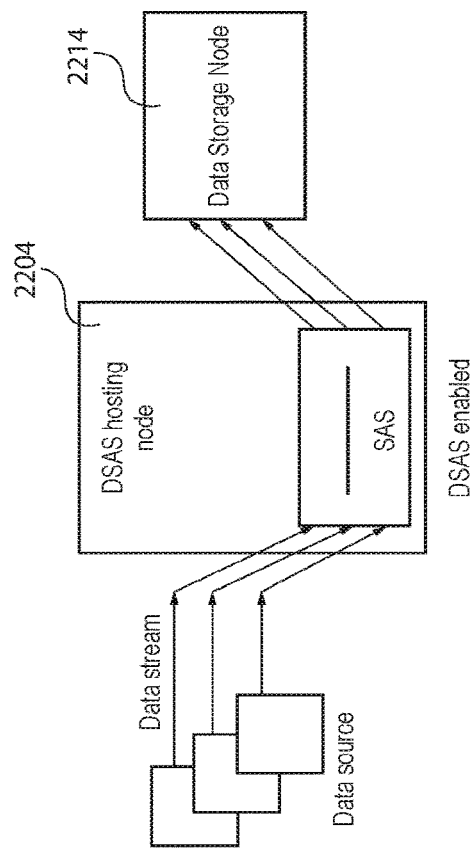
FIG. 36 is a diagram that illustrates the option of enabling DSAS in the service layer.

Similar to any other service, DSAS 2202 will require some amount of resources in order to provide data stream analytics capabilities. This overhead might not always be desirable within a service layer. Hence, based on the current requirement of a service layer to process and analyze, it should be flexible to enable or disable DSAS 2202 within a service layer. FIGS. 35-36 show an equivalent of switch to disable or enable DSAS 2202 in the service layer respectively. FIG. 35 shows that if DSAS 2202 is disabled in the service layer, then DSAS hosting node just acts as a router to forward the data to the first data collection point, if located at a different node.

This section presents the embodiments of the DSAS functionalities within the oneM2M architecture. First, the DSAS 2202 can be integrated as a CSF in the CSE. Then DSAS 2202 related resources and attributes are presented to show the integration with the oneM2M resource tree. Finally, oneM2M procedures are provided to realize the various DSAS procedures.

It is understood that the functionality illustrated in FIGS. 35-36, may be implemented in the form of software (i.e., computer-executable instructions) stored in a memory of, and executing on a processor of, an apparatus of an M2M network (e.g., a server, gateway, device, or other computer system), such as one of those illustrated in FIG. 49C or 49D described below.

DSAS as a New CSF

Figure 37:
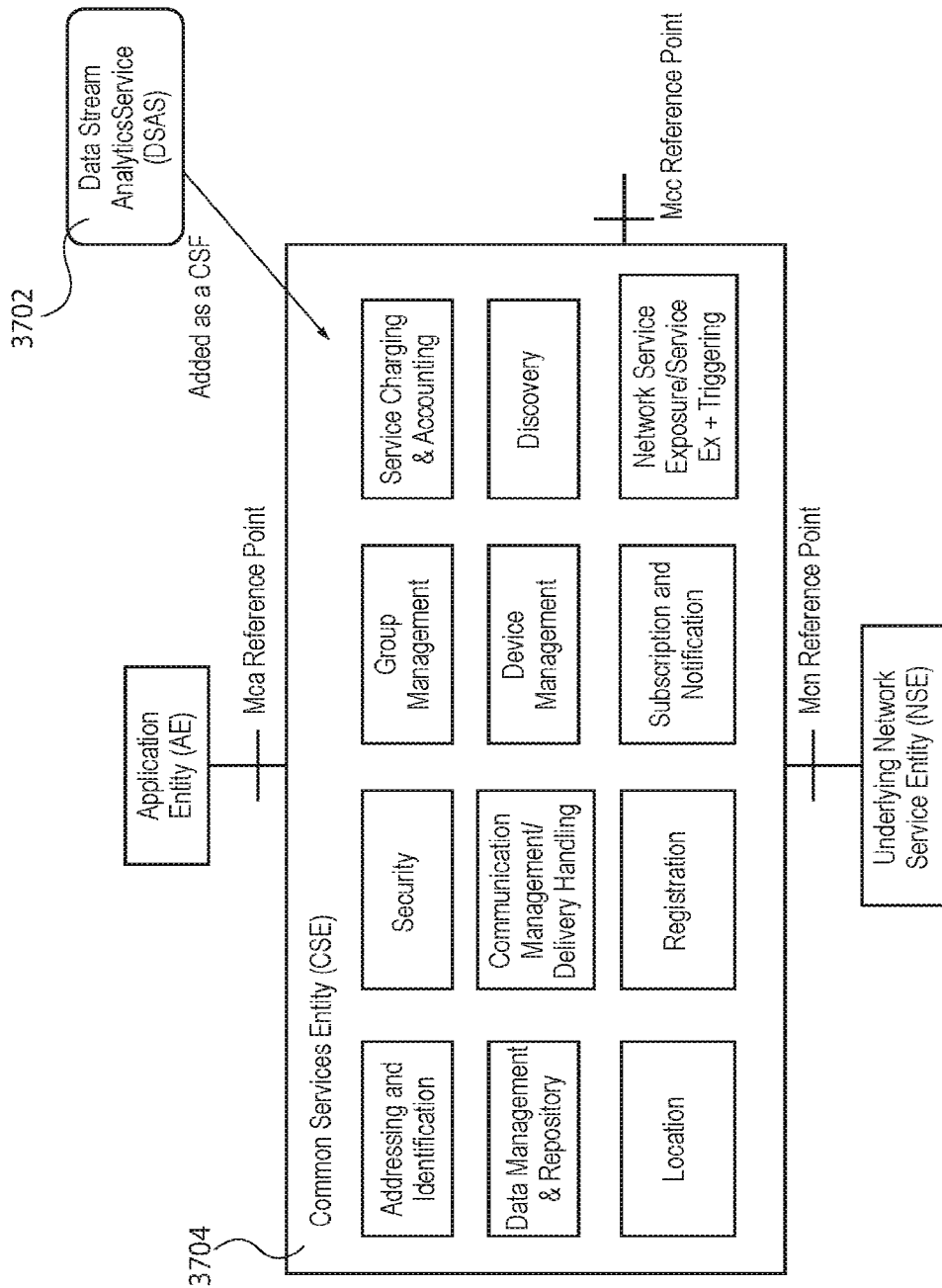
FIG. 37 is a diagram that illustrates a DSAS as a new CSF in oneM2M service layer.

Common Service Functions (CSF) is defined as informative architectural construct which conceptually groups together a number of sub-functions. Each oneM2M Common Service Entity (CSE) is an instantiation of a set of CSFs of oneM2M environment. A realization of the Data Stream Analytics Service (DSAS) can be as a new CSF to the oneM2M CSE (DSAS CSF 3702) as shown in FIG. 37. A DSAS hosting CSE 3704 can include the DSAS CSF 3702.

Architectural Layout of DSAS in oneM2M Service Layer

Figure 38:
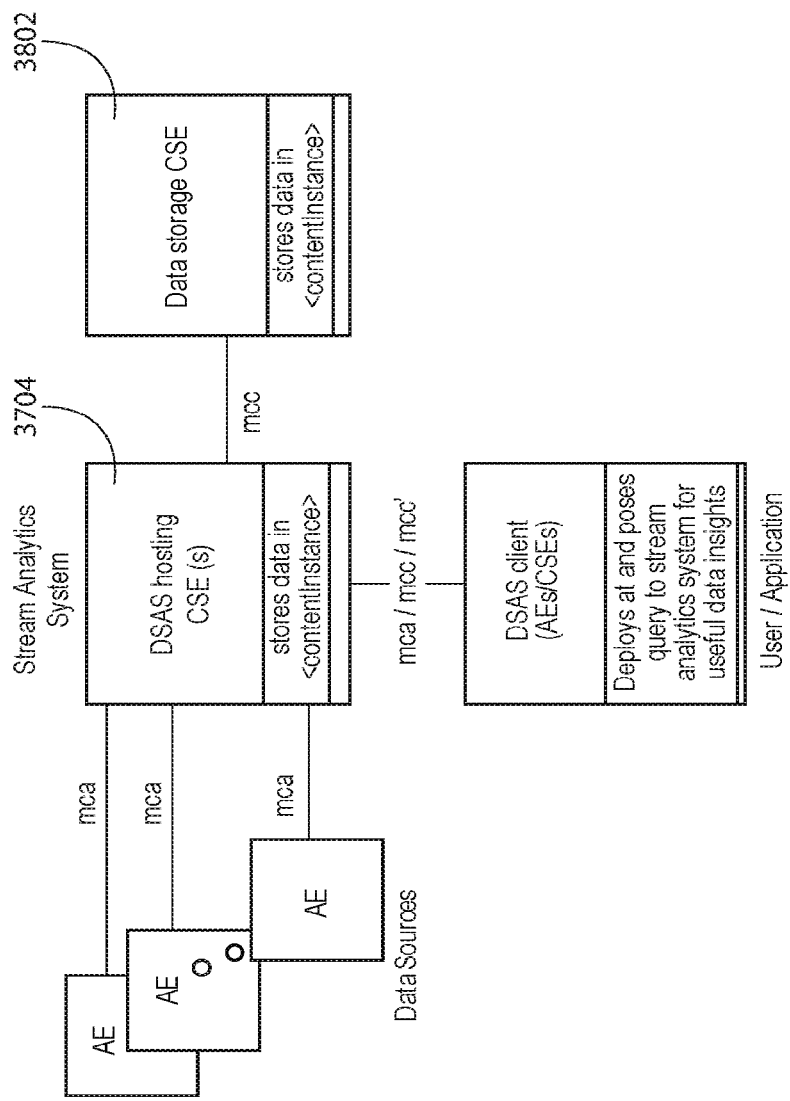
FIG. 38 is a diagram that illustrates the integration of DSAS in oneM2M service layer.

Data Stream Analytics Service (DSAS) 2202 can be integrated into the oneM2M service layer architecture as shown in FIG. 38. The Application Entity (AE), comprising of sensors and/or other IoT/M2M devices, can be considered as the source of the data stream or the data sources. There may be one or more DSAS hosting CSEs 3704. Multiple DSAS hosting CSEs 3704 imply a distributed set up of the data stream analytics service in the oneM2M service layer. The DSAS hosting CSE 3704 may be an ASN-CSE, an MN-CSE, or an IN-CSE, whether the CSE can be a physical server or a cloud server. The data storage CSE 3802 may be an MN-CSE that temporarily collects data and stores it as <contentInstance> resources, or it may be an IN-CSE where the data is permanently stored. The data storage node may also be a oneM2M cloud server.

In this architecture, DSAS 2202 is used to analyze a data stream before even the data is stored for the first time as a <contentInstance> resource, for faster and real time analysis of data. Hence, DSAS 2202 is hosted in a CSE that lies in between an AE and the data storage CSE. The DSAS 2202 may be hosted within the data storage CSE as well. In that case, data stream analytics is performed before data is stored in the storage node. A DSAS client 2216 interested in deriving useful insights from the data stream may be an AE or a CSE from the same network or a different network.

It is understood that the functionality illustrated in FIGS. 37-38, may be implemented in the form of software (i.e., computer-executable instructions) stored in a memory of, and executing on a processor of, an apparatus of an M2M network (e.g., a server, gateway, device, or other computer system), such as one of those illustrated in FIG. 49C or 49D described below.

oneM2M Resource for DSAS

A new oneM2M resource type for DSAS 2202, called <DSAS>, is described within the oneM2M system as shown in FIG. 39. This <DSAS> resource can be centrally located at the CSE base where it hosts all DSAS 2202 related resources. Alternatively, it may also exist as a child resource of an <AE>, a <node>, or other oneM2M resources. The resource contains an attribute switch and two child resources, <streamDescriptor> and <queryDescriptor>. The new attribute is shown in Table 11 while the child resources of <DSAS> are shown in Table 11.

The attribute switch shall be used to enable or disable DSAS 2202 within the CSE and can assume two values –0 or 1. The value 0 disables DSAS 2202 in the oneM2M service layer as shown in FIG. 35 and the value 1 enables DSAS 2202 in the oneM2M service layer as shown in FIG. 36.

TABLE 11

Attributes of <DSAS>

| Attributes | Multi-plicity | Description |
|---|---|---|
| switch | 1 | To enable or disable DSAS within a CSE. Can assume value 0 or 1 to enable or disable DSAS within a CSE, respectively. |

The resource <streamDescriptor> shall describe each unique data stream received by the DSAS 2202. It contains the metadata and additional information of the stream it is describing. It is the mapping of the Stream ID Store 2321 shown in Table 3 to the oneM2M system. The resource <queryDescriptor> shall be used to store all the information pertaining to the queries built into the DSAS 2202, one resource per query. It is the mapping of the Query Store 2318 shown in Table 4 to the oneM2M system.

TABLE 12

Child resources of <DSAS>

| Child Resources | Multi-plicity | Description |
|---|---|---|
| <streamDescriptor> | 0 . . . n | Contains information regarding each unique stream received by DSAS 2202. |
| <queryDescriptor> | 0 . . . n | Contains information regarding all the queries built in DSAS 2202. |

The <streamDescriptor> Resource

The resource tree for the <streamDescriptor> resource is shown in FIG. 40. Each stream the DSAS 2202 monitors will have its own <streamDescriptor> resource, which could be created via In-Band or Out-of-Band methods.

The list of attributes of the <streamDescriptor> resource are described in Table 13.

TABLE 13

Attributes of <streamDescriptor>

| Attributes | Multi-plicity | Description |
|---|---|---|
| streamID | 1 | Contains a unique identifier for the stream that the resource <streamDescriptor> is describing. |
| AEID | 0 . . . 1 | The identifier of the AE (device) that generates the data stream being described, only if the device identifier exists. |
| AEType | 0 . . . 1 | The type of the AE (device) that generates the data, if only the AE type exists, e.g smartphone |
| AEAddress | 1 | The host address of AE, containing the IP address and the port number |
| rawStreamFormat | 1 | Format of the raw data stream generated by the AE, e.g CSV, jpeg |
| tupleFormat | 1 . . . n | Contains the list of tuple attributes of the stream being described. |
| dataStoreURI | 0 . . . 1 | The path or URI to the <container> resource where the pre-processor output data stream is stored, after DSAS has extracted necessary information from the data stream. The stored data consists of <contentInstance> resources that are created. |

TABLE 13-continued

Attributes of <streamDescriptor>

| Attributes | Multi-plicity | Description |
| --- | --- | --- |
| dataOutputSelect | 1 | This indicator selects the type of data to be saved in the Data Store node after passing through the pre-processor. Output selection can be: pre-processed, selects pre-process data to be stored raw, selects raw data to be stored none, don't select any data to be stored |

The child resource of the <streamDescriptor> resource is described in Table 14.

TABLE 14

Child resources of <streamDescriptor>

| Child Resources | Multi-plicity | Description |
| --- | --- | --- |
| <subscription> | 0 . . . n | To subscribe to the <streamDescriptor> resource. Refer to oneM2M-TS-0001 oneM2M Functional Architecture-V-2.4.0 for details. |

The <queryDescriptor> Resource

The resource tree for the <queryDescriptor> resource is shown in FIG. 41. The <queryDescriptor> resource provides the query operation that is used by the data stream analytic engine.

The list of attributes of the <queryDescriptor> resource are described in Table 15.

TABLE 15

Attributes of <queryDescriptor>

| Attributes | Multi-plicity | Description |
| --- | --- | --- |
| queryID | 1 | Contains a unique ID for the query being described by the <queryDescriptor>, distinguishing it from other query in DSAS hosting CSE |
| queryDescription | 1 | Description of the analytical operation pertaining to the query |
| operatorName | 1 | Name of the operator (query implementation), that has been deployed in the DSAS hosting CSE |
| operatorParameter | 1 . . . n | The input parameters accepted by the query operator, e.g. window length, i.e. scope of data required for querying |
| priorityLevel | 1 | The priority level of the query to enable DSAS hosting to rank and prioritize its processing and response time to the query |
| hostAddress | 1 | Assumes value 'localhost' if Analytics Filter in DSAS-SF forwards the filtered stream to DSAS-SAE in the same host. In a distributed system, DSAS-SF may forward the filtered stream to DSAS-SAE component of another DSAS hosting node for stream analytics, in which case it is the address (IP address/port number) of that host. |
| switch | 1 | Assumes values 0 or 1 to disable or enable a query invocation within CSE, respectively |

The child resource of the <queryDescriptor> resource is described in Table 16.

TABLE 16

Child resources of <queryDescriptor>

| Child Resources | Multi-plicity | Description |
| --- | --- | --- |
| <streamInfo> | 1 . . . n | Information of a set of data streams which the query described by the corresponding <queryDescriptor> is interested in performing analytics upon |
| <output> | 0 . . . n | Information regarding the output generated by the query, described by the corresponding <queryDescriptor> |
| <subscription> | 0 . . . n | To subscribe to the output of the concerned query, described by corresponding <queryDescriptor>. Refer to oneM2M-TS-0001 oneM2M Functional Architecture-V-2.4.0 for details. |

The <streamInfo> Resource

Figure 42:
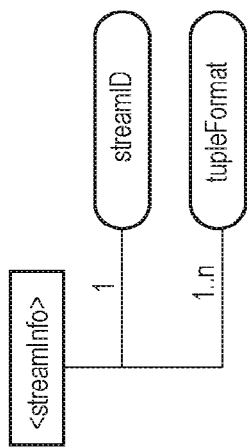
FIG. 42 is a diagram that illustrates a <streamInfo> resource.

The resource tree of the <streamInfo> resource is shown in FIG. 42. The <streamInfo> resource provides the data source input(s) used by the data stream analytics engine to perform the required query.

The attributes of the <streamInfo> resource are described in Table 17.

TABLE 17

Attributes of <streamInfo>

| Attributes | Multi-plicity | Description |
| --- | --- | --- |
| streamID | 1 | Unique identifier of the data stream on which the query, being described by the corresponding <queryDescriptor>, is made |
| tupleFormat | 1 . . . n | List of attributes of the concerned data stream, which is required to process and answer the query, described by corresponding <queryDescriptor> |

1.1.1.1 The <output> Resource

Figure 43:
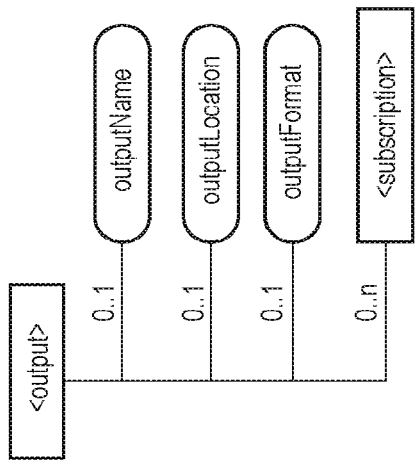
FIG. 43 is a diagram that illustrates an <output> resource.

The resource tree of the <streamInfo> resource is shown in FIG. 43. The information in the <output> resource directs the DSAS 2202 on the format of the output that is triggered by the corresponding query and where to store the output.

The attributes of the <output> resource are described in Table 18.

TABLE 18

Attributes of <output>

| Attributes | Multi-plicity | Description |
| --- | --- | --- |
| outputName | 0 . . . 1 | Contains the name of the output generated by the concerned query, if applicable, based on the corresponding analytics operation performed |
| outputURI | 0 . . . 1 | Contains the Uniform Resource Identifier (URI) for the location where the output generated by the concerned query is stored |
| outputFormat | 0 . . . 1 | Contains the format in which the output given by the concerned query is generated, e.g. CSV, HTML |

The child resource of the <output> resource is described in Table 19.

TABLE 19

Child resources of <streamDescriptor>

Figure 44:
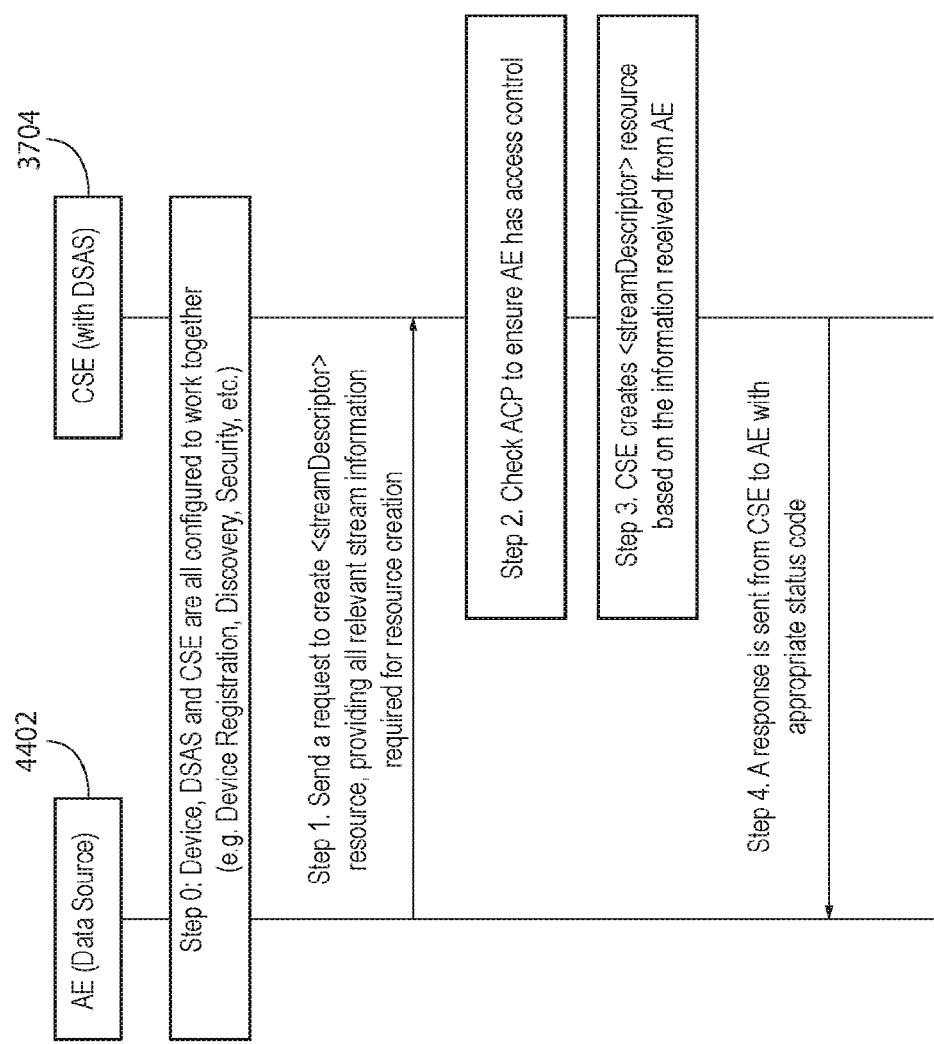
FIG. 44 is a flow chart that illustrates a oneM2M procedure for in-band stream provisioning.

| Child Resources | Multi-plicity | Description |
|---|---|---|
| <subscription> | 0 . . . n | To subscribe to the <output> resource of the concerned query. Refer to oneM2M-TS-0001 oneM2M Functional Architecture-V-2.4.0 for details. | oneM2M Procedures for Data Stream Identification and Provisioning FIG. 44 shows the procedure for In-Band Stream Provisioning within the oneM2M system. In this case, DSAS 2202 is integrated within the CSE (DSAS hosting CSE 3704).

In step 0 of FIG. 44, it is considered that all the configuration pertaining to the oneM2M system is performed so that the entire DSAS architecture works together. The data source AE 4402, CSE 3704, and DSAS 2202 are all able to communicate with each other.

In step 1 of FIG. 44, a request is sent by the AE (device generating data stream) to the CSE 3704 to create a <streamDescriptor> resource for the data stream transmitted by the AE. The AE includes information and metadata of the data stream in the request.

In step 2 of FIG. 44, the CSE 3704 checks the ACP to ensure that AE 4402 has access rights to create the <streamDescriptor> resource. If access control is granted, continue on to Step 3; otherwise, go to Step 4.

In step 3 of FIG. 44, the CSE 3704 creates the <streamDescriptor> resource based on the information received from the AE. An entry for the Stream ID Store 2321 within DSAS 2202 is also created.

In step 4 of FIG. 44, CSE 3704 sends a response with appropriate status to the AE.

It is understood that the entities performing the steps illustrated in FIG. 44 are logical entities that may be implemented in the form of software (i.e., computer-executable instructions) stored in a memory of, and executing on a processor of, a network apparatus or computer system such as those illustrated in FIG. 49C or FIG. 49D. That is, the method(s) illustrated in FIG. 44 may be implemented in the form of software (i.e., computer-executable instructions) stored in a memory of a network apparatus, such as the apparatus or computer system illustrated in FIG. 49C or FIG. 49D, which computer executable instructions, when executed by a processor of the apparatus, perform the steps illustrated in FIG. 44. It is also understood that any transmitting and receiving steps illustrated in FIG. 44 may be performed by communication circuitry of the apparatus under control of the processor of the apparatus and the computer-executable instructions (e.g., software) that it executes.

Figure 45:
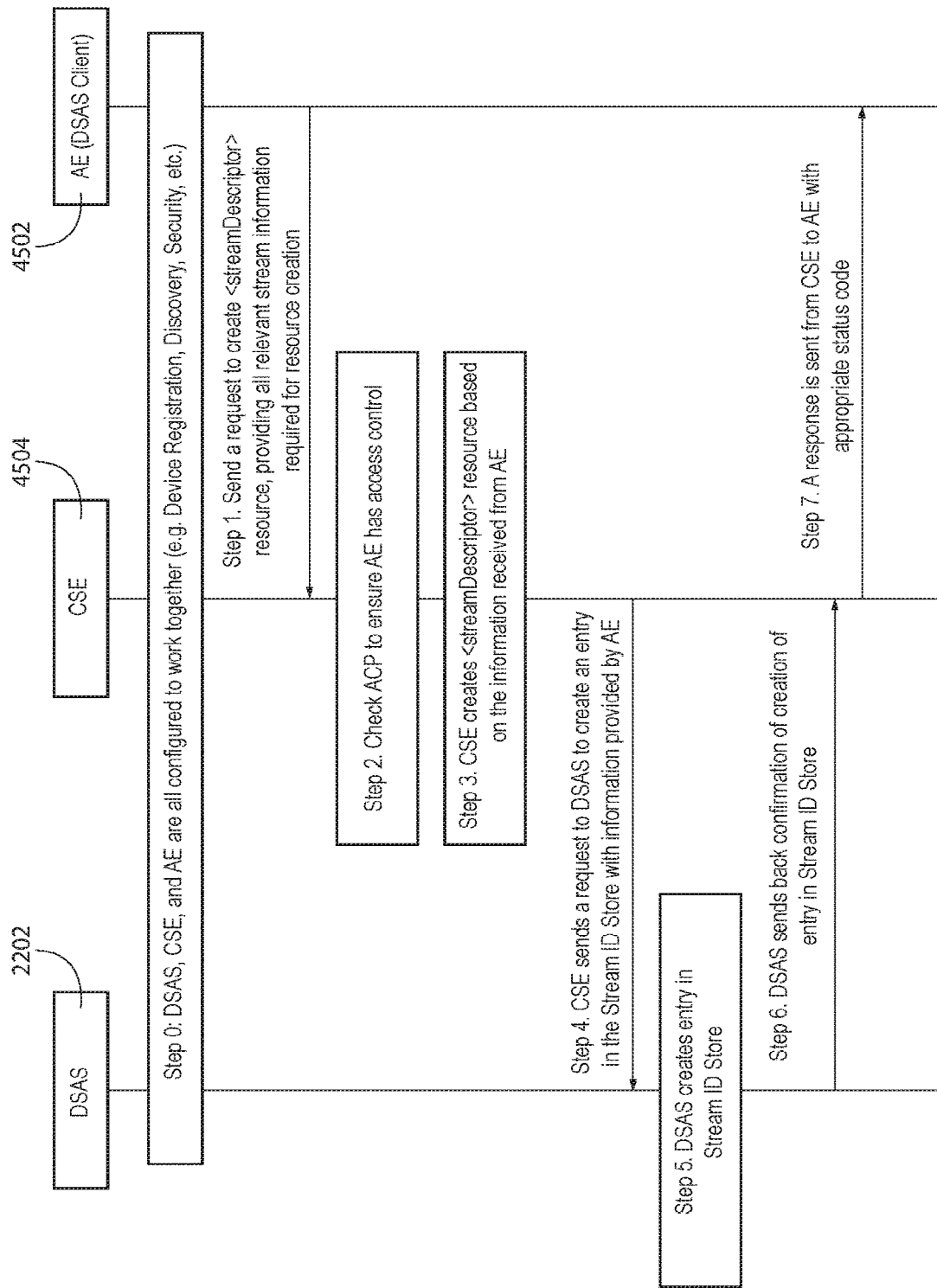
FIG. 45 is a flow chart that illustrates a oneM2M procedure for out-of-band stream provisioning.

FIG. 45 shows an embodiment of Out-of-Band Stream Provisioning within the oneM2M system. DSAS 2202 is shown external to the CSE 4504 but it may also be integrated within the CSE 4504. Note that AE(DSAS Client) 4502 could be another CSE acting as a DSAS Client.

In step 0 of FIG. 45, it is considered that all the configurations pertaining to the oneM2M system is performed so that the entire DSAS architecture works together. DSAS 2202, CSE, and DSAS Client AE 4502 are all able to communicate with each other.

In step 1 of FIG. 45, a request is sent by AE (DSAS Client) to the CSE 4504 to create a <streamDescriptor> resource for the data stream transmitted by another AE (not shown). AE includes information and metadata of the data stream in the request.

In step 2 of FIG. 45, the CSE checks the ACP to ensure that DSAS Client AE 4502 has access rights to create the <streamDescriptor> resource. If access control is granted, continue on to Step 3; otherwise, go to Step 7.

In step 3 of FIG. 45, the CSE 4504 creates the <streamDescriptor> resource based on the information received from the DSAS Client AE 4502.

In step 4 of FIG. 45, CSE 4504 sends a request to DSAS to create an entry in the Stream ID Store 2321. For the case DSAS is integrated within the CSE 4504, this step is an internal process.

In step 5 of FIG. 45, DSAS creates entry in the Stream ID Store 2321.

In step 6 of FIG. 45, DSAS sends response with status of Stream ID Store 2321 entry creation. For the case DSAS is integrated within the CSE 4504, this step is an internal process.

In step 7 of FIG. 45, CSE 4504 sends a response with appropriate status to the DSAS Client AE 4502.

Figure 46A:
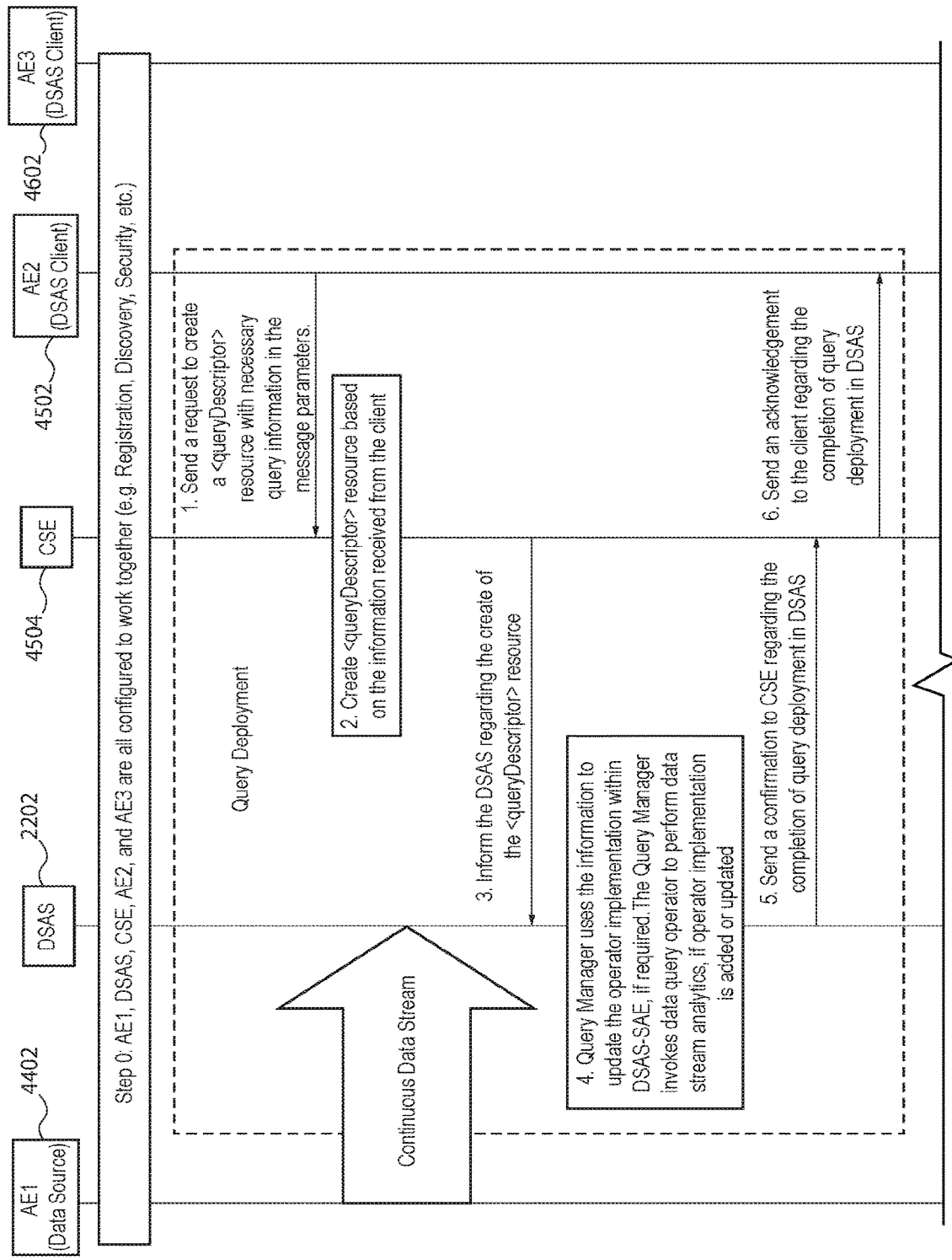
FIGS. 46A-B are a flow chart that illustrates a oneM2M procedures for query deployment, data stream analytics and output triggering.
Figure 46B:
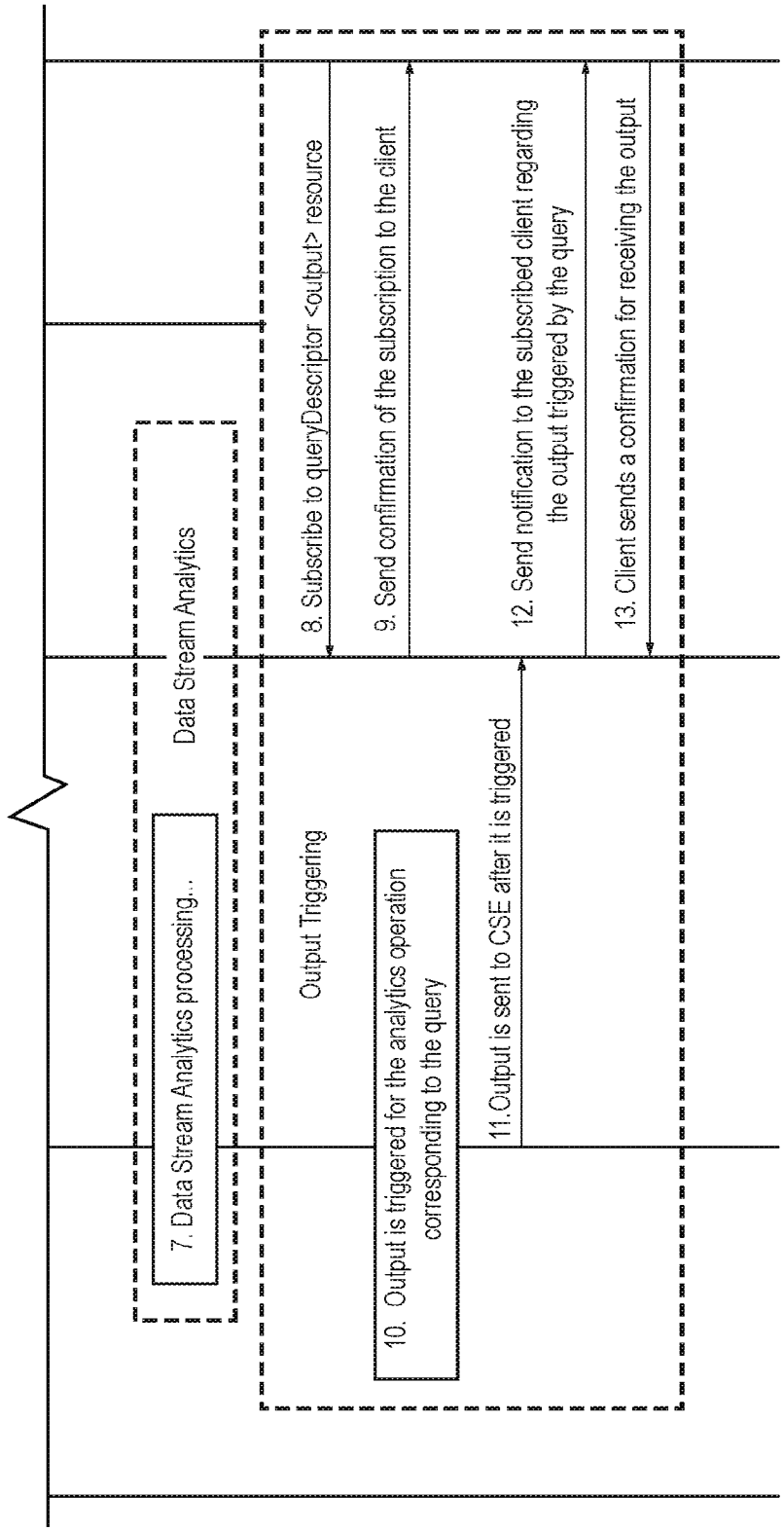

It is understood that the entities performing the steps illustrated in FIG. 45 are logical entities that may be implemented in the form of software (i.e., computer-executable instructions) stored in a memory of, and executing on a processor of, a network apparatus or computer system such as those illustrated in FIG. 49C or FIG. 49D. That is, the method(s) illustrated in FIG. 45 may be implemented in the form of software (i.e., computer-executable instructions) stored in a memory of a network apparatus, such as the apparatus or computer system illustrated in FIG. 49C or FIG. 49D, which computer executable instructions, when executed by a processor of the apparatus, perform the steps illustrated in FIG. 45. It is also understood that any transmitting and receiving steps illustrated in FIG. 45 may be performed by communication circuitry of the apparatus under control of the processor of the apparatus and the computer-executable instructions (e.g., software) that it executes.

oneM2M Procedures for Query Deployment, Data Stream Analytics and Output Triggering FIGS. 46A-B shows an embodiment of oneM2M procedures for Query Deployment, Data Stream Analytics, and Output Triggering. DSAS is shown located separately from the CSE 4504 but it may also be integrated within the CSE 4504. When integrated, Steps 2 to 7 run within the CSE 4504 and messaging occurs internally between CSE 4504 and DSAS 2202. Note that either AE2(DSAS Client) 4502 or AE3(DSAS Client) 4602 could be another CSE acting as a DSAS Client.

In step 0 of FIGS. 46A-B, it is considered that all the configurations pertaining to the system are performed so that the entire DSAS architecture works together. The data stream is ingested from the data source to the DSAS 2202 and is a continuous stream. The stream may be ingested before or after the query is deployed in the system.

In step 1 of FIGS. 46A-B, AE2 (DSAS Client) 4502 performs a query deployment by sending a request to create a new <queryDescriptor> resource in the CSE 4504.

In step 2 of FIGS. 46A-B, the CSE 4504 checks ACP for access control, and if granted, creates a new <queryDescriptor> resource using the information provided by AE24502.

In step 3 of FIGS. 46A-B, the CSE 4504 informs DSAS 2202 regarding the new <queryDescriptor> resource. For the case DSAS 2202 is integrated within the CSE 4504, this step is an internal process.

In step 4 of FIGS. 46A-B, the DSAS uses the information sent by the CSE 4504 to deploy the corresponding operator implementation of the query within DSAS-SAE 2210. The Query manager 2316 invokes this operator, if the query is set as "Enabled" (the attribute switch should have value '1') within <queryDescriptor> resource. The data stream analytics is started if query deployment is successful.

In step 5 of FIGS. 46A-B, DSAS 2202 sends a confirmation to the CSE 4504 regarding the completion of the query deployment. For the case DSAS 2202 is integrated within the CSE 4504, this step is an internal process.

In step 6 of FIGS. 46A-B, the CSE 4504 sends an acknowledgement to AE2 regarding the completion of the query deployment.

In step 7 of FIGS. 46A-B, the data stream analytic processing continues. This processing was started in Step 4 and this step represents the continuous operation of the analytic processing as long as the query deployment is successful.

In step 8 of FIGS. 46A-B, AE3 (DSAS Client) 4602, which may be the same AE as the one that deployed query or a different AE, is interested in obtaining results from the deployed query. It sends a subscription request to CSE 4504 to subscribe to the <output> resource of <queryDescriptor>.

In step 9 of FIGS. 46A-B, the CSE 4504 completes the subscription process for AE3 and sends back a confirmation regarding the same.

In step 10 of FIGS. 46A-B, the output for the subscribed query is triggered at the DSAS based on some triggered event or externally by a DSAS client.

In step 11 of FIGS. 46A-B, DSAS 2202 sends the output to the CSE 4504 which stores it in the <output> resource.

In step 12 of FIGS. 46A-B, CSE 4504 then sends the output to AE3 4602.

In step 13 of FIGS. 46A-B, AE3 4602 send a confirmation for receiving the output.

It is understood that the entities performing the steps illustrated in FIGS. 46A-B are logical entities that may be implemented in the form of software (i.e., computer-executable instructions) stored in a memory of, and executing on a processor of, a network apparatus or computer system such as those illustrated in FIG. 49C or FIG. 49D. That is, the method(s) illustrated in FIGS. 46A-B may be implemented in the form of software (i.e., computer-executable instructions) stored in a memory of a network apparatus, such as the apparatus or computer system illustrated in FIG. 49C or FIG. 49D, which computer executable instructions, when executed by a processor of the apparatus, perform the steps illustrated in FIGS. 46A-B. It is also understood that any transmitting and receiving steps illustrated in FIGS. 46A-B may be performed by communication circuitry of the apparatus under control of the processor of the apparatus and the computer-executable instructions (e.g., software) that it executes.

Interfaces, such as Graphical User Interfaces (GUIs), can be used to assist user to control and/or configure functionalities related to data stream analytics in the service layer. FIG. 47 shows a GUI 4702 for the client to create queries or to access the queries that are deployed and enabled in DSAS 2202. The client is given the list of queries enabled in the system via a dropdown menu. Also, the client is given an option to select the format in which the output of the query is saved. The output may be saved as a CSV file, text file, HTML, etc. If the query supports timed window, then the client also has an option of selecting the window length, i.e. the scope of the data for which the query was processed. Since data stream analytics may involve approximate answers, the client is also given an option of selecting the maximum error it can tolerate in its answer.

The GUI to deploy a query can be interactive, where based on the kind of query deployment the client is interested in performing (assuming the client has necessary authorization), the GUI gives different options to the client. Exemplary interfaces provided to the client based on the kind of deployment they are interested in performing are shown in FIGS. 48A-B.

It is to be understood that interfaces such as that of FIGS. 47 and 48 can be produced using displays such as those shown in FIGS. 49C-D described below.

Example M2M/IoT/WoT Communication System

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

FIG. 49A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as such as service layer 1602, data source 2218, DSAS 2202, DSAS-SF 2212, DSAS-SAE 2210, DSAS Manager 2206, DSAS API 2208, data storage node 2214, security manager 2302, manager/parser 2304, preprocessor 2306, storage filter 2308, analytics filter 2310, query store 2318, job table 2320, log store 2323, Stream ID Store 2321, SAE source 2314, query operators 2312, client 2216 and 3202, coordinator 3402, DSAS CSF 3702, DSAS hosting CSE 3704, data source AE 4402, DSAS Client AE 4502 and 4602, CSE 4504 and logical entities to produce interfaces such as the interfaces of FIGS. 47 and 48.

As shown in FIG. 49A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 49A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 49B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as service layer 1602, data source 2218, DSAS 2202, DSAS-SF 2212, DSAS-SAE 2210, DSAS Manager 2206, DSAS API 2208, data storage node 2214, security manager 2302, manager/parser 2304, preprocessor 2306, storage filter 2308, analytics filter 2310, query store 2318, job table 2320, log store 2323, Stream ID Store 2321, SAE source 2314, query operators 2312, client 2216 and 3202, coordinator 3402, DSAS CSF 3702, DSAS hosting CSE 3704, data source AE 4402, DSAS Client AE 4502 and 4602, CSE 4504 and logical entities to produce interfaces such as the interfaces of FIGS. 47 and 48. The M2M service layer 22 may be implemented by one or more servers, computers, devices, virtual machines (e.g. cloud/storage farms, etc.) or the like, including for example the devices illustrated in FIGS. 49C and 49D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12 in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 49B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through networks 12 in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as service layer 1602, data source 2218, DSAS 2202, DSAS-SF 2212, DSAS-SAE 2210, DSAS Manager 2206, DSAS API 2208, data storage node 2214, security manager 2302, manager/parser 2304, preprocessor 2306, storage filter 2308, analytics filter 2310, query store 2318, job table 2320, log store 2323, Stream ID Store 2321, SAE source 2314, query operators 2312, client 2216 and 3202, coordinator 3402, DSAS CSF 3702, DSAS hosting CSE 3704, data source AE 4402, DSAS Client AE 4502 and 4602, CSE 4504 and logical entities to produce interfaces such as the interfaces of FIGS. 47 and 48 may be hosted within a M2M service layer instance hosted by an M2M node, such as an M2M server, M2M gateway, or M2M device, as shown in FIG. 49B. For example, the logical entities such as service layer 1602, data source 2218, DSAS 2202, DSAS-SF 2212, DSAS-SAE 2210, DSAS Manager 2206, DSAS API 2208, data storage node 2214, security manager 2302, manager/parser 2304, preprocessor 2306, storage filter 2308, analytics filter 2310, query store 2318, job table 2320, log store 2323, Stream ID Store 2321, SAE source 2314, query operators 2312, client 2216 and 3202, coordinator 3402, DSAS CSF 3702, DSAS hosting CSE 3704, data source AE 4402, DSAS Client AE 4502 and 4602, CSE 4504 and logical entities to produce interfaces such as the interfaces of FIGS. 47 and 48 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 49C or FIG. 49D described below.

Further, logical entities such as service layer 1602, data source 2218, DSAS 2202, DSAS-SF 2212, DSAS-SAE 2210, DSAS Manager 2206, DSAS API 2208, data storage node 2214, security manager 2302, manager/parser 2304, preprocessor 2306, storage filter 2308, analytics filter 2310, query store 2318, job table 2320, log store 2323, Stream ID Store 2321, SAE source 2314, query operators 2312, client 2216 and 3202, coordinator 3402, DSAS CSF 3702, DSAS hosting CSE 3704, data source AE 4402, DSAS Client AE 4502 and 4602, CSE 4504 and logical entities to produce interfaces such as the interfaces of FIGS. 47 and 48 can implemented as part of an M2M network that uses a Service Oriented Architecture (SOA) and/or a Resource-Oriented Architecture (ROA) to access services of the present application.

FIG. 49C is a block diagram of an example hardware/software architecture of a M2M network node 30, such as an M2M device 18, an M2M gateway 14, an M2M server, or the like. The node 30 can execute or include logical entities such as service layer 1602, data source 2218, DSAS 2202, DSAS-SF 2212, DSAS-SAE 2210, DSAS Manager 2206, DSAS API 2208, data storage node 2214, security manager 2302, manager/parser 2304, preprocessor 2306, storage filter 2308, analytics filter 2310, query store 2318, job table 2320, log store 2323, Stream ID Store 2321, SAE source 2314, query operators 2312, client 2216 and 3202, coordinator 3402, DSAS CSF 3702, DSAS hosting CSE 3704, data source AE 4402, DSAS Client AE 4502 and 4602, CSE 4504 and logical entities to produce interfaces such as the interfaces of FIGS. 47 and 48. The device 30 can be part of an M2M network as shown in FIG. 49A-B or part of a non-M2M network. As shown in FIG. 49C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 49C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 49C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 49C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control visual indications on the display to reflect the status of the system or to obtain input from a user or display information to a user about capabilities or settings. A graphical user interface, which may be shown on the display, may be layered on top of an API to allow a user to interactively do functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52. Alternately, the node 30 may comprise apparatuses or devices, such as a sensor, consumer electronics, a wearable device such as a smart watch or smart clothing, a medical or eHealth device, a robot, industrial equipment, a drone, a vehicle such as a car, truck, train, or airplane.

FIG. 49D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as service layer 1602, data source 2218, DSAS 2202, DSAS-SF 2212, DSAS-SAE 2210, DSAS Manager 2206, DSAS API 2208, data storage node 2214, security manager 2302, manager/parser 2304, preprocessor 2306, storage filter 2308, analytics filter 2310, query store 2318, job table 2320, log store 2323, Stream ID Store 2321, SAE source 2314, query operators 2312, client 2216 and 3202, coordinator 3402, DSAS CSF 3702, DSAS hosting CSE 3704, data source AE 4402, DSAS Client AE 4502 and 4602, CSE 4504 and logical entities to produce interfaces such as the interfaces of FIGS. 47 and 48. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 49A and FIG. 49B, to enable the computing system 90 to communicate with other nodes of the network.

User equipment (UE) can be any device used by an end-user to communicate. It can be a hand-held telephone, a laptop computer equipped with a mobile broadband adapter, or any other device. For example, the UE can be implemented as the M2M terminal device 18 of FIG. 49A-B or the device 30 of FIG. 49C.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as service layer 1602, data source 2218, DSAS 2202, DSAS-SF 2212, DSAS-SAE 2210, DSAS Manager 2206, DSAS API 2208, data storage node 2214, security manager 2302, manager/parser 2304, preprocessor 2306, storage filter 2308, analytics filter 2310, query store 2318, job table 2320, log store 2323, Stream ID Store 2321, SAE source 2314, query operators 2312, client 2216 and 3202, coordinator 3402, DSAS CSF 3702, DSAS hosting CSE 3704, data source AE 4402, DSAS Client AE 4502 and 4602, CSE 4504 and logical entities to produce interfaces such as the interfaces of FIGS. 47 and 48 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD- ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. An apparatus for a service supporting service capabilities in a Resource-Oriented Architecture (ROA) through a set of Application Programming Interfaces (APIs), the apparatus comprising circuitry configured to:
    receive, from a first client entity, a first request for creating a data stream query resource in the ROA via RESTful methods;
    authorize, based on the first request, the first client entity by referring to one or more access control policies;
    create, based on authorizing the first client entity, the data stream query resource having a plurality of attributes, the data stream query resource comprising one or more data stream IDs;
    send, based on the first request and to the first client entity, a query response;
    receive, from a second client entity, a second request to access the data stream query resource;
    authorize, based on the second request, the second client entity to access the data stream query resource by referring to one or more access control policies;
    generate, based on authorizing the second client entity, a query output from the data stream query resource based on one or more query parameters; and
    send, to the second client entity, the query output.
2. The apparatus of claim 1, wherein the service is provided as a middleware service between network protocol stacks and applications.
3. The apparatus of claim 2, wherein the service is a oneM2M service layer.
4. The apparatus of claim 1, wherein the data stream query resource further comprises a query output format and a query switch for enabling/disabling.
5. The apparatus of claim 1, wherein the one or more query parameters further indicate output format.
6. The apparatus of claim 1, wherein the one or more query parameters further indicate maximum error tolerance.
7. The apparatus of claim 1, wherein the apparatus comprises a service layer component.
8. The apparatus of claim 1, wherein the first client entity comprises an Internet of Things (IoT) device.
9. The apparatus of claim 1, wherein the first client entity and the second client entity are different.
10. The apparatus of claim 1, wherein the second request to access the data stream query resource comprises raw data, and wherein the circuitry is configured to generate the query output based on the raw data.
11. A method for a service supporting service capabilities in a Resource-Oriented Architecture (ROA) through a set of Application Programming Interfaces (APIs), the method comprising:
    receiving, from a first client entity, a first request for creating a data stream query resource in the ROA via RESTful methods;
    authorizing, based on the first request, the first client entity by referring to one or more access control policies;
    creating, based on authorizing the first client entity, the data stream query resource having a plurality of attributes, the data stream query resource comprising one or more data stream IDs;
    sending, based on the first request and to the first client entity, a query response;
    receiving, from a second client entity, a second request to access the data stream query resource;
    authorizing, based on the second request, the second client entity to access the data stream query resource by referring to one or more access control policies;
    generating, based on authorizing the second client entity, a query output from the data stream query resource based on one or more query parameters; and
    sending, to the second client entity, the query output.
12. The method of claim 11, wherein the service is provided as a middleware service between network protocol stacks and applications.
13. The method of claim 12, wherein the service is a oneM2M service layer.
14. The method of claim 11, wherein the first client entity comprises an Internet of Things (IoT) device.
15. The method of claim 11, wherein the data stream query resource further comprises a query output format and a query switch for enabling/disabling.
16. The method of claim 11, wherein the one or more query parameters further indicate output format.
17. The method of claim 11, wherein the one or more query parameters further indicate maximum error tolerance.
18. The method of claim 11, wherein the first client entity and the second client entity are different.
19. The method of claim 11, wherein the second request to access the data stream query resource comprises raw data, and wherein the method comprises generating the query output based on the raw data.

* * * * *